United States Patent [19]

Abecassis

[11] Patent Number: 5,953,485
[45] Date of Patent: Sep. 14, 1999

[54] METHOD AND SYSTEM FOR MAINTAINING AUDIO DURING VIDEO CONTROL

[76] Inventor: Max Abecassis, 19020 NE 20 Ave., Miami, Fla. 33179

[21] Appl. No.: 08/951,284

[22] Filed: Oct. 16, 1997

Related U.S. Application Data

[60] Continuation of application No. 08/424,106, Apr. 19, 1995, abandoned, which is a division of application No. 08/303,158, Sep. 8, 1994, which is a continuation-in-part of application No. 07/832,335, Feb. 7, 1992, and a continuation-in-part of application No. 08/002,998, Jan. 11, 1993, Pat. No. 5,434,678.

[51] Int. Cl.[6] ..................................................... H04N 5/93
[52] U.S. Cl. .............................................. 386/68; 386/99
[58] Field of Search ................................ ; 348/724, 559, 348/385, 482–485; 386/68, 75, 77, 81, 82, 6, 7, 8, 39, 54, 96, 98, 99; H04N 5/93

[56] References Cited

U.S. PATENT DOCUMENTS

| | | | |
|---|---|---|---|
| 4,449,198 | 5/1984 | Uroon et al. | 364/900 |
| 4,450,488 | 5/1984 | Golding | 348/342 |
| 4,569,026 | 2/1986 | Best | 364/521 |
| 4,605,964 | 8/1986 | Chard | 358/147 |
| 4,685,003 | 8/1987 | Westland | 360/14.1 |
| 4,729,044 | 3/1988 | Kiesel | 360/14.3 |
| 4,775,935 | 10/1988 | Yourick | 364/401 |
| 4,780,758 | 10/1988 | Lin et al. | . |
| 4,786,967 | 11/1988 | Smith, III et al. | 348/485 |
| 4,872,151 | 10/1989 | Smith | 369/14 |
| 4,888,796 | 12/1989 | Olivo, Jr. | 379/101 |
| 5,109,482 | 4/1992 | Bourman | 395/154 |
| 5,133,079 | 7/1992 | Ballantine et al. | 455/4.1 |
| 5,236,199 | 8/1993 | Thompson, Jr. | . |
| 5,289,288 | 2/1994 | Silverman et al. | 358/335 |
| 5,313,297 | 5/1994 | Fukui et al. | 348/7 |
| 5,469,370 | 11/1995 | Ostrover et al. | 364/514 R |
| 5,576,843 | 11/1996 | Cookson et al. | 386/97 |

FOREIGN PATENT DOCUMENTS

| | | | |
|---|---|---|---|
| 0280573 | 8/1988 | European Pat. Off. | H04N 5/930 |
| 0071209 | 6/1977 | Japan | 358/144 |
| 63-59081 | 3/1988 | Japan | H04N 5/930 |

OTHER PUBLICATIONS

"Variable Content Video", Max Abecassis, Feb. 2, 1993 U.S. Copyright Office, Registration TXV555686.

*Primary Examiner*—David E. Harvey

[57] ABSTRACT

A video method and system maintains a transmission of an audio of a video during a viewer controlled freezing, slowing, and/or zooming of the transmission of the video component of the video by automatically selecting, adjusting audio levels, looping, and producing audio effects, from a plurality of audio elements of the video, such as a foreground and background audio elements, in response to the viewer control of the transmission of the video component.

16 Claims, 27 Drawing Sheets

Segment Category Descriptive Structure

| Code | Description | None | Implied | Explicit | Graphic |
|---|---|---|---|---|---|
| 110 | Profanity | 1 | 2 | 3 | 4 |
| 130 | Violence | 1 | 2 | 3 | 4 |
| 135 | Bloodshed | 1 | 2 | 3 | 4 |
| 150 | Monsters | 1 | 2 | 3 | 4 |
| 170 | Nudity | 1 | 2 | 3 | 4 |
| 175 | Sex | 1 | 2 | 3 | 4 |

FIG. 1A

Segment Element Descriptive Structure

| Code | Description | None | Minimal | Expanded | Extensive |
|---|---|---|---|---|---|
| 210 | Character | 1 | 2 | 3 | 4 |
| 220 | Location | 1 | 2 | 3 | 4 |
| 230 | Time | 1 | 2 | 3 | 4 |
| 340 | Detail | 1 | 2 | 3 | 4 |
| 420 | Expertise | 1 | 2 | 3 | 4 |

FIG. 1B

Segment Inclusion Descriptive Structure

| Code | Description | Highlight | Summary | Condensed | Detailed |
|---|---|---|---|---|---|
| 610 | Inclusion | 1 | 2 | 3 | 4 |

FIG. 1C

Segment Generalized Descriptive Structure

| G | PG | PG-13 | R | NC-17 |
|---|---|---|---|---|

Symbols MPAA Trademark

FIG. 1D

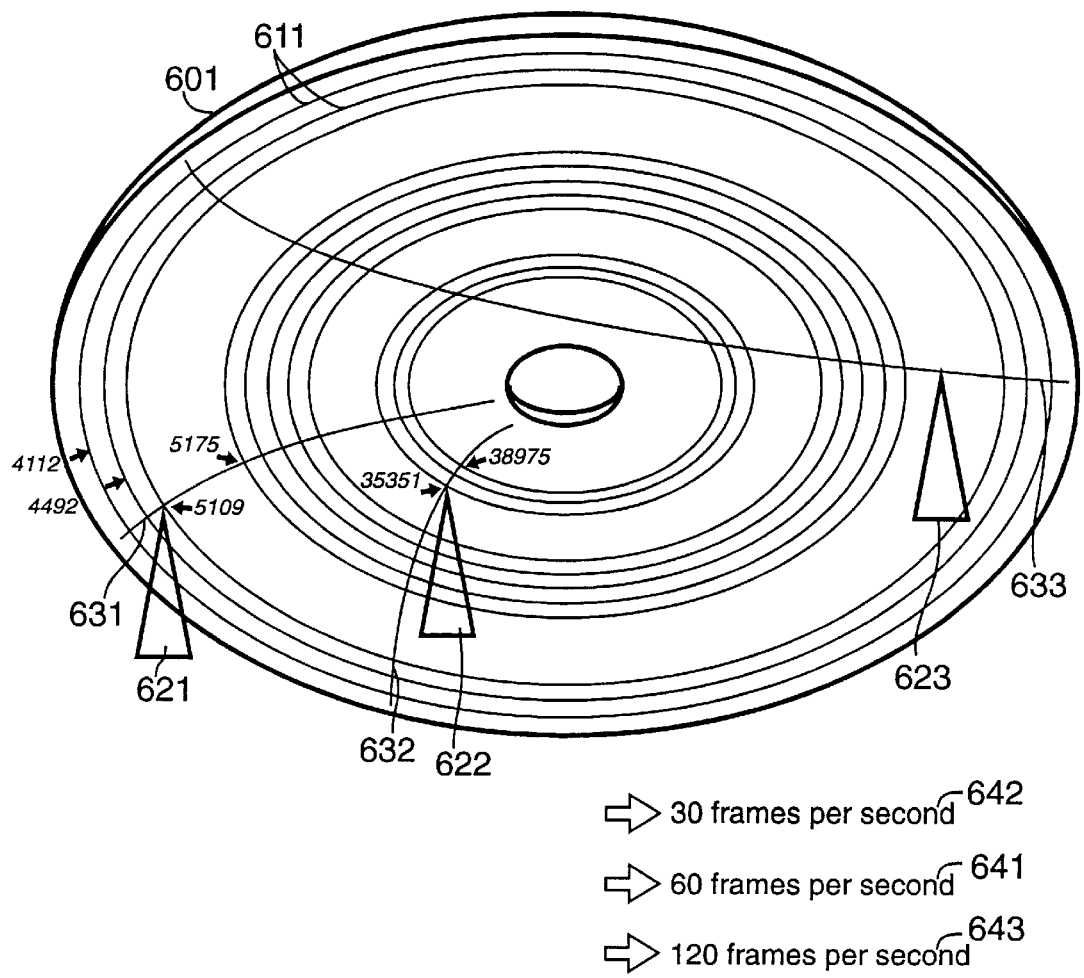
FIG. 6A
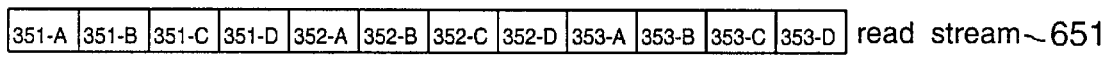
FIG. 6B

METHOD AND SYSTEM FOR MAINTAINING AUDIO DURING VIDEO CONTROL

This application is a continuation of application Ser. No. 08/424,106 filed Apr. 19, 1995 (now abandoned), which is a divisional of application Ser. No. 08/303,158 filed Sep. 8, 1994, which is a CIP of Ser. No. 07/832,335 filed Feb. 7, 1992 and a CIP of Ser. No. 08/002,998 filed Jan. 11, 1993 (now U.S. Pat. No. 5,434,678).

A portion of the disclosure of this patent document, including each of the drawings, contains material which is subject to copyright protection. The copyright owner has no objection to the facsimile reproduction by any one of the patent disclosures, as it appears in the Patent and Trademark Office patent files or records, but otherwise reserves all copyright rights whatsoever.

BACKGROUND OF THE INVENTION

1. Field of the Invention

Detailed herein are systems and methods of automatically customizing a viewer-selected video responsive to the application of the viewer's video content preferences to a segment map of the video.

In the delivery of a viewer-selected video advertisement, a version of the advertisement is transmitted that is responsive to the viewer's preferences for a level of detail and explicitness in a range of content categories. The viewer is compensated for the viewing of the video advertisement.

In instances where the viewing of the video is interrupted by a communication, delivery of the video is automatically placed on hold (paused) in response to the viewer accepting the communication. Upon completion of the communication, the delivery of the video is automatically restarted at the point placed on hold, at some pre-defined amount of time prior to the placing on hold of the video, or at a suitable prior point in the video.

2. Background of the Invention

As the delivery of video programs moves from a broadcast architecture to a pointcast architecture, the digital superhighway promises the delivery of a variety of interactive video services, including interactive video games and information services.

However, with respect to non-interactive entertainment programming, such as motion pictures, video programming concepts remain largely rooted in the primitive traditional linear architectures of celluloid films. Proposed movies-on-demand services, while utilizing a pointcast architecture, largely reflect the broadcast tradition in terms of the video provided.

Traditionally, the strategy of video advertisement has been to utilize programming interruptions to deliver advertisement which a viewer seldom has a desire to receive. Advertising concepts have yet to suggest the realization of the potential that video server based pointcast delivery systems offer in terms of the delivery of a viewer requested automatically customized video advertisement, and compensating the viewer for the apparent viewing of the advertisement.

Similarly, the delivery of communication and video services have traditionally been separate and distinct, the prior art as yet to address the issues relating to the integration of the viewing of a video program with the receipt of a communication.

The patents to Von Kohorn, U.S. Pat. No. 4,520,404; Chard, U.S. Pat. No. 4,605,964; Kiesel, U.S. Pat. No. 4,729,044; Olivo Jr., U.S. Pat. No. 4,888,796; Vogel, U.S. Pat. No. 4,930,158; Vogel, U.S. Pat. No. 4,930,160; Boyd et al., U.S. Pat. No. 5,023,727; and Palmer, U.S. Pat. No. 5,195,135; the teachings of which are incorporated by reference herein, detail a variety of video editing systems. However, none of these references describe a system in which the contents of a video program are automatically customized in response to a viewer's video content preferences.

SUMMARY OF THE INVENTION

In view of the foregoing shortcomings of the prior art, it is evident that the opportunity presents itself for a new class of video services that fully realize the potential of the random access capabilities of video servers and the pointcast architecture of video-on-demand services.

Accordingly, it is an object of the systems and methods herein disclosed to deliver to a viewer an automatically customized version of a single edition of the viewer-selected video responsive to the viewer's content preferences for the level of detail and explicitness in a range of content categories.

It is also an object to compensate the viewer for the viewing of a viewer selected video advertisement.

It is also an object to integrate the delivery of video and communication services.

Briefly these and other objects are accomplished by video production and editing systems and methods that assign segments of a video appropriate content descriptors. A segment's definition comprises a descriptor that provides specific and detailed information as to each segment's subject matter, level of detail, and form of expression. A segment's definition further comprises a first and last frame identifier, and beginning frame identifier of the next logical segments. The segments definitions are organized into a video map.

Thus a variable content video comprises not only video and audio information, but also a video segment map that identifies the location and content of each of the video's segments as well as their potential order.

A content-on-demand video is a variable content video further distinguished from its linear video predecessors in that it also comprises parallel and transitional segments that enhance the seamless continuity among non-sequential segments and provide a greater range of levels of detail and explicitness.

Random access and pointcast technologies are enhanced to provide each viewer the opportunity to preestablish both any number of general content preferences, and video/event specific content preferences, identifying the viewers' preferences in each of a number of content categories.

The playing of a content-on-demand video does not require that the viewer preview the contents of the segments of the video or that the viewer have knowledge of the contents of segments of the video. The viewing of a content-on-demand video does not require viewer intervention during the viewing of the video. A video system as per the present invention automatically customizes, responsive to a viewer's video content preferences, a video selected by a viewer, and transmits the customized version of the video as a continuous video.

Once a video server or Video CD has learned a viewer's content preferences it will thereafter automatically apply those content preferences to the video map of any content-on-demand video the viewer has selected. By applying a viewer's video content preferences as they relate to the video segment map of the selected video, the random access device gains the information to automatically exclude segments of the video containing material which the viewer does not wish to view, and to transmit as a logical seamless and continuous video, only those sequential or non-sequential segments of the video whose content and form of expression are consistent with the viewer's video content preferences. The resulting version of a video that is provided each viewer automatically provides scenes of the video at the desired level of explicitness and detail that the viewer desires.

If a viewer prefers, for example, not to view bloodshed in a motion picture, the video content preferences would indicate this preference. Thus, regardless of the source of the video, the category of the video, the particular video selection method utilized, or the particular video selected, the video system of the present invention will automatically omit transmitting any segment that included bloodshed.

In contrast to interactive motion pictures, and full motion video games, in a content-on-demand video it is primarily the form of expression that is the object of alternate frame sequences, rather than the story-line. In a content-on-demand video, each of the significant scenes and actions can be implicitly expressed, as found for example in a "PG" rated film, explicitly expressed, as found for example in an "R" rated film, and graphically expressed, as found for example in an "NC-17" rated film.

Traditionally, each edition of a film or program, such as a theatrical release, director's cut, European version, has been separately packaged as a unique linear sequence of frames. A content-on-demand video combines in a single nonlinear package all the segments of each of the potential versions of a program.

In a conventional video-on-demand system, every viewer that selects a given program is provided the same version of that program. In a content-on-demand system each viewer is automatically provided a customized version of that program. In a video-on-demand system, if 1,000 viewers select the same program, each viewer will be provided exactly the same program. In a content-on-demand system, if the same 1,000 viewers select the same program, each viewer could be provided a unique version of that program.

Where a single video contains segments in at least twenty different content categories (e.g. bloodshed, violence, nudity, etc.) and can be edited at four levels of explicitness (e.g. none, implied, explicit, and graphic), a content-on-demand system can automatically extract over one trillion unique versions from that single video.

In a content-on-demand video the artist and producer are challenged to create greater variety in the form of expression. Utilizing parallel, transitional, and overlapping segments, a content-on-demand video provides viewing at that level of expression, content, detail, and length, that is consistent with a variety of viewer preferences.

Content-on-demand encourages and challenges directors to exercise fully their creativity, without abdicating to the limitations imposed by the film rating systems, narrowly defined marketing objectives, and artificial time constraints. At the same time, content-on-demand is superior to any technology in automatically ensuring that viewers are not exposed to material they would have preferred not to view, and ensuring that children are not exposed to unsuitable viewing material. Freedom of expression need not be incompatible with freedom from expression.

Censoring technology, such as the "violence chip" that would scramble reception of the incoming picture, making it possible, for example, for parents to block reception of entire programs "deemed" violent is inferior in every respect to the content-on-demand architecture disclosed herein. The violence chip and similar technologies result from a broadcast and linear film architecture rather than a pointcast and variable content architecture. Broadcast technologies are conceptually obsolete in the pointcast era of video-on-demand technology.

Content-on-demand permits a parent or viewer to determine what is objectionable. Only objectionable segments are excluded and replaced with suitable parallel segments. The resulting video retains a seamless continuity.

While content-on-demand nonlinear architecture shares elements with interactive programming and facilitates the inclusion of the sophisticated interactive capabilities disclosed herein, content-on-demand, however, is uniquely distinguished from interactive programming by its "autoactive" design. Content-on-demand's autoactivity provides viewers precisely what they want, in the form that they want it, at the time they want it, without requiring that viewers interact with the video.

Content-on-demand abandons the concept of a video as a prepackaged viewing unit, and adopts the concept of a video as an assortment of individually selectable segments and scenes. Content-on-demand videos are in combination a powerful and rich "videobase" that makes possible a variety of innovative video services that educate, instruct, inform, and entertain.

The content-on-demand architecture applies as well to movies, news, sports, educational programming, and to advertisements. The advertisement embodiments of the teachings of content-on-demand results in advertisements, commercials, and informationals of greater value to the viewer and to the sponsor.

Specifically, with request to advertisements, the thesis is herein advanced that a viewer will request a specific advertisement which is informational in nature, presented in a manner consistent with the viewer's taste level, for a product or service for which the viewer has an interest. The viewing of the viewer requested advertisement may also be advantageously associated with a compensation to the viewer for the viewing of the advertisement.

The compensation for the viewing of the advertisement may take the form of a credit that subsidizes the costs of other video services the viewer obtains. The subsidizing of a video's cost to the viewer by advertisements, is more closely matched to the viewers interest in the subject of the commercial, and to the potential purchase by the viewer of that product or service.

Content-on-demand video services enhancements further provide for the automatic integration of the video and communication services delivered to a viewer. Specifically, during the viewing of a video, when a phone call, audio or audio/video, is received, the delivery of the video is automatically placed on hold (paused) in response to the viewer accepting the call. Upon completion of the call, the delivery of the video is automatically restarted at the point placed on hold, at some pre-defined amount of time prior to the placing on hold of the video, or at a suitable prior point in the video.

Where the video being delivered is a content-on-demand video, the video map identifies the beginning point of the segment in which the pause occurred, thus automatically identifying a suitable prior point in the video to restart the delivery of the video. By automatically replaying the segment in which the pause occurred, the viewer may re-engage the video without the loss of continuity.

Other integration features provide the display of information relating to the incoming call (data and image) on a window, without necessarily pausing the transmission of the video. On a pause of the video, the picture may be replaced with a blank screen, neutral image, or informational data. Where the communication is a video call, the screen image is replaced with that of the incoming call.

Where contact management software is available, the viewer is provided the opportunity to make such notations with respect to the call as may be required prior to the continuation of the delivery of the video.

These and other features, advantages, and objects of the present inventions, are apparent in the context of the detailed description of the inventions, accompanying drawings, and appended claims, that follows.

BRIEF DESCRIPTION OF THE DRAWINGS

FIGS. 1A, 1B, 1C, and 1D, are illustrations of segment descriptive structures;

FIG. 6A is a schematic detail of a video disc player's multiple reading units architecture;

FIG. 6B is a diagram representation of a video reading stream and transmission stream;

DESCRIPTION OF THE PREFERRED EMBODIMENT

Figure 2:
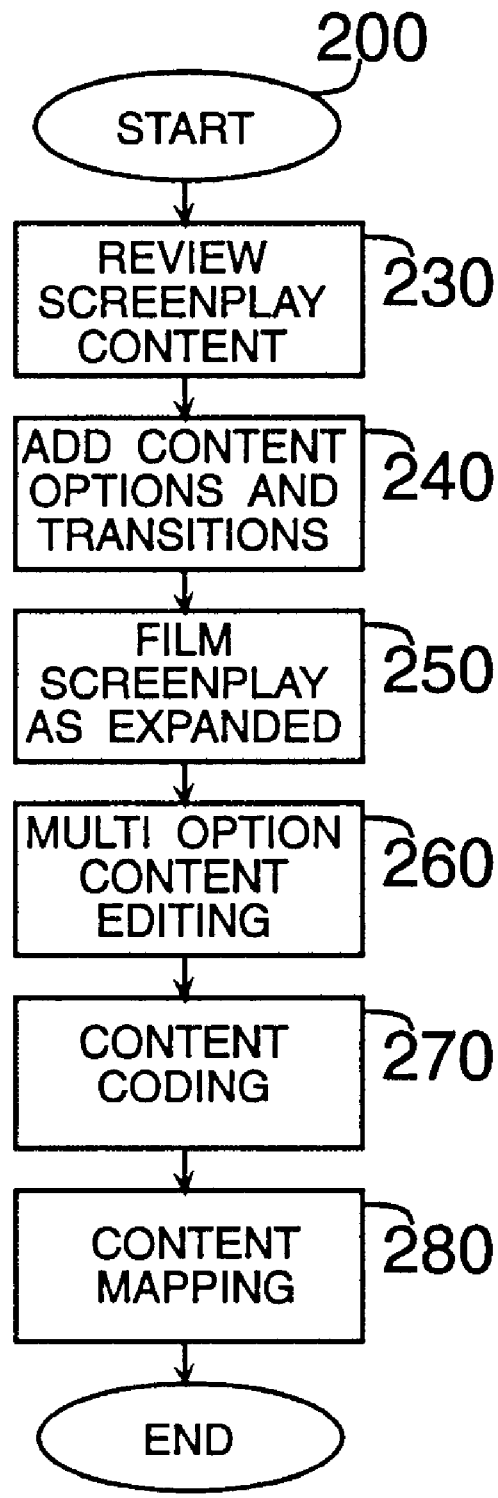
FIG. 2 is a flow chart summarizing the steps of producing a content-on-demand video.

For purposes of the present disclosure, various terms or nomenclature used in the art are defined as follows:

The term "viewer" as used herein is meant to include and be interchangeable with the words "player" (when referring to a person), "subscriber", and "user". That is, the term "viewer" is to be understood in the general sense of a person passively viewing a video, interactively playing a video game, retrieving video from a video provider, and/or actively using multi-media and communication services.

The terms "video", and "video program" are interchangeable and refer to any video image regardless of the source, motion, or technology implemented. A video comprises still characters, graphics, images, motion pictures, films, interactive electronic games, and multi-media productions; full motion pictures and television programming; news, sports, cultural, entertainment, commercial, advertisements, instructional, and educational programming. A video comprises audio.

Unless otherwise qualified to mean a computer software program, the term "program" is interchangeable and may be replaced with the word video. While a particular feature may be detailed with respect to a specified viewing, gaming, or computing application, it is intended herein to apply the teachings herein broadly and harmoniously across the different classes of applications that generate a video.

The terms "variable content video" and "variable content game" refer to a specific video characterized by a non-linear architecture resulting in a variety of possible logical content sequences. A "variable content video" and "content-on-demand video" not only comprises video/sound information, but also comprises a corresponding video map.

A "content-on-demand video" is a "variable content video" that comprises parallel, transitional, and overlapping segments to provide viewing of a program's story-line/interactive action at different levels of forms of expression with a greater seamless continuity among non-sequential segments. Additionally a content-on-demand video may include a user interface, software program routines, and system control codes. The term "segment" refers to a part of the video.

The term "seamless" is intended in the sense that the transmission of sequential and non-sequential frames is undiscernible to the eye, and not in the sense of the natural video seams that result in the intended changes from one scene to another, from one camera angle to the other, or from one gaming sequence to the other.

The term "content" refers principally to the form of expression rather than the story-line. The term "content preferences" refers, specifically and principally, although not exclusively, to a viewer's preferences as to the "content" of a video. Video content preferences refer generally to a viewer's clearly defined preferences for the form of expression, explicitness, and the absence of objectionable segments, rather than the overall subject matter of the video.

In the broadest sense, the term "content preferences" further includes "programming preferences" and "video preferences". Programming preferences and video preferences refer exclusively to a viewer's preferences as to specific videos (e.g Sega's "Sherlock Holmes Consulting Detective"), types of videos (e.g. interactive video detective games), broad subject matter of videos (e.g. mysteries), and/or time and date that the viewer desires to view the video. Programming and video preferences are directed at the selection of a specific program and not at defining the contents of a selected video.

The concept of a "video-on-demand system" refers to any pointcast capable video delivery system that provides a viewer-selected video at a viewer-selected time. Video-on-demand comprises for example movies-on-demand, video dialtone, cellular video, and digital satellite systems that are responsive to a viewer's video preferences.

The concept of a "content-on-demand system" refers to a video-on-demand system that is additionally responsive to a viewer's content preferences. A content-on-demand system and the delivery of content-on-demand video services is independent of the specific hardware and network infrastructure employed. A content-on-demand system not only permits a viewer to select a specific program, it also permits the viewer to receive a customized version of the program that is responsive to the viewer's content preferences.

The term "network" herein refers to any private or public, wired and non-wired video transmission infrastructure, such as may be provided by the utilization of one or a hybrid combination of the following: fiber optic, coaxial cable, twisted copper wire, cellular, radio, satellite, and/or other existing and/or forthcoming video transmission technologies. In the broadest sense, a network also comprises the utilization of, for example, the U.S. Postal Service to deliver Video CDs. The term "B-ISDN" herein refers in general to a network, and refers specifically to a broadband integrated services digital network utilizing fiber optic cable in its primary trunks.

Where not clearly and unambiguously inconsistent with the specific context, these and other terms defined herein are to be understood in the broadest possible sense permitted by these definitions.

Referring now in detail to the drawings wherein like parts are designated by like reference numerals, throughout, FIG. 1A illustrates an example of a segment descriptive structure utilized to review the contents of each segment of a video. Generally, a descriptive structure is a matrix of content categories and a corresponding coding scale utilized to assign a content code to a segment of a video. As is detailed below, the descriptive structures are not limited to the coding of possibly objectionable content material.

This particular segment descriptive structure 110 includes a number of content categories 111 that might apply to most films. This particular segment category descriptive structure includes, for example, a category for violence, and other categories of possibly objectionable content. The three digit category coding scheme provides for hundreds of different content categories.

The coding scale 112 mirrors the rating system utilized by the Motion Picture Association of America (General Audiences, Parental Guidance Suggested, Parents Strongly cautioned, Restricted, No Children Under 17 Admitted: G, PG, PG-13, R, and NC-17 respectively), but provides a more descriptive coding scale 112 for the structure, as shown. Each number 119 in the matrix represents a particular segment coding choice.

Referring now to FIG. 1B, the contents of a segment may be further analyzed with respect to a segment element descriptive structure 120. This structure provides for the coding of a segment with respect to the development of a number of elements 121 such as character, location, and time. This structure also provides for the coding of a segment with respect to the level of detail 122, and the level of expertise 123 that may be required by the segment. These elements are provided at a variety of levels, and a segment may be coded accordingly. The element descriptive structure 120 indicates that, for example, a segment's character development may range from none to extensive.

Referring to FIG. 1C, a separate segment inclusion descriptive structure 130 provides a coding scale to identify the degree of detail in a segment. In this structure 130, the segments may be coded according to the level of inclusion/exclusion 131 appropriate to the segment. The coding indicates if the segment is required for a highlight, summary, condensed, or detailed versions of the video. This descriptive structure is particularly directed to the coding of news videos and other programming where the length of the presentation can have great variation. In a similar manner, an individualized descriptive structure may be configured to address the specific requirements of one or a plurality of categories.

Additionally, or alternatively, a video segment descriptive structure, as shown in FIG. 1D, may be implemented that is not category specific. In this example, the segment generalized descriptive structure 140 incorporates the MPAA's movie rating system, whereby segments are assigned a code 141 (rating) from a coding scale incorporating the MPAA rating symbols. Determination of each segment's coding symbol is similar to the manner in which the MPAA rating system is applied to a motion picture. A number of other available rating systems may be implemented, including the rating system advanced by the Film Advisory Board.

Additionally, segment descriptive structures comprise the technical aspects in the video presentation. The technical aspects include, for example, the type and duration of transition effects utilized between segments, and the incidence of edit cuts and "image changes" within a predefined time period.

Music videos, for example, are characterized by a very high incidence of edit cuts and image changes. A viewer viewing a music video may prefer to define an incidence of image changes that differs in its apparent velocity from that of the tempo of the music. Similarly, the broadcasting of football games by major networks are also distinguished from less "director heavy" broadcasts by the incidence of image changes and camera angles. The transmission of sporting events also lend themselves to automatic customization responsive to a viewer's technical preferences as specified in the video content preferences.

FIGS. 1A, 1B, 1C and 1D are examples of an overall framework for segment analysis, the actual segment descriptive structure and complexity utilized may be highly tailored by the producer of a video to reflect the specific content of the video without being limited by the structures which may be found to be commonly utilized in other works. Each video producer is offered the flexibility within the overall architecture of this descriptive system to determine and include only those categories that may be relevant to a particular video, and to add categories as the producer requires. Similarly, the producer is offered some flexibility in determining the labelling of the coding scale.

Meeting the objectives of being able to provide both a standardized set of descriptive structures that will permit the automatic application of a viewer's content preferences to a variety of videos, and provide the producer of the video the flexibility described above, are accomplished by assigning unique category codes to each set of preestablished standardized content categories and by reserving a range of category codes that will be recognized by the system as requiring interactive input by the viewer. For example, category codes ending in 9, codes with a tens digit being a 9, and or codes from 900 to 999 ("producer code") are reserved as independent of the standard categories shown.

Producer codes signal to the system software to elicit the viewer content preferences. Similarly, as the coding scale is relative in structure, different descriptions for any category coding scale might be utilized without affecting the applicability of a preestablished viewer content preference for that category. In instances where a desired coding scale is not accommodated by the standardized structure supplied, the producer need only assign a producer code and build whatever scale he/she may deem desirable. A coding scale may range from a simple "Yes/No" to a sophisticated three dimensional representation.

Additionally, commands may be issued by software associated with the video to inhibit the application of a preestablished viewer content preferences and require the viewer to address the video's specific descriptive structure regardless of the category codes utilized.

In a preferred embodiment, each segment is additionally or alternatively analyzed as to subject matter and assigned the necessary keyword(s) to provide effective keyword retrieval and additional user viewing control capabilities. This will be of significant value in retrieving video segments from a video database ("videobase"), such as may be constructed from a collection of news or educational videos.

Keyword indexing of the segments provides the capability for inhibiting the viewing of undesirable subject matter, or assisting in the retrieval of desirable subject matter where the descriptive structure may not adequately cover a specified category or subject matter. For example, a viewer may not desire viewing scenes of a flag burning. Key word control would inhibit that scene or scenes from being viewed by that particular viewer. Alternatively, a key word search would permit a system user to efficiently retrieve all flag burning segments that may be included in the videobase.

It is noted that keywords are but one example of other descriptors that may be utilized to convey information as to the content of a video's segment.

The steps in the production of a content-on-demand video are summarized with respect to the simplified flow chart 200 of FIG. 2.

Each scene, segment, or fragment of a segment on a video script is reviewed 230 according to an appropriate video descriptive structure, as for example detailed with respect to FIGS. 1A–D. A screenwriter now has the freedom to expand the scenes 240 by adding parallel, overlapping, and transitional segments, to cover a wider range of expression without the concern for the limitations inherent in first generation linear programs.

A successful filming 250 of a content-on-demand video is a function of the skill of director(s), actors, animators, programmers, etc. to provide for parallel and transitional segments with the required transparent and seamless harmony.

In contrast to the editing of first generation motion pictures that require producing a unique linear sequence of segments, editing of this content-on-demand video format requires a parallel non-sequential logical arrangement of segments 260.

A segment assigned a content category code may be congruent in one or more frames with a segment assigned a different category code. Where necessary, a video segment is associated with more than one audio segment, and corresponding separate voice and video category codes are provided.

As each segment is defined, the beginning frame and end frame in each of the relevant segments are identified, and the segment is assigned a content category code and/or descriptor(s). A segment's content category code, keywords, and/or descriptor(s) are also referred to herein as a "descriptor". Once a segment is assigned a descriptor, logical entry and exit references are assigned 270. The resulting segment definitions are mapped 280 and the required user interface produced.

The video map, any user interface routines particular to the video, and player control codes, if required, are provided with the information comprising the program's video and sound.

Figure 3A:
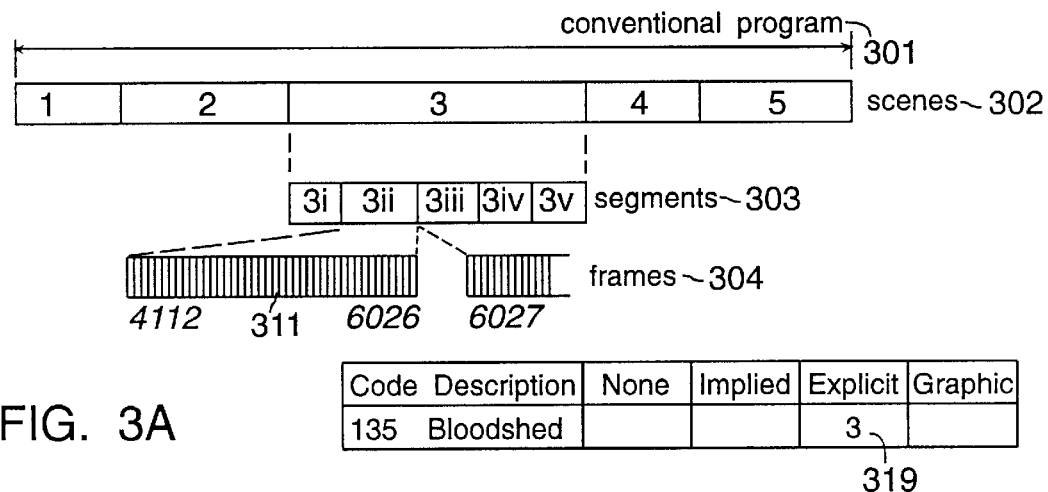
FIGS. 3A, 3B, and 3C, are diagrams of three versions of a video segment and corresponding content codes.

The video mapping of a content-on-demand video is further detailed with respect to FIGS. 3A, 3B, 3C, and 3D. FIG. 3A illustrates an example of a conventional motion picture program 301 in which the scenes 302 of the video are arranged as a unique sequential arrangement of frames 304.

In a content-on-demand video, the various scenes or chapters 302 of the video are divided into appropriate segments 303 according to an evaluation of the contents of the scenes or chapters. Each segment 303 is defined by a beginning and ending frame and comprises any number of frames 304. In this example, scene three is divided into four segments, in which segment 3*ii* 311 begins at frame 4112 and ends at frame 6026. The next segment, 3*iii*, begins at frame 6027. Segment 3*ii*, which in a conventional motion picture contributes to an "R" rating for the video, includes frames depicting explicit bloodshed. The content code of segment 3*ii* is indicated by the numeral 3 in the cell 319 of an appropriate descriptive structure.

Figure 3B:
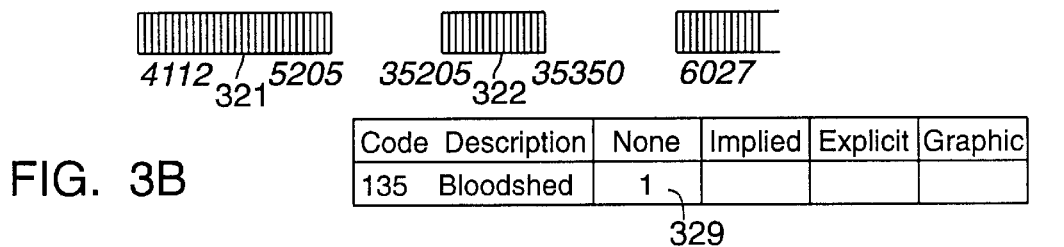

Referring now to FIG. 3B, to provide for the option of editing-out the explicit bloodshed in a content-on-demand video, the video segment map includes an additional segment definition 321 beginning at frame 4112 and ending at frame 5205. The end of this segment 321 is linked to a new transitional segment 322 beginning at frame 35205 and ending at 35350, the end of which is linked to frame 6027. In this fashion, frames are omitted and added to provide a continuous transparent edited version of any segment of a scene. This frame sequence 321/322 is associated with a corresponding content code 329 to indicate the absence of bloodshed.

In all other respects the segments 321/322 are equivalent to the original segment 311. That is, it transmits essentially the same information but at a different level of explicitness.

For conventional first generation videos, the editing process operates in a like manner, except that the transitional segment 322 is not available to make the continuous transmission from frame 5205 to 6027 seamless.

Figure 3C:
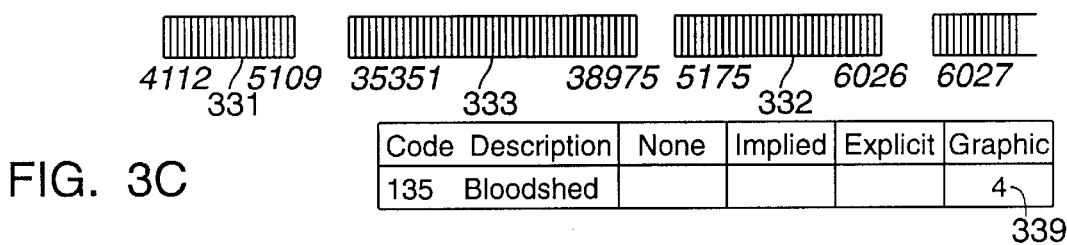

To provide for the option to include a graphic level of bloodshed, the video segment map includes an additional segment definition. Referring to FIG. 3C, in this case, only 66 frames of the "first" segment 311 are "ignored", and new segment definitions 331 and 332 are created. Segment definitions 331 and 332 accommodate the graphic bloodshed included in an additional segment 333 beginning at frame 35351 and ending at frame 38975. This frame sequence or segment definition 331/333/332 is associated with an appropriate content code 339 indicating the graphic content of this sequence.

In this manner, parallel and transitional segments provide a descriptive selection mix ranging from a segment combination excluding bloodshed 321/322 to a segment combination including graphic bloodshed 331/333/332, as well as the segment combination including explicit bloodshed 311. As a result, the particular scene of which these segments are a part can be viewed at any of the three content levels for that category.

A scene may include subject matter of more than one category. In such cases, overlapping segments and transitional segments are provided to permit viewing of one subject matter at one content level and viewing of another subject matter at another level.

Figure 3D:
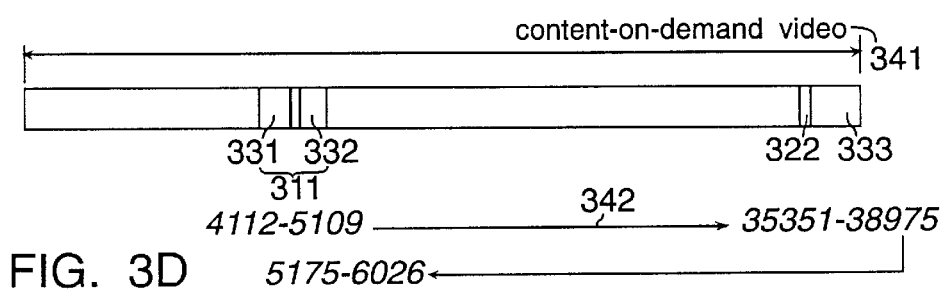
FIG. 3D is a diagram illustrating the resulting sequential and non-sequential random-like arrangement of video segments in a content-on-demand video.

Referring now to FIG. 3D, the location of the net additional frames that result from the additional segments cause some frames to be non-sequentially placed in a content-on-demand video 341. FIG. 3D is illustrated to diagrammatically emphasize the resulting sequential and non-sequential random-like arrangement of video segments in a content-on-demand video. This is shown for example, in the segment definition 331/333/332 depicting explicit bloodshed and the corresponding non-sequential frame sequence 342.

A video segment map then is the combination of the various segment definitions in a video. In the above example the video map would provide the following information: 4112–5109|35351–38975|5175–6026,135-4, 6027; 4112–6026, 135-3, 6027; 4112–5205|35205–35350, 135-1, 6027. This map would enable, for example, to automatically retrieve the segment defined by frames 4112–5109, followed by segment defined by frames 353514–38975, and followed by the segment defined by frames 5175–6026 in response to a viewer's preference for a graphic level of violence (135-4).

It is noted that, for simplicity of presentation, in each of the segment definitions above, the next logical segment is the same, namely the segment beginning with frame 6027. As suggested earlier, this need not be the case.

A video having a video frame identified by number 5100 and a video frame identified by number 5200, need not have video frames identified by numbers 5101 to 5199. It is also noted that segment definitions need not be based on frame numbers, any timing or logging format that defines the video material may instead or in addition be utilized. The segment definitions may be dynamic and can be automatically redefined or renumbered as a particular system or platform requires.

The exact physical location of a segment is a function of the hardware and software of the host media. Portability of a video segment map among platforms may be facilitated by a proprietary standard or by commercial tools. To that extent, the teachings of Avid Technology, Inc.'s "OMF Interchange Specification" are incorporated by reference.

A purpose of the video segment map is to provide a relationship among video segments and define the contents of segments. A video segment map is analogous to a street map of a city. It does not provide instructions on how the video segments are to be played. As in a street map, where instructions follow the identification of a destination, in a content-on-demand video the instructions of how the video segments are played result from the application of a viewer's content preferences to the video segment map.

The editing of a content-on-demand video is distinguished from the editing of an interactive motion picture. In an interactive motion picture, the editor is concerned with a branching storyline. In editing a content-on-demand video, the editor is principally concerned with optional forms of expression and levels of explicitness in the story-line regardless of whether the story line is linear or branching, and whether the viewing is interactive or not interactive.

It should be appreciated that the art of video editing under this new format is intended to significantly transfer censorship, and time-constrained editing decision making from the producer and/or editor to the viewer. Thus the video editor is concerned with maximizing the content range of the video produced to permit the creation of a greater number of versions of a video and thus appeal to a wider audience.

The complexity of a content-on-demand program/game is only limited by the requirements, desires, skill, hardware/software, and resources available to the video editor. To that extent, it is intended that the editing functions, in particular, be assisted by integrated computerized editing resources.

A content-on-demand video editing system is in terms of hardware and underlying operating software not significantly different from a number of nonlinear editing systems that are available such as Avid Technology Inc's "Media Composer 8000" and "Film Composer", ImMIX "VideoCube", Data Translation's "Media 100"; and digital audio editing systems such as "Avid's Audio Vision" (tm). The teachings of these systems as well as the teachings of the patents to Kroon et al., U.S. Pat. No. 4,449,198, to Bohrman, U.S. Pat. No. 5,109,482, and to Westland et al., U.S. Pat. No. 4,979,050, are incorporated by reference herein. A set of U.S. Patents assigned to Avid Technology, Inc., the teachings of which are incorporated by reference herein, provide additional specification.

The Media Composer 8000 utilizes a Quadra 950/28 MB based high performance personal computer system including: audio converter and co-processor board, video RAM and co-processor board, video slave driver, enhancement board, black burst generator, effects module, compression hardware, SCSI II board, deck control, high capacity magnetic drives, modem, speakers, two 20" color monitors, keyboard, mouse, manual user interface, cables and power strip.

The editing software of these systems is principally directed at facilitating the editing of video material and the creation of special effects. To that extent, the software and user interface is similar to that required in a content-on-demand editing system. However, a content-on-demand editing system is significantly and conceptually distinguished from the prior art by the methods and software routines associated with the production of a video segment map.

In prior art nonlinear editing systems, the editor utilizes the editing system to create a video comprising a linear sequence of frames. That is, in spite of sophisticated video effects, the end product of these advanced nonlinear editing systems is a video of quite conventional linear characteristics. Certain editing systems output an edit decision list or a negative cut list utilized to assemble the negatives of a film in a conventional manner. When the editor produces more than one linear version of a video, each version is complete in itself.

In a content-on-demand editing system the end product of the editing process is a nonlinear videobase comprising a video map that identifies the content and well as the location of segments. The video map is not directed towards producing a single linear version but towards the plurality of versions that the permutation of a plurality of content categories and coding levels makes possible.

It should be appreciated that in the production of a content-on-demand video, the task of the editor is to create a videobase of logically organized video segments. The logical organization being the video map. Thus, in a content-on-demand nonlinear editing system, conventional editing software is enhanced to facilitate the creation of the video map.

Figure 3E:
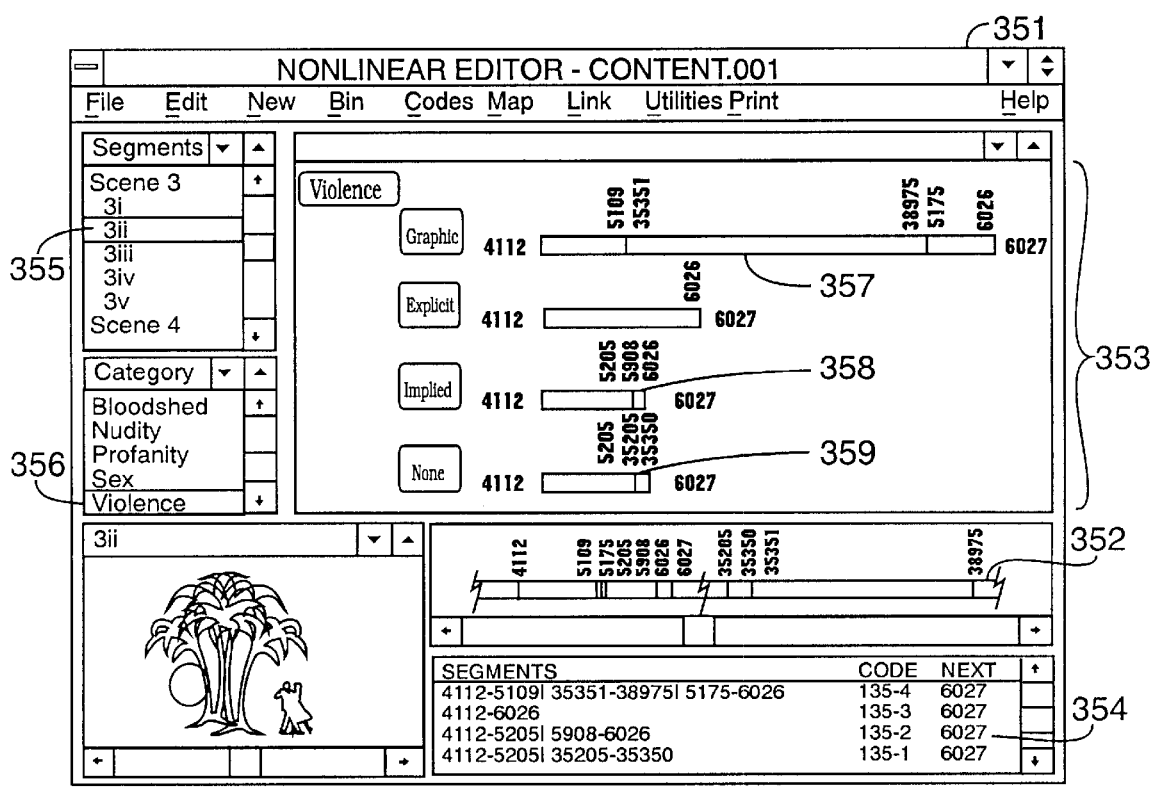
FIG. 3E is an illustration of a video editing screen in a nonlinear editing system.

FIG. 3E is a representation of an editing screen 351 displayed in a content-on-demand nonlinear editing system. This particular screen identifies the video material 352 available to create the various versions 353 of a segment, and the resulting map 354. An editor selects a particular scene and segment to edit 355, identifies the video and audio material corresponding to that segment 352, identifies the content category 356 for the segment, and proceeds to edit a segment 357. Normally the editor will begin editing a segment for the most explicit level that the editor desires to produce.

The editing of a particular segment at a given content code is executed in a manner similar to that available in other nonlinear editing systems. In this case, however, the frames are dropped in the applicable predefined or editor defined content code level. In this example, the editor is first producing a segment 357 at a graphic level of violence.

If the editor wishes to produce versions of the segment at different levels of explicitness, the editor may repeat the process above. Alternatively, the editor may copy an edited segment 358, and paste it to a different content code level 359. The editor then may edit out material inconsistent with the coding level, and add parallel and transitional material that may be required.

As the editing is being accomplished, the software composes the map 354, which may be directly accessed and edited by the editor. When completed, the map may be automatically keyed to accommodate the requirements of the particular device to which the video is to be downloaded, for example to a video disc and/or to a video server.

It is noted that an editing system usually comprises more than one monitor, and that windows may be arranged by the user as the user prefers. The screen illustrated in FIG. 3E shows some, but clearly not all of the tools that may be made available.

The following details methods and means of continuing the transmission of the audio component of a video when the transmission of the video component has been paused, speeded up, or slowed down.

Conventionally, when a video is paused, the last image of the video may be continued to be transmitted to the television but the audio is stopped. When video and audio are synchronized in a video, there are no provisions for the continuation of audio transmission when the video segment is paused or frozen.

Similarly, when the speed of the video is altered from its normal transmission speed, if the audio is continued to be transmitted, its transmission is also altered or stopped. The alteration of the audio from a normal speed is seldom of value to the viewer.

In the transmission of content-on-demand videos, whether primarily non-interactive as for example a motion picture, or primarily interactive as for example an advertisement, whether retrieved from a video server or from a Video CD, the viewer is provided complete control over the transmission of the video. That control comprises pausing the video or altering the transmission speed. In such instances, operating routines provide for the continuation of the transmission of an audio element at normal speed.

For purposes of the present disclosure, the audio component of a video is defined to consist of an active element and a passive element. The active or foreground element is that portion of an audio that is frame sensitive, as for example speech or the sound emitted by an explosion. The passive or background element is that portion of an audio that is not frame sensitive, as for example background music or traffic sounds.

The background element of an audio provides the audio than can be continued over a certain period of time and still match the video component. For example, where the video is of birds singing, the viewer may elect to freeze the image, the song of that particular bird and the background sounds are continued. When the video transmission is restored, the video and audio components are re-synchronized and transmitted in a conventional manner. Alternatively, the audio component eventually catches up to the video at a normal transition point where both the video and audio components are re-synchronized and transmitted in a conventional manner.

In instances where the pause of the video is longer than the forward audio-stream that applies to the paused video image, the audio retrieval loops back to the audio stream at the beginning or other point of the segment in which the pause occurred, or to the point in which the pause occurred. In a preferred embodiment, the audio editing will provide for the seamless looping of the audio. That is, at some point in the particular audio segment, a seamless linkage is provided to a previous point in the audio segment. The linkage produces a continuous audio loop. To the listener, the audio, while repeating itself, will appear as a continuous stream.

It is noted that the teachings herein apply as well to slow motion video. In that case, the background audio stream is played at normal speed, while the video stream is slowed down. The buffering and multiple read architecture detailed herein provide, for example, the required hardware capability.

Alternatively, or in addition to the retrieval of the audio directly associated with the video, a separately stored plurality of audio segments may be provided. These separate audio segments are specifically intended to provide the audio required by a video segment when paused or the transmission speed is altered.

An active audio element may be provided that is responsive to the specific place where the video was paused. For example, during the viewing of an advertisement for an automobile, the viewer may pause the video when the dashboard instrumentation is shown. At that moment the passive audio element (music) continues to be transmitted, the active audio element (general voice comments) is replaced by a frame specific active audio element (instrumentation voice comments).

In instances where the transmission of the foreground audio element is discontinued, the volume of the background audio element may be augmented to the level that had been provided by the foreground audio element.

The audio requirements herein may be satisfied by a plurality of architectures. The audio elements may be implemented as separate channels, tracks, or audio streams. A video's audio is provided in a manner that permits extracting the various audio elements. The audio elements are further coded to permit satisfying the stereo or surround sound requirements. Different elements from the various audio streams or tracks are combined in realtime to create the desired audio effects. What is suggested here, is that the audio elements that are present, for example, in a performance of a fifty member orchestra, are individually controllable, and interactively or non-interactively any combination of those elements may be generated.

The teachings disclosed herein with respect to the seamless transmission of video are applied here to provide a seamless audio transmission of non-sequential audio elements.

Advantageously, the nonlinear editing system detailed herein, optionally provides, as per the teachings herein, the audio associated with the video being edited, while the video is being edited. In this fashion the editor, has the benefit of the tempo of the background music or sound while editing a scene. This will provide for greater integration of audio and video material.

This method is particularly useful in the editing of a music video, where the edited audio stream is the constant to which the video segments are applied.

Figure 3F:
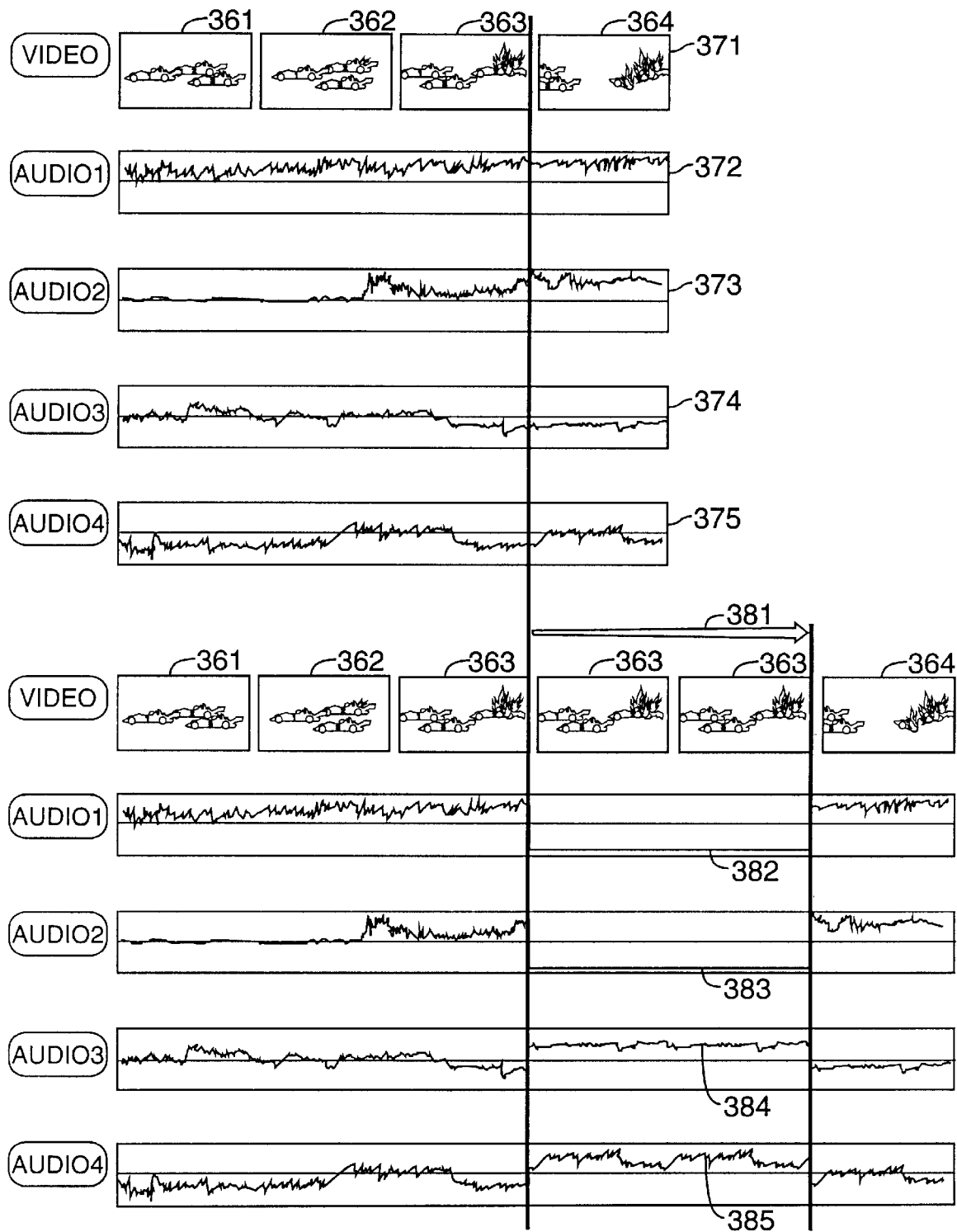
FIG. 3F is an illustration of the utilization of foreground and background audio to provide audio during a video pause.

FIG. 3F is an illustration of the utilization of foreground and background audio to provide audio during a video pause. The top half of the FIG. is a representation of a full motion video stream 371, and four audio streams 372–375 played without interruption. The bottom half of the FIGURE is a representation of the same full motion video stream and audio stream played with a video pause.

In this example, the video is that of an automobile race. Four frames, representing segments 361–364 of video stream 371 are shown. AUDIO1 372 is sound from the voice of the commentators. AUDIO2 373 transports frame specific sounds or foreground audio. AUDIO3 374 represents a first background audio stream, in this case the sound from the automobiles engines. AUDIO4 375 represents a second background audio stream, in this case the sound from the audience.

In the second segment 362 of the video stream 371, the engine of one of the automobiles explodes. This is illustrated in the representations of both the AUDIO2 373 and AUDIO4 375 streams.

In the third segment 363, the explosion becomes visually more evident. In the fourth segment 364, the affected automobile is shown breaking apart.

In this example, the viewer elects during the transmission of the third segment 363 to pause or freeze 381 the video stream 371. During the duration of the pause 381 of the video segment, audio is not provided by either the AUDIO1 382 or the AUDIO2 383 streams. During the pause, AUDIO1 and AUDIO2 are dropped off.

Audio during this pause 381 is provided by the AUDIO3 384 and AUDIO4 385 streams of the fourth segment 364. As is illustrated, the background audio segments 384-385 are looped to provide sufficient audio during the video pause 381. The volume of the background audio 384-385, now in the foreground is automatically increased to an appropriate level.

Upon the viewer causing the video transmission to resume, the fourth segment 364 is transmitted together with the audio from the re-synchronized audio streams 372–375.

A video delivery system embodying the teachings of the content-on-demand architecture provides each viewer the opportunity to define their video content preferences. A viewer's content preferences identifies each viewer's preferences in a range of video content categories. The design of a viewer's content preferences eliciting routines is responsive to the content descriptive structures. As is detailed below, the content preferences are established or captured prior to a transmission of a video to a viewer's receiver, or immediately in advance of the transmission of a selected video, so that during the transmission of the video, viewer intervention is not required.

Figure 4A:
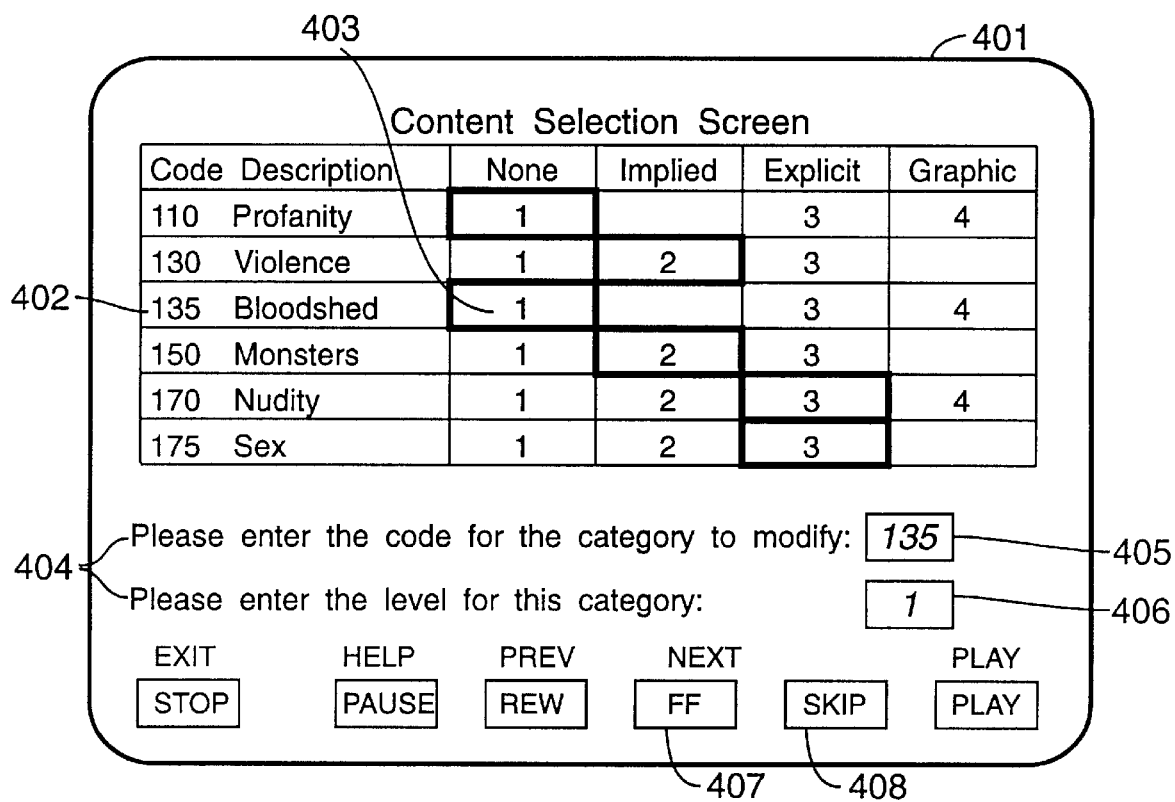
FIGS. 4A, 4B, and 4C, are examples of a viewer content preference selection screen.

FIG. 4A illustrates a viewer's content preferences selection screen 401 specific to the content of a selected video. In this example the viewer is provided the opportunity to establish the level of explicitness in a number of different content categories 402. Depicted by bold boxes 403 is the viewer selected level for each category. The viewer in this case has elected to omit bloodshed 403 in his/her viewing of the video.

In this particular viewer interface, viewers indicate their selections by following the entry requests 404. A variety of means, such as keys on a remote control, are provided for the viewer to indicate the category they wish to access 405 and the viewing level for the category 406.

Also illustrated in FIG. 4A is the labelling of the conventional function keys 407 of the devise in synchronization with the screen display. Once the screen is exited, the function keys provide conventional VCR type control over the playing of the video. Additionally as is suggested by the "Skip" key 408, functions are provided that utilize the video map capabilities.

Figure 4B:
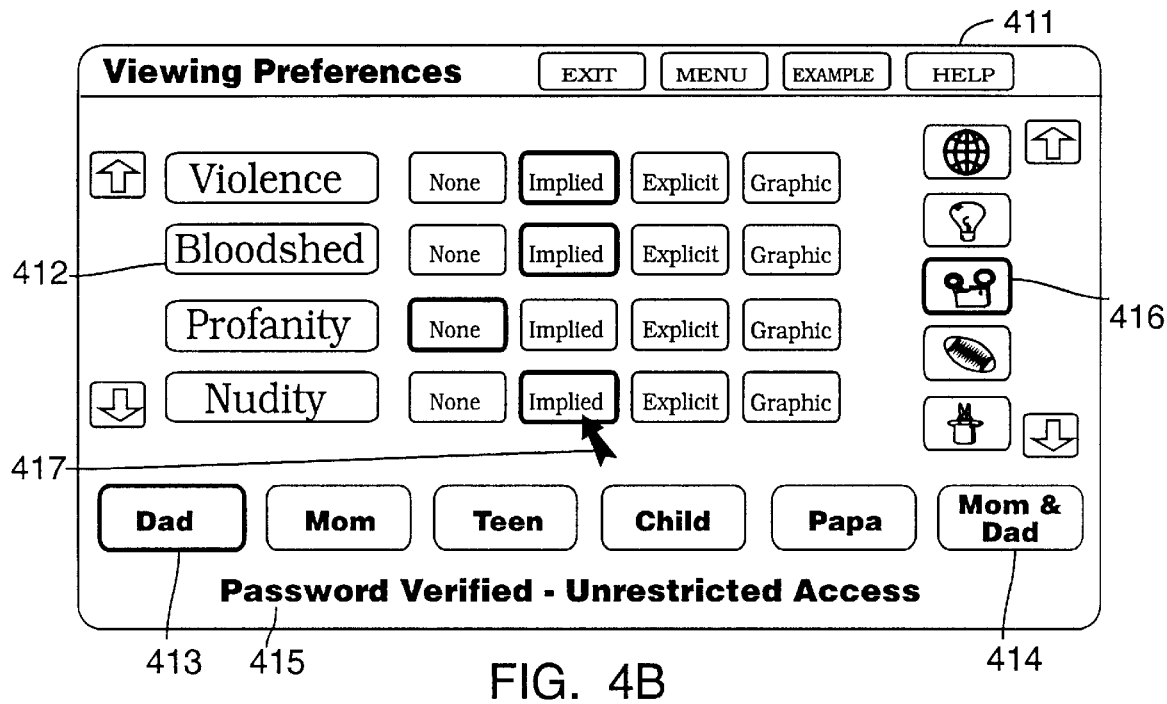

FIG. 4B illustrates one of a plurality of alternative content selection screens 411. This particular screen would be used to initially establish all the users and their content preferences. As in the previous example, the viewer is provided the opportunity to select the level of explicitness in a number of different content categories 412.

The screen also illustrates other options available to the viewer. For example, the option is provided to assign each viewer 413 or combination of viewers 414 in a household individualized content preferences. Access to the system resources and the establishment of the content preferences are access protected 415. Further, while a viewer may establish a single content preference table to serve, for example, both games and motion picture applications, a viewer may assign a different set of content preference to different categories of videos 416.

In this particular screen design, viewers indicate their selections by the use of a pointing 417 device such as an infrared mouse.

It should be noted that the teachings above are not confined to content-on-demand motion pictures, clearly the teachings are applicable to any video. Specifically, interactive video games utilizing full motion video segments can also benefit from providing the viewer/player of the game the option to preestablish video content preferences in addition to the gaming options which may be included in the video game software. As in a variable content film, in a interactive content-on-demand video game, the video segments shown are consistent with the player's video content preferences.

Figure 4C:
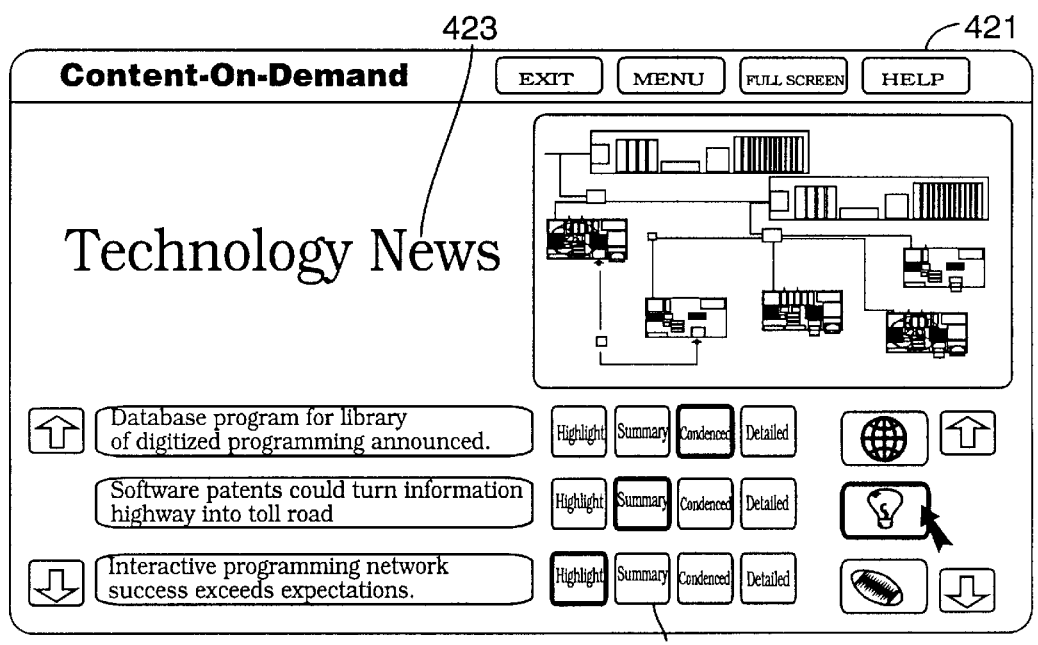

FIG. 4C illustrates one of a plurality of video specific selection screens. This particular screen 421 is tailored for the retrieval of news programming. In this case, the viewer is provided the opportunity to select the level of detail 422 that the viewer desires in each of a number of news stories.

The requirements specified by this screen may be set by the viewer to be responsive to the viewer's content preferences as defined with the use of, for example, the previous screen. Additionally, the stories themselves may be automatically selected in response to the viewer's preestablished specific news category preferences. In this example the viewer had previously indicated a preference for technology related news 423.

FIGS. 4D, 4E, 4F and 4G, is an example of a set of viewer screens utilized in the retrieval of a video. The set of screens are drawn with an aspect ratio of 1.33 rather than the HDTV aspect ratio of some of the other previously illustrated screens. The screen set is intentionally designed to have a simple and consistent "look and feel".

The functions of the system are accessed by three commands and ten single digit numerals. This permits viewer access by means of current voice recognition technology or the keys available in most remote control devices.

Figure 4D:
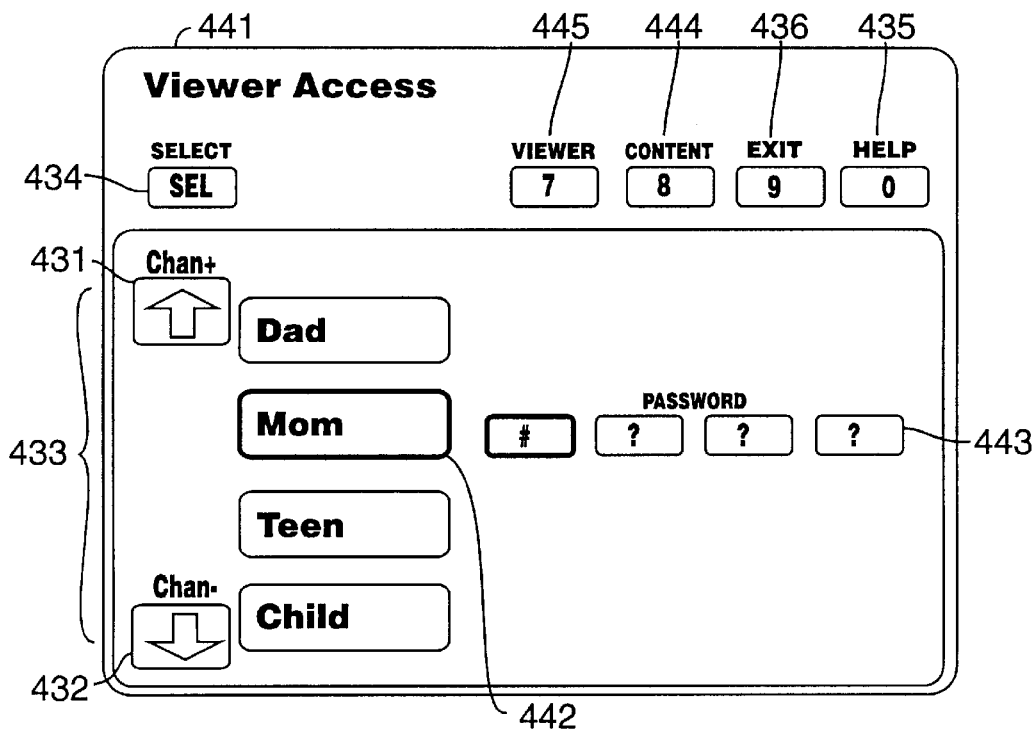
FIGS. 4D, 4E, 4F and 4G, is an example of a set of viewer screens utilized in the retrieval of a video.
Figure 4E:
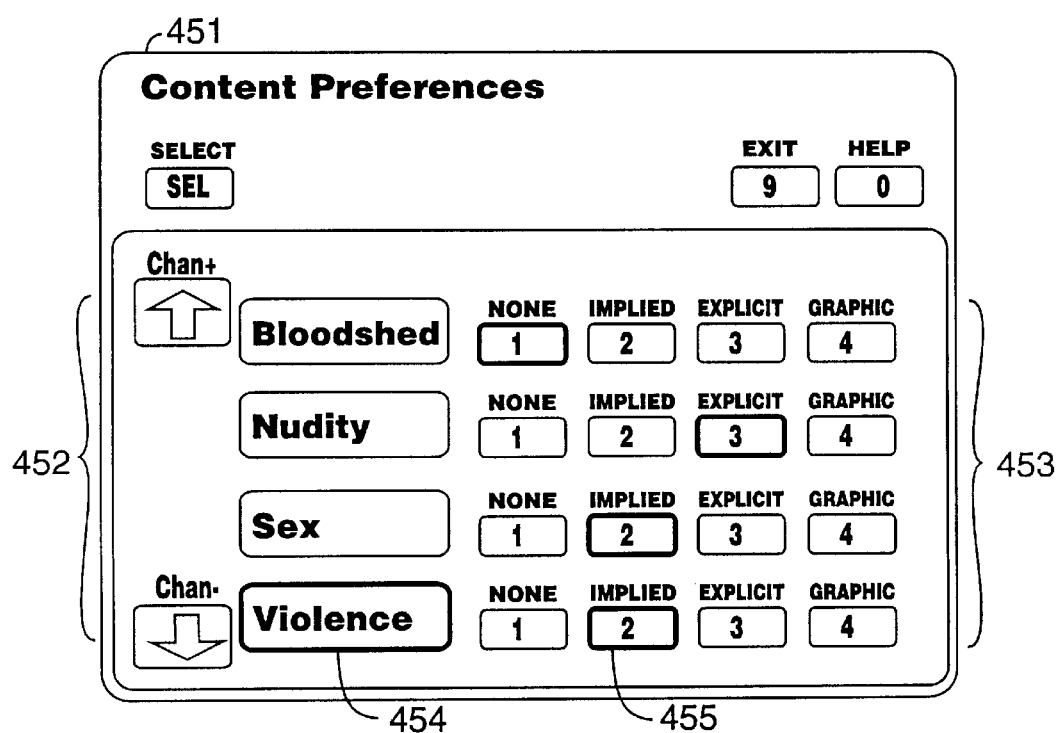

It is intended that in those instances where a remote control device is utilized, the key configuration and labelling will reflect the teachings herein. Nonetheless, the description that follows with respect to FIGS. 4D-4E are in terms of the three function keys and a numeric key pad available in ordinary remote control devices. In this particular embodiment, the Chan+ (channel change up), Chan− (channel change down), SEL (select key), and the numeric keys are utilized.

The screens inform the user which key is required for a particular function. The Chan+ 431 and Chan− 432 keys are utilized to scroll through the available selections 433. When a particular highlighted selection is desired, the SEL key 434 is utilized. The available selection are retrieved from a dynamic relational database.

Numeric keys are assigned various functions. For example, the 0 key 435 is utilized to access a help screen, and the 9 key 436 is utilized to return to a previous screen if available or to exit.

Referring now to FIG. 4D, in instances were viewer control is enabled, that is at least one viewer has controlled access to the video services, the viewer access screen 441 is presented to the viewer. In the viewer access screen 441 as in the other screens, the Chan+ 431 and Chan− 432 keys are utilized to scroll through the available selections 433. In this screen, the selections 433 identify each of the various viewers in a household. If Mom is the viewer, she would cause the highlighting of the Mom label 442 and depress the SEL key 434.

In this example access to the video services associated with Mom is password protected. Therefore, a password entry routine is displayed 443 upon the pressing of the SEL key 434.

While a viewer label is highlighted, the content preference screen may be retrieved by pressing the 8 key 444. If access to that viewer's content preference screen is password protected than the password entry routine 443 is also displayed.

A parent wishing to modify a child's content preferences, would highlight the child label, press the 8 key, upon which the system requires the entry of the parent's password. A child wishing to use the system would highlight the child label and press the SEL key. A password need not be required to access the video services that have been preestablished by the parent for the child.

To add or modify viewer's, the 7 key 445 provides access to the viewer maintenance screen. To personalize the viewer labels, the numeric key pad may be utilized as is practiced in the art to create an alpha character string. Alternatively, a selection listing provides the letters of the alphabet and/or a list of common first names and labels.

FIG. 4E illustrates a viewer's content preferences selection screen 451. In a manner similar to that detailed with respect to FIG. 4D, the viewer is provided the opportunity to select the level of explicitness in a number of different content categories 452. To select the level of explicitness, the viewer highlights the desired content category 452, and presses the numeric key corresponding to the desired level of explicitness or detail. For example, highlighting the violence label 454 and pressing the 2 key prevents the display of explicit or graphic violence. Depicted by bold boxes 455 is the viewer selected level of explicitness or detail for each category.

Figure 4F:
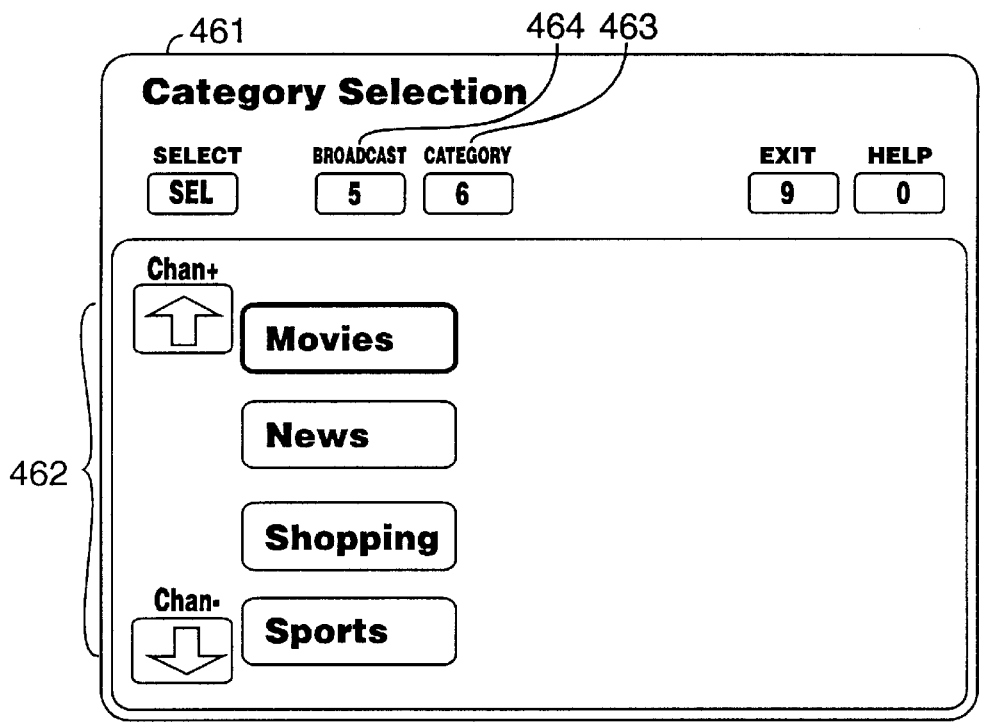
Figure 4G:
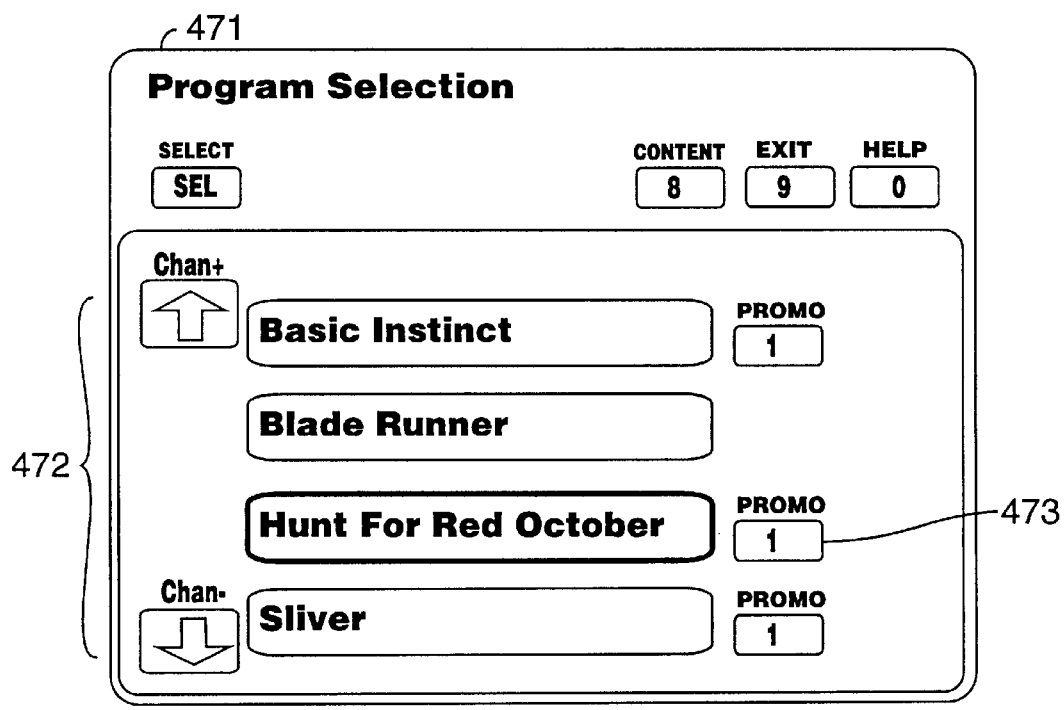

FIG. 4F illustrates a category selection screen 461. The listed categories 462 are responsive to the viewer being served. The category selections 462 may be modified by pressing the 6 key 463, which provides access to the category inclusion screen. The category inclusion screen is similar to the category selection screen but list all the available categories indicating which are included and which are excluded. The numeric key pad is utilized to change the category status. Access to the category inclusion screen is also password protected.

It is intended that the teachings herein are integrated with broadcasts video services available to the viewer. This is represented by the 5 key 464 that causes the system to provide broadcast services.

FIG. 4E illustrates a program selection screen 471. The programs selection 472 is responsive to the category previously selected. Where available, the viewer may obtain a promotional clip or summary by highlighting the desired program and pressing the one key 473.

This screen also provides access to the content preferences screen. In this case, the screen is preceded by a password request if not already established, and a request to the viewer to indicate if the content preference changes are program specific or not.

The viewer interface above detailed resides in a viewer's Random Access Video Technologies device ("RAViT"). A RAViT permits the viewer to retrieve content-on-demand videos and other services from media locally accessible or within the RAViT, or from a remote video services provider.

At the outset, it is emphasized that, in certain embodiments, a RAViT may be made available to a viewer that is as simple as a cable converter box capable of retrieving video-on-demand services from a remote video services provider. The RAViT configuration detailed below with respect to FIG. 5 integrates the capabilities of a "cable converter box" and a multimedia personal computer with B-ISDN communications capabilities. It is also noted that a preferred configuration of RAViT comprises all the elements of the nonlinear editing system previously detailed, with the additional advantage of a superior communications interface. As is suggested by, for example, the patent to Lang, U.S. Pat. No. 5,057,932, incorporated by reference herein, a variety a RAViT configurations are possible.

A fully featured RAViT 500 comprises the following primary modules and sub-systems: i) random access video/data disc module 501; ii) communications module 502; iii) fixed storage sub-system 503; iv) removable storage sub-system 504; v) compact portable storage sub-system 505; vi) external video/sound input/output support module 506; vii) multi-user modules 507; and viii) multi-services modules 508.

The communications module 502 may be as simple as a modem card or device or as sophisticated as may be required by a direct fiber optic access to a remote video and communication services provider. The communications module may support a plurality and variety of cabling connections such as fiber optic cable, coaxial cable, and twisted pair copper wire, and the cabling required to access a variety of B-ISDN networks. Additionally, the communications module supports a plurality of competing broadcasts and point-cast video delivery systems. In this fashion by merely depressing the appropriate keys in a remote control device a viewer can easily switch between off the air transmissions and online services.

By this method a video services provider can satisfy the requirements of providing access to broadcasts programming without necessarily utilizing system capacity. In such instances RAViT may be connected to a local receiving means. The receiving means may be, for a example, an indoor antenna, an outdoor antenna, or an existing system that may serve as an antenna such as the electrical system.

The fixed memory sub-system 503 refers to any non-volatile memory storage device principally utilized to randomly read/write and store significant quantities of information. An example of a fixed memory storage sub-system is a personal computer's hard disk drive.

The removable memory sub-system 504 refers to any non-volatile memory storage device principally utilized to transport information to and from two similarly equipped devices. Examples of removable memory storage sub-systems are personal computer floppy disk drives, micro disk drives, backup tape drives, and removable hard disks. The random access laser disc module 501 is another example of a removable storage sub-system.

The compact portable storage sub-system 505 and user access media 555 is principally distinguished from a removable storage sub-system 504 by the size of the media and the greater variety of memory storage technologies that are generally implemented. Nonetheless, some of the removable storage media, such as for example a micro disk, are also considered user access media 555. With present technology, user access media is available in dimensions similar to conventional credit cards. Examples of other removable storage media and user access media 555 are: laser read/write cards, in which at least one surface of the card permits a laser to read/write information; electronic cards, in which the information is stored in electronic components; magnetic cards embodying magnetic storage technology, of which a credit card is an example, electronic cartridges commonly utilized in electronic video game systems, smart cards, and PCMCIA cards.

Clearly, a variety of memory devices are available utilizing technologies and combinations of technologies to suit particular performance requirements. The above classifications of the memory devices are directed at bringing attention to functional capabilities of a RAViT rather than to a particular technology. The classifications are not intended to restrict a sub-system to a particular classification, limit the selection of sub-systems which may be implemented, or to limit the function of the particular sub-system implemented.

It is intended that a full featured RAViT additionally "play" other laser readable media, such as for example current laser discs, CDs, CDGs, photo CDs, and interactive videos and games, in a conventional manner. This being diagrammatically shown in FIG. as the five circles inside the representation of the video/data disc unit 501. In this context, it is also noted that the multimedia capabilities in RAViT in combination with its ability to extract video/sound/data from these sources offers the user sophisticated CD-ROM capabilities and interactive full motion video gaming capabilities. As to the latter, RAViT's hardware configuration detailed herein is significantly more capable than interactive CD-based video games, such as for example Sega's CD ROM System for Genesis.

In a preferred embodiment, RAViT is a fully integrated viewing/gaming/computing video system. To that extent and given the other teachings that follow herein, RAViT's laser disc module will operate at the required rotational rate to accommodate differences in software rpm requirements which is analogous to the different available speeds in a record player. The laser disc module as suggested by the illustration accommodates a variety of laser readable formats.

The external video/sound input/output support module 506 supports video/sound/data transmission to the primary video display system comprising, for example, a monitor/television, stereo system, and keyboard/voice recognition-response. Additionally, the input/output module supports video/sound input from local sources such as for example VCR's, video cameras, and videophones. The construction of the external support module follows the conventional practices of consumer electronic products as for example: laser disc players, VCRs, and personal computers.

Multi-user modules 507 principally support separate controlled independent access by other users of RAViT's processing, video, and communications resources. A multi-user operating system such as for example a version of Unix or Windows NT, manage the multi-user environment. The construction of multi-user modules following established networking technologies and responsive to the operating system is implemented.

Multi-services modules 508 provide a host of services, such as for example residential security, and appliance operation management. The operation of the module being principally a software application running under the multi-user operating system implemented. The construction of the particular multi-service module being responsive to the particular application. Example of a primitive multi-service module is a fax/modem pc card.

RAViT further comprises computing elements and video processing elements readily found in multimedia devices and video electronic systems such as, for example and not limited thereto: i) microprocessor 511; ii) memory units 512; iii) video processor 513; and iv) video buffers 514.

The video sound module or board 506 and the video processor 513 comprise compression-decompression technologies to both retrieve and decompress videos and compress and transmit videos.

The compression technologies may include hardware, firmware, software, or any combination of these. One or a plurality of existing and forthcoming video compression systems may be implemented such as for example: Motion-JPEG, MPEG 1, MPEG 2, Fractals, and Wavelets.

RAViT's user control interface 531 includes communications to the buttons and keys located on the cabinet of the device, and to the associated control devices 541-542-543. The keys, buttons, and switches, conventionally found in consumer electronic devices and deemed advantageous to the operation of RAViT are implemented. These controls are further augmented by a plurality of function comprising: segment skipping control, magnification controls, content preferences control, segment mapping control, and system menu control. The user control interface 531 additionally supports infrared remote control units 541, as for example infrared numeric control pad, and infrared keyboard; wire connected control units 542, as for example cable connected computer keyboard, mouse, and game controller; and a voice recognition unit 543.

The keyboard, similar to a personal computer implementation, facilitates system setup, keyword retrieval, and system functions requiring the entry of alpha characters. Since a preferred configuration of RAViT comprises significant multimedia capabilities, a keyboard is advantageous. A keyboard connector used to connect a standard AT keyboard or a dedicated keyboard is supplied. Alternatively, an infrared-based keyboard is implemented. Further, given the computing and storage capabilities of RAViT, a voice response sub-system option accommodating minimally the few commands, such as play, stop, mute, sound, skip, required to control the basic operation of the video disc module can additionally be provided.

Implemented in RAViT is a digital system status display subsystem 532, which provides visual feedback and system status information.

RAViT's control programs that manage RAViT's resources, and the retrieval and processing of data and video information, reside in dedicated chips 521. Alternatively, the control programs are stored in mass memory devices 503 from installed software, in removable memory media 504, or in an user access media 555.

Figure 5:
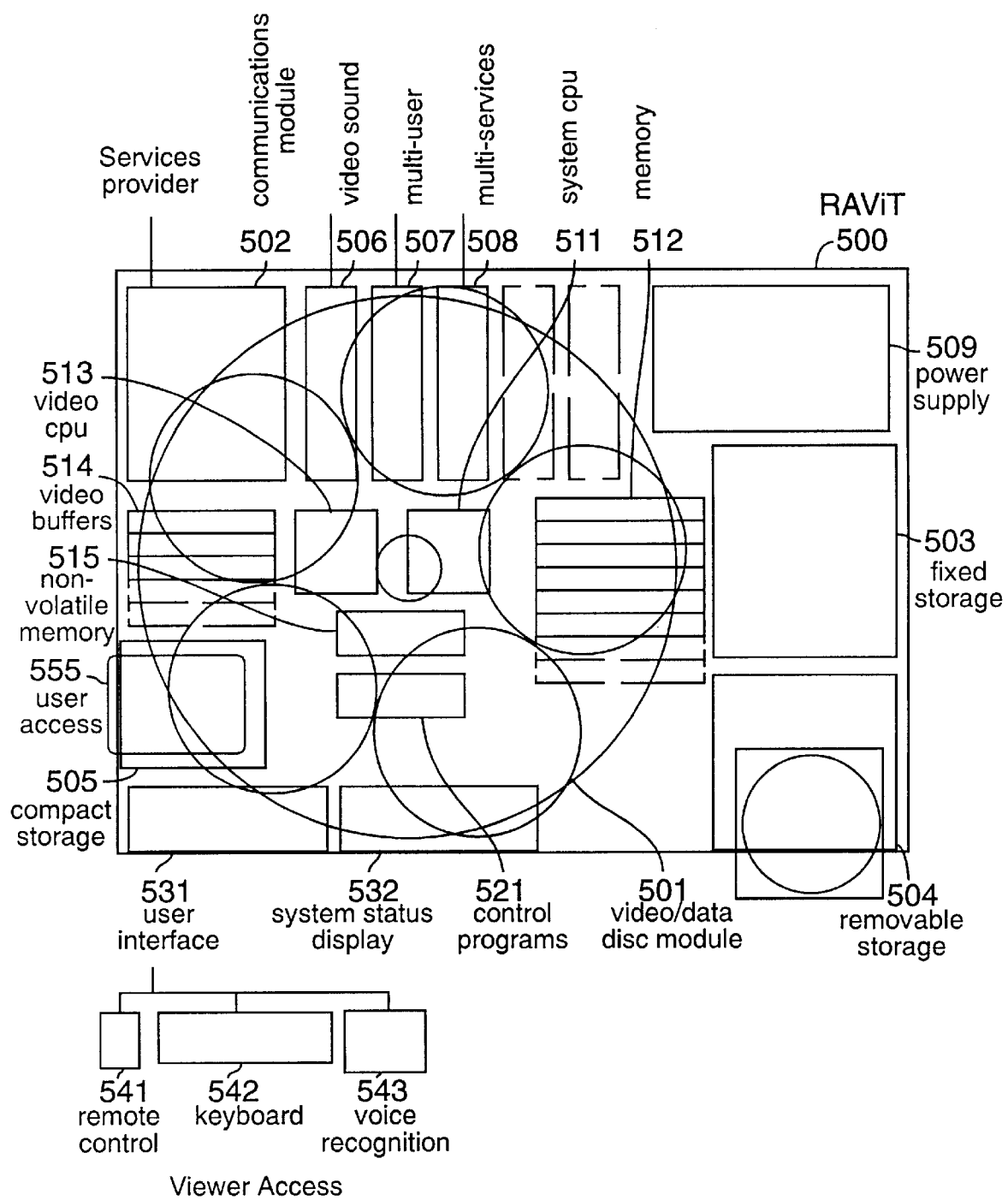
FIG. 5 is a schematic diagram of a video receiver transmitter comprising communications and random access capabilities.

In general, parts, sub-assemblies, and components of a RAViT are of conventional characteristics and are freely substituted by like functioning elements and components. For example, and not limitation, while fiber optic-based communications are preferred, copper phone lines and coaxial cable-based communications are considered, albeit less capable, nonetheless, functional equivalents. Additionally, a certain degree of redundancy of components is illustrated in FIG. 5 to schematically show and detail significant functions.

Clearly, redundant components in general, and redundant electronic components in particular, are intended to be eliminated in a preferred embodiment. For example, while a RAViT may include a removable memory sub-system and a compact memory sub-system, one is the functional equivalent of the other and one or the other may be eliminated. In general, where cost effective, components are designed to serve a combination of functions.

Further, the configuration of the RAViT's various modules, components, and sub-systems, are intended to offer flexibility analogous to that found in a personal computer. Specifically with respect to the multi-user capabilities, a RAViT may be configured, for example, with more than one laser disc module, whether inside the primary cabinet or in a mating or sister cabinet.

Responsive to user friendliness, a more advanced wireless plug and play communications and power motherboard and cabinet design is preferred. The motherboard and cabinet permitting the replacement of, for example, the power supply just as easily as a battery is replaced in a portable personal computer. In a preferred embodiment of RAViT, every component and sub-system is added or replaced without resorting to screwdrivers and the need to unplug and plug communications and power cables. Further, the advantages of a multiple cabinet architecture similar to that of a stereo rack system provides the motivation for a multi-cabinet RAViT.

In a video disc player implementation, the entire content-on-demand video (video/sound and video map) is provided in a video disc in a format similar to that required by the video images contained in the disc. Alternatively, the data is provided in the video/data disc in a different format from the particular video format implemented, such as for example where the video utilizes analog/optical technologies, the video map utilizes digital photomagnetic or magnetic technologies.

In a second alternative, the data is separately provided by a removable memory media 504, an user access media 555, or downloaded by means of the communications interface 502.

A RAViT simply configured and comprising a video disc module 501 and a micro floppy disk drive 504 provides editing out benefits to video discs storing, for example, a conventional linear program. In this configuration, the micro floppy disk provides the video map, user interface and other control programs particular to the motion picture. Additionally, the disk may serve to store a viewer's generalized or video specific video content preferences.

The customization of a conventional linear program, while suffering, as does edited-for-television programs, from the lack of transitional, parallel, and overlapping segments, provides a library of full motion pictures to which the teachings herein may be applied.

Upon a playing of a video, the control program causes the reading of the video's identifier from the video source 501, searches the mass memory fixed storage device 503 for a corresponding viewer content preferences, or applicable generic preferences, and upon viewer confirmation applies the stored viewer preferences to the video map.

With respect to control programs, scheduling routines, viewer preferences, video map, and other principally software elements, it is noted that these may be separately or jointly stored in any one of RAViT's various firmware/hardware memory devices. For example, the viewer's content preferences are stored in non-volatile resident memory 515, in the memory of the fixed or removable memory sub-system 503/504, a user's optical read/write access card or electronic memory card 555, or from the respective read/write video/data disc 501. In an interactive video game application, data in general, and game software in particular, for example, may be downloaded to the hard disk, reserving subsequent access of the laser disc for video/sound retrieval.

Generally, RAViT's control programs 521 generate a segment table reflecting the application of the viewer's content preferences to the video's map. The segment table provides the control program's segment scheduling routines the information to cause the automated logical selection of sequential and nonsequential segments of the video responsive to the video map, the viewer's content preferences, and the logic of the gaming software where applicable. The processing of the control programs is principally a function of the system CPU 511 and system RAM 512.

RAViT's video random access retrieval architecture principally comprising the video/data disc module 501, video CPU 513, video buffers 514 and processing capabilities, provides for the retrieval and transmission of selected sequential and non-sequential video segments stored in the video disc.

The video disc player may incorporate constant angular velocity, constant linear velocity, analog, digital, and/or any combination of these and other laser technologies. The teachings of the following are incorporated by reference herein: i) the patent to Smith, U.S. Pat. No. 4,872,151, titled: "Compact Disc Player Capable of Playing Plural Selections Recorded on a Compact Disc in a Preselected Sequence"; ii) the patent to Blanton et al, U.S. Pat. No. 4,873,585, detailing a system comprising a video disc player for storing and retrieving video frames, and a control computer for accessing particular sequences of stored frames on the video disc; iii) the patent to Lindstrom, U.S. Pat. No. 5,060,068, detailing a synchronization between laser disc players; iv) the patent to Matsubayashi, U.S. Pat. No. 5,132,953, titled: Multi-Beam Optical Recording/Reproducing Apparatus for Recording/Reproducing on a Medium Having a Recording Flat Part with a Guide Groove on Each Side"; v) the teachings of Pioneer's Rewritable Videodisc Recorder VDR-V1000; and vi) the teachings of Pinnacle Micro's Sierra 1.3 GB Optical Hard Drive.

RAViT's laser disc module 501 comprises laser disc technology distinguished principally in the cooperative operation, responsive to the instructions of the segment scheduler, of one or more read/write laser units and/or video buffers to produce a continuous transmission of non-sequential video segments. In a laser-based random access multiple read/write architecture, each read/write unit assembly and operation is principally equivalent to corresponding laser-based assemblies found in the prior art, in which a laser beam reads and reproduces memory signals from a disc. The patents to Yokogawa, U.S. Pat. No. 5,280,462; to Rafner, U.S. Pat. No. 4,972,396; to Carrell, U.S. Pat. No. 4,871,903; and Allebest et al., U.S. Pat. No. 4,701,896, detailing a variety of multiple disk head architectures, are incorporated by reference herein.

Referring now to FIG. 6A, the principal elements of a laser-based random access multiple read/write units architecture as per the present invention are illustrated. FIG. 6A shows a video disc 601 having therein, in a laser readable format, sufficient recording area 611 to store a content-on-demand video.

The recording area 611 of the video disc 601 is shown as substantially concentric tracks lying in a single plane. Alternatively, the recording area comprises a multitude of quasi-concentric tracks forming one or multiple spiral tracks. Additionally, tracks can be provided in one or more planes on each side of the disc, as well as on both sides of the disc.

In a preferred embodiment of reading non-sequential video segments from a single video source, a first reading unit 621 is directed by the segment scheduler to retrieve video information corresponding to the desired frames 4112–5109 of a first, or current, video segment from the video source. Concurrently with the first reading unit 621 reading the information from the first segment, a second reading unit 622 is positioned, according to the video map and the segment scheduler, to read within one revolution of the disc beginning frame information of a next non-sequential segment from the same video source.

In this example, the next non-sequential segment begins at frame 35351. Concurrently with the first reading unit 621 reading the current segment, the second reading unit 622 is caused to read into a video buffer (514 FIG. 5) that portion of the next non-sequential segment beginning at frame 35351 necessary to provide a seamless transition from the first reading unit reading of the current segment ending at frame 5109 to the second reading unit reading of the next non-sequential segment beginning at frame 35351. The video buffer, thus containing the segment information necessary to provide a synchronized, seamless transition from the first segment to the second segment without any gaps in the transmission of the retrieved video segments as a continuous video.

Concurrently with the second reading unit 622 reading the next non-sequential segment, now a current segment, the first reading unit 621 is repositioned to begin reading of a next non-sequential segment beginning at frame 5175. By the time the second reading unit 622 completes reading the current segment at frame 38975, the first reading unit 621 has read frame 5175. The process, analogous to a relay race, repeats itself until the last desired segment has been read.

A video source herein is not defined by physical characteristics. Any number of components, devices, or systems; integrated or acting in coordination or combination comprises a video source. For example, an array of drives storing a video comprise a single video source. In such an architecture, the first reading unit may read information from first drive and the second reading unit may read information from a second drive. A drive may have one or a plurality of reading units.

In an interactive video game application, a multiple reading unit architecture is advantageously utilized to additionally provide faster video responses to the user/player's actions.

Briefly, while a first reading unit 621 is reading a first video segment, frames 4112–5109, a second reading unit 622 is positioned to read a second segment beginning at frame 35351. The positioning of the second unit 622, is responsive to the option being presented to the player during the reading of the first segment, which may require reading the second segment rather than continuing reading the first segment or reading the next sequential segment. Alternatively, the second reading unit provides overlay images in synchronization with the images retrieved by the first reading unit.

Each reading units's movement over the disc surface is over a designated radial segment such that the movement of each reading unit over the recorded radius of the disc is not impaired by the movement of a different reading unit. In this fashion, the movement of the first reading unit 621 over its radial segment 631 does not intersect the movement of the second reading unit 622 over its radial segment 632.

It is noted that the reading unit's travel need not be limited to the radial segments. A positioning system providing for the positioning of the reading unit at any point over the recording media, provides the reading unit the potential to precisely intercept the beginning of a segment/frame at a precisely defined moment, which is represented in FIG. 6A as the juncture of a radial segment 631 and the beginning of frame 5175. In this fashion, the requirement of reading into a video buffer can be reduced if not eliminated.

FIG. 6A also shows a third reading unit 623. While a simple variable content motion picture application does not require more than two reading units, the third reading unit 623 is illustrated principally to emphasize that a multiple-read architecture is not limited to two reading units 621-622, and is available for more demanding interactive variable content game applications. Further, as illustrated, a reading unit's movements over the recorded surface need not be confined to a particular quadrant, side of the surface, or radius of the surface. In the illustration, the third reading unit's 623 movement over the recorded surface is permitted over the recorded diameter 633 of the surface.

Additionally or alternatively, the information is recorded on the laser disc in a manner that, either through placement or duplication of frames, anticipates the desired and possible position of a reading unit. In this case, even if the movement of the reading units are confined to radial segments, the requirement of a video buffer is for this purpose eliminated. This is represented in FIG. 6A as the various junctures of the radial segments and the beginning of the frames.

Specifically, in this architecture, concurrently with a first reading unit 621 reading a current segment from a single video source, a second reading unit 622 is positioned to be able to intercept and read the beginning of a next non-sequential segment, in this example frame 35351, at that instant that the first reading unit 622 completes reading the current segment at the end of frame 5109. When the first reading unit 621 completes reading frame 5109, the second reading unit begins reading frame 35351, thereby in combination with the first reading unit causing a seamless transition from the reading of the current segment to reading of the next non-sequential segment.

In the next stage, concurrently with the second reading unit 622 reading the beginning of the next non-sequential segment at frame 35351, now a current segment, the first reading unit 621 is repositioned to be able to intercept and read the beginning of a next non-sequential segment, frame 5175 at that instant that the second reading unit completes reading the current segment at frame 38975. The process continues until all the required segments are read.

Still additionally, or alternatively, the rotational speed of the disc platter is set sufficiently high to permit the reading unit to read into buffers sufficient video information to provide the same reading unit sufficient time to reposition and begin reading the next non-sequential segment before the video information in the buffer is exhausted. This would, in certain applications, eliminate the need for multiple reading units.

Specifically, when non-sequential video segments are read from a single video source, a single video source 601 is caused to rotate at a sufficiently high rate 641, in this example 60 frames per second or 3,600 rpm 641, i.e twice the rate of 30 frame per second 642, to permit a reading unit 621 to both read an amount of a current segment (frames 4412–5109) into a video buffer and sufficient for the reading unit 621 to be repositioned to read the beginning of a next non-sequential segment, frame 35351, before the amount of information in the video buffer 514 is exhausted.

Reading frames 4498–5109 provides the reading unit 621 sufficient time to be repositioned to read a next non-sequential segment, frames 35351–38975. Concurrently with the repositioning of the reading unit, the video buffer provides the last read frames 4498–5109 to cause a seamless transition from the reading of the current segment, frames 4112–5109, to the reading of the next non-sequential segment, frames 35351–38975. This process continues until all the required segments are read.

In this architecture, the reading unit reads into the buffer only in advance of a next non-sequential segment, or continually reads into the video buffer as the video information in the buffer is depleted.

A variation of this technique particularly applicable to interactive video game applications is detailed with respect to FIG. 6B. In this example, a read stream comprises alternating frames from a number of different video segments. The number of different video segments results from the attainable effective transfer rates of the system. For example, if the video application requires a transfer rate of 30 frames per second, and video compression techniques, rotational speed, and/or reading capability of the system can achieve an effective transfer rate of 120 frames per second 643 (FIG. 6A), than four different video segments can be read "concurrently" by a single reading unit. In such an architecture, the frame arrangement comprises a reading stream 651 of alternating frames from four separate segments A–D and is read at an effective rate of 120 frames per second. The processing architecture selects the desired segment A,B,C, or D from the read stream 651 to generate a transmission stream 652, at a rate of 30 frames per second, of the desired frames 351A–353A, 351B–353B, 351C–353C, or 351D–353D.

In this fashion a single reading unit can provide instantaneous shifting among a number of different segments. In an interactive video game application, shifting among a number of different video segments can be instantaneously achieved in response to a players interaction with the game's software logic.

To minimize the average seek time of a reading assembly, the laser originating position with respect to the surface is stationary. However, the laser may be rotated about its axis to aim the laser to any point on the surface of a laser readable disc. The surface of the disc is printed to return the laser to the reading assembly as required. That is, while a plurality of angle of returns over the disc surface are established, the required laser angle to the land and pits is maintained. By eliminating the requirement that the laser source travel over the disc surface, a much faster retrieval of non-sequential data is achieved.

Figure 6C:
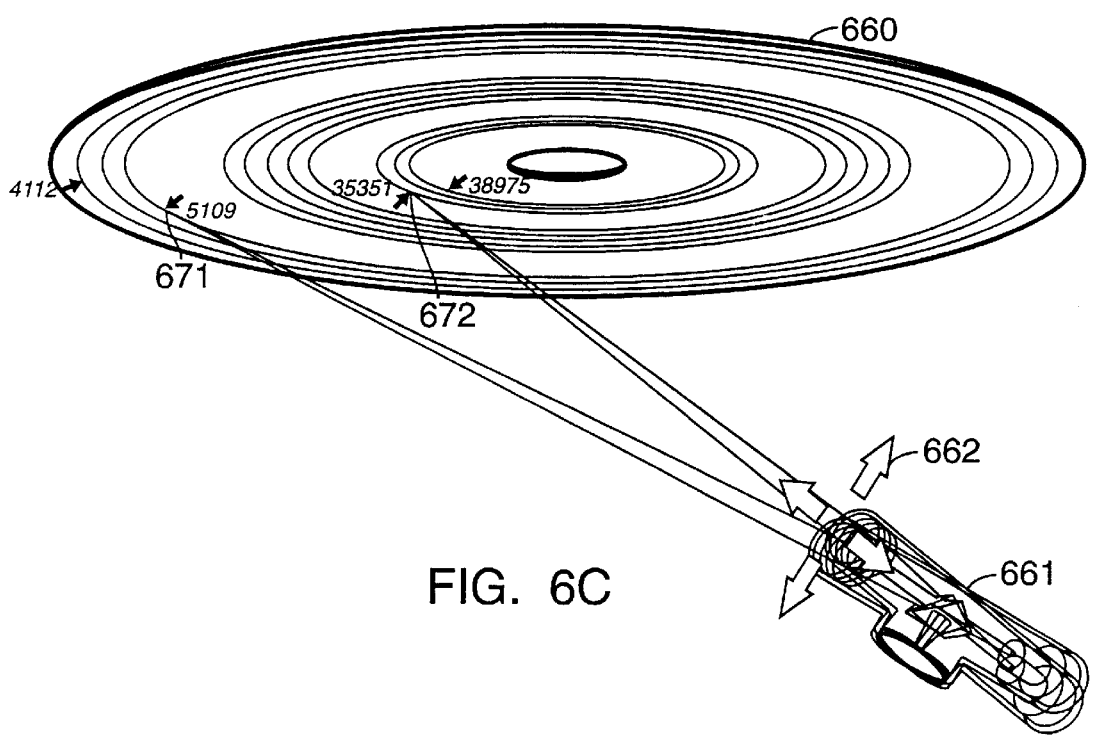
FIGS. 6C and 6D illustrate the rotation of a laser about its axis to retrieve data from different locations of a surface.

FIG. 6C illustrates the rotation of a laser about its axis to retrieve data from different locations of a printed surface. The reading assembly or laser source 661 shown comprises principally a laser diode, prism, focusing coil, and a light-sensing diode. The reading assembly tracking system repositions the spot 671 being irradiated by rotating the laser source 661 about one or more of its axis 662. Thus when changing the irradiation from a first spot 671 to a second spot 672 this architecture does not require that the laser assembly move over the surface of the disc.

For purposes of an initial calibration of the position of the laser source 661 with respect to the disc surface 601, movement of the laser source or media may additionally be provided in one or more directions.

Figure 6D:
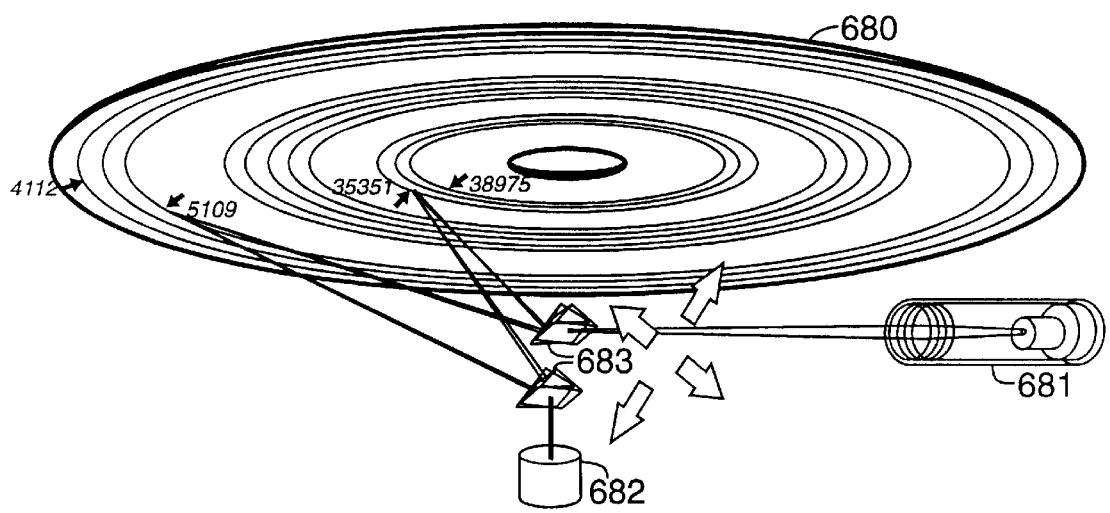

As is illustrated in FIG. 6D, other arrangements of the laser source are possible. For example: i) only a mirror or prism is rotated about the axis; and/or ii) the laser diode and the light sensing diode may be in separate sub-assemblies.

Where the laser diode 681 and the light sensing diode 682 are in separate assemblies, the surface of the disc 680 is printed to focus the return light on the light sensing diode 682. This is analogous to the focusing of light in a telescope. Rotating mirrors and/or prisms 683 may serve as needed to redirect the laser.

To enhance the simulation of each video stream, a windowing technique, such as shown in the previously cited patent to Blanton et al., in which only a portion of each frame is displayed, is applied to each frame in one or more of the video streams to enhance the simulation of movement within a multi-dimensional space and to provide composite images of greater complexity.

These and other variations in the particular number and arrangement of the reading units, video buffer, and frame arrangement configuration that is implemented in a RAViT is a function of the complexity of the video/data, and cost/performance constraints. It is also intended that the teachings of the various configurations shown herein and in the cited art may be combined responsive to the particular application.

Clearly, with technology continuously achieving greater storage capacity in smaller, faster, and more cost effective storage devices, there is no apparent limitation to the complexity of a content-on-demand video that can be commercially executed.

The description above has for simplicity been detailed with respect to a reading unit. It is to be understood that a reading unit herein comprises both reading and writing capabilities operationally independent of the operation of another read/write unit in the system's architecture. Additionally, a read/write unit need not be limited to a particular current technology. Enhancements to the construction of the reading unit itself, such as for example multiple tracking mirrors/beam splitters, are contemplated to produce faster access times and transfer rates. Further, the multiple read/write architecture detailed need not be limited to a laser disc system. In an alternate embodiment, a hard disk drive is modified as per the teachings above detailed to significantly increase transfer rates and lower average access times. Clearly, at present, in a hard disk embodiment the read/write units are magnetic read/write heads.

A random access device's read/buffer architecture, modified as per the teachings herein, is intended to be implemented in a variety of mass memory devices. Embodiments of the read/buffer architecture detailed herein is not intended to be limited to any particular available recording medium and recording formats. The teachings herein are applicable to a number of random access technologies such as, for example, and not limited to, fixed and removable magnetic, optical, or photomagnetic media, and digital or analog recording formats. Any combination of existing or forthcoming media, format, and compression memory technologies may advantageously incorporate the teachings herein detailed.

Figure 7A:
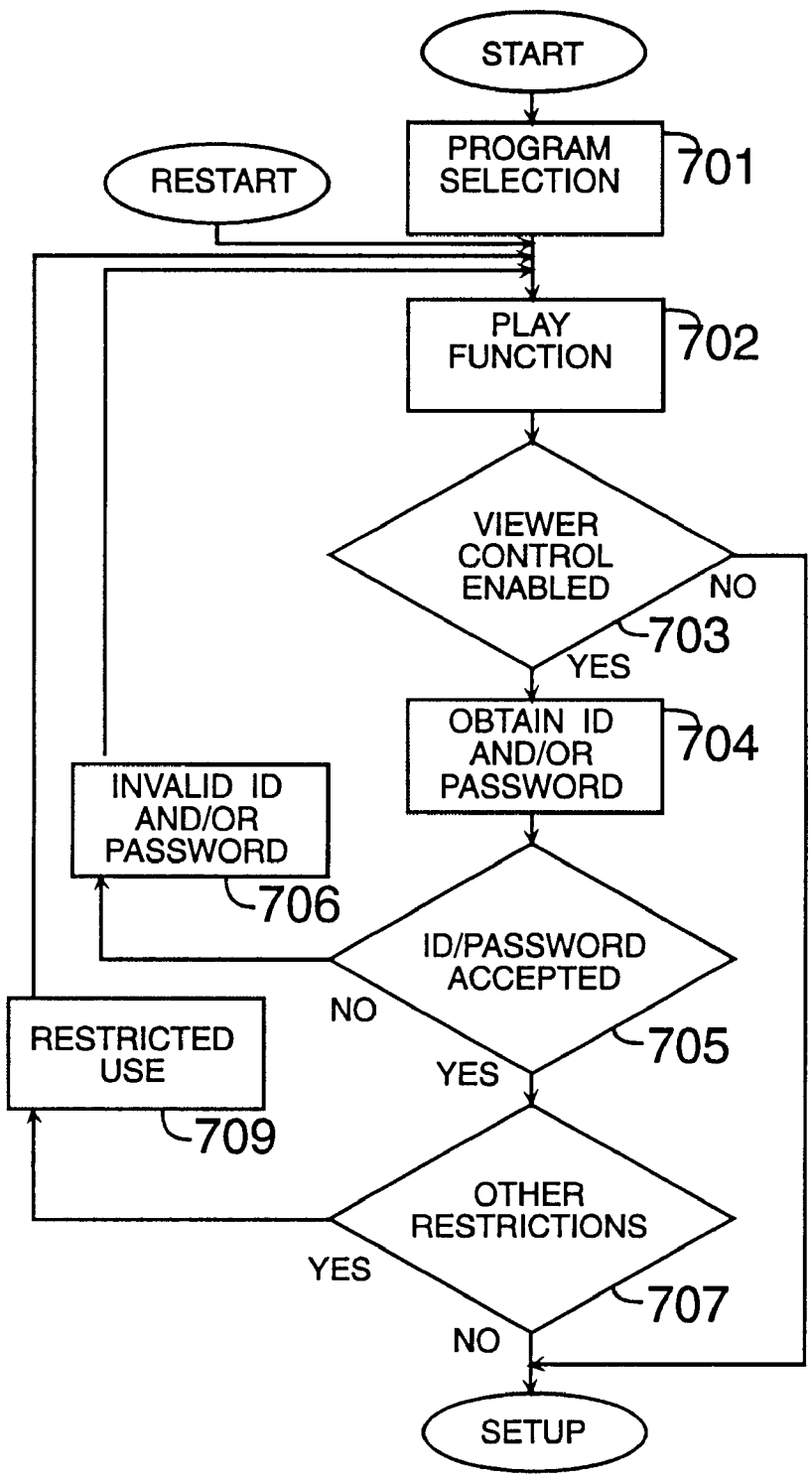
FIGS. 7A, 7B, and 7C, are flow charts detailing the steps of playing a content-on-demand video.
Figure 7B:
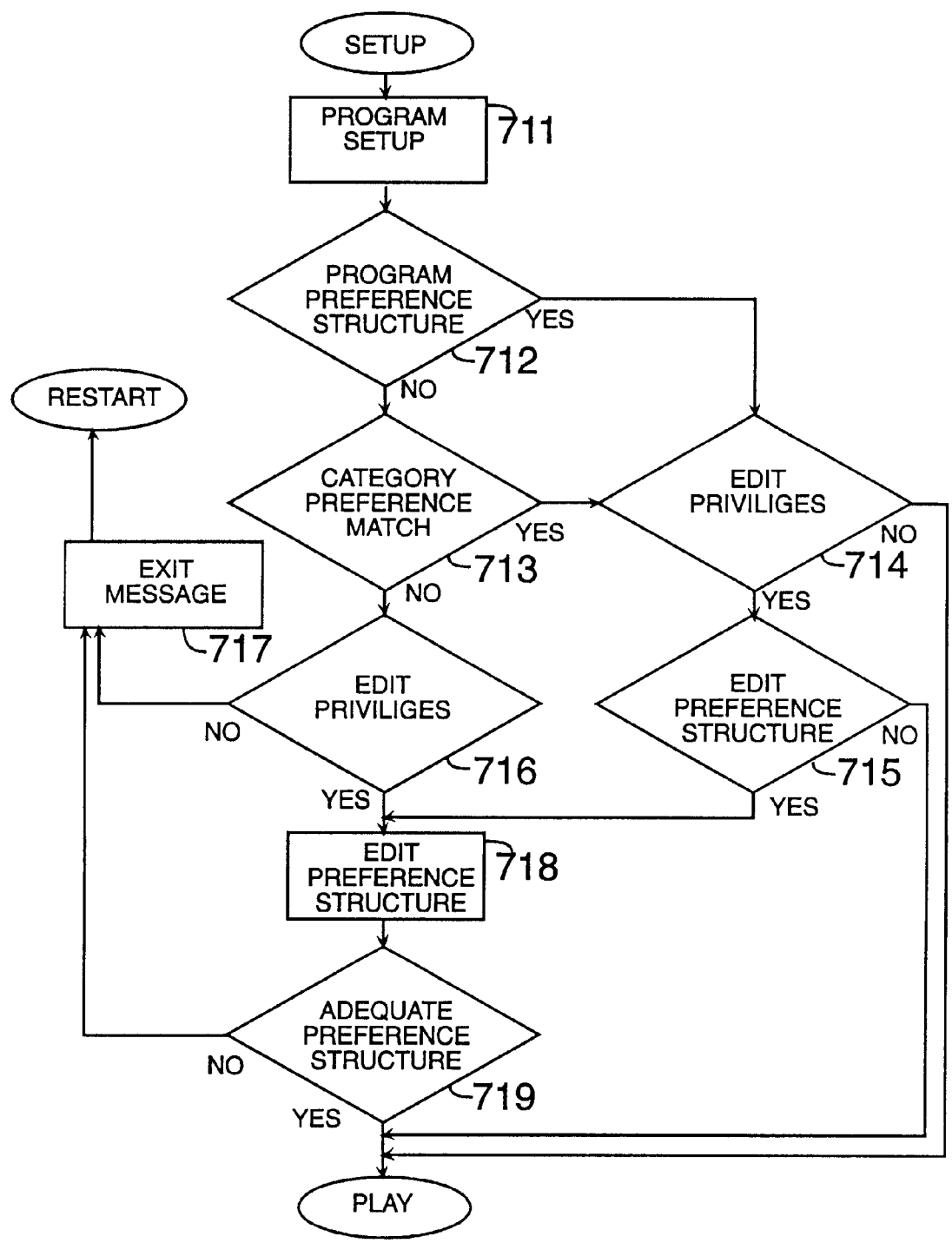
Figure 7C:
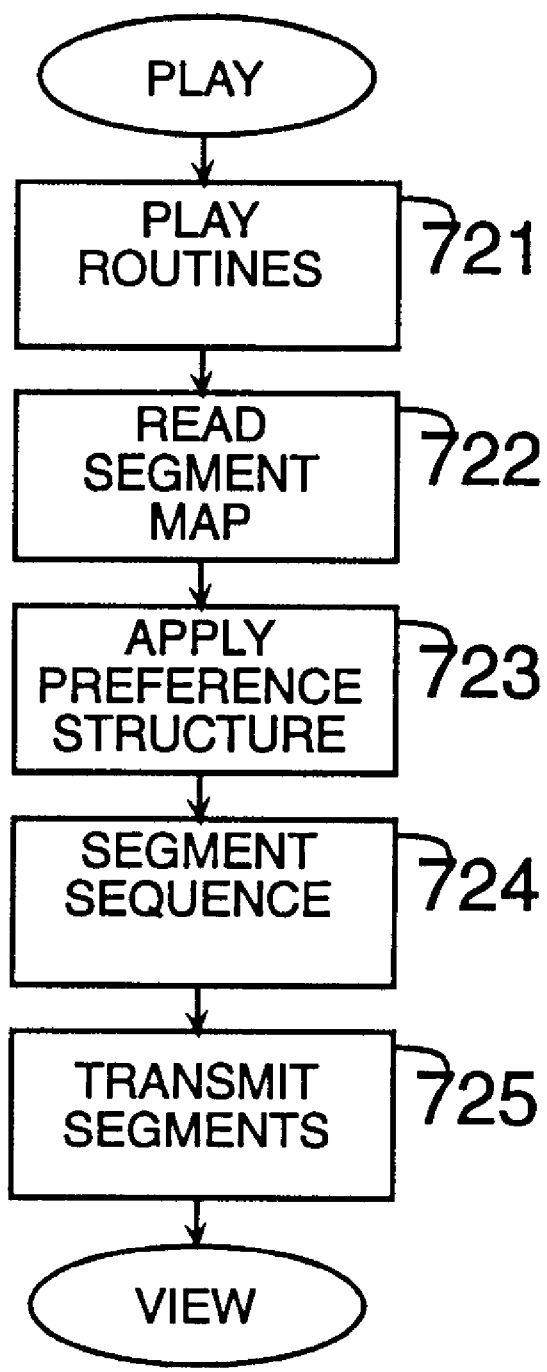

The steps comprising the method of playing a content-on-demand video disc on a RAViT are detailed with respect to the flow chart of FIGS. 7A, 7B, and 7C. Beginning at step 701, the viewer selects the desired video disc. Upon selection of the play function 702, RAViT's software, firmware, and hardware processing capabilities ("processor") issue a command to read the viewer control setup to ascertain if viewer control is enabled 703. If enabled, RAViT's handshaking routines request viewer identification and, if required, a corresponding password 704. If the viewer identification and password are not found acceptable 705, the appropriate error message is transmitted to the television or similar viewing device 706, and RAViT is returned to a state prior to the viewer play request 702.

If viewer identification and password are found acceptable 705, the processor checks for other restrictions to a user access 707. These additional restrictions include: time of day restrictions for the user, and/or accumulated usage during specified time frames. If restrictions are enabled that prevent usage 707, an appropriate error message 709 is transmitted to the television, and RAViT is returned to a state prior to the viewer play request 702. The user-permission capability enables a parent to have complete control over the use of RAViT, and provides for multiple individualized preferences. The patent to Harnum et al., U.S. Pat. No. 5,231,661, incorporated herein by reference, titled "Television Viewing Control Device and Method" details "A device and method for controlling television usage by children and other users."

If viewer control is not enabled 703, or if enabled and verification of the user 705 and verification of restrictions permit usage 707, program setup routines are initiated.

Referring now to FIG. 7B, program setup routines 711 include reading, from the video source, video identification information. Based on the video identification information, which in addition to including a unique identification code also contains qualitative and classification video information, setup routines search to see if a corresponding viewer content preference for the identified video is available 712. Otherwise, the video's content category structures 713 are obtained from the video source to determine if a viewer content preference is established for each of the video's content categories.

Once the viewer's content preferences are established, the processor verifies set up status for editing privileges 714, to determine if the viewer has editing privileges for the class of videos to which the present video belongs and the categories included therein. The processor at this point transmits to the television a request for the viewer to indicate if the existing preferences are to be edited 715. If at step 714 edit privileges are not available for the viewer, the processor initiates normal play routines. If the viewer indicates that no editing privileges are to be exercised 715, normal play routines are initiated as well; otherwise, editing of the viewer content preferences occurs at step 718.

The edited viewer's content preferences are interactively verified 719 until an adequate category preference match, as required by the video and the user is established, or the viewer selects to exit. Exiting at 719 returns RAViT to a state prior to the viewer play request 702.

If a viewer's content preferences for the video are not available 712, or at least one of the categories of the video is not contained in the viewer content preferences 713, then the processor verifies if edit privileges are available for the viewer for the class of videos and the categories 716. If no edit privileges are available, an exit message 717 is transmitted to the television, and RAViT is returned to a state prior to the viewer play request 702. If edit privileges are available 716, then editing of the viewer preferences 718 is initiated.

Editing the viewer preferences 718 is supervised to insure that viewer modifications are consistent with the permissions established for that viewer. Individual viewer permissions are established broadly for any one or more classes of videos or categories, or specifically for any category. Once editing of the preferences is found complete 719, as required by the video category listing, play routines are initiated.

Referring now to FIG. 7C, following the enabling of the play routines 721, the video map is read 722 from the video map storage media or memory. As previously detailed, the video map defines the sequential and non-sequential segments of the selected video. At this point, RAViT's processing capabilities retrieve and apply the viewer's content preferences to the video map 723.

The application of the viewer's content preferences to the video map results in the automated logical selection of sequential and non-sequential segments of the selected video 724 consistent with the viewer's video content preferences and the video map. In other words, any segments with a content coding higher (abstract) than the viewer-selected content preference for the corresponding category would not be included in the video produced for the viewer. The segment selected for viewing having a coding level equal to or lower than the viewer specified content preference for that category is selected and provides the next segment beginning frame information. This will skip over parallel segments of a lower coding than the viewed segment.

Once the segments to be played and their sequence are determined 724, the random access retrieval and transmission capabilities of RAViT automatically retrieve the selected sequential and non-sequential video segments stored in the video storage device, and transmit the video segments as a seamless, continuous video 725.

In a interactive video game, the start and setup routines detailed with respect to FIGS. 7A, and 7B are integrated with a game's setup routines.

It is emphasized that following the initial setup of RAViT with a viewer's content preferences, a subsequent viewing of a content-on-demand video conforming to a standard descriptive structure only requires the pressing of a play key. After the pressing of the play key, RAViT automatically initiates playing of the video without the necessity of any further viewer interaction or instructions. In other words, in a standardized content descriptive architecture, once RAViT initially learns the viewer's content preferences, it does not require any more of the viewer than, for example, a conventional laser disc player.

Similarly, in the playing of an interactive content-on-demand game, once RAViT initially learns the viewer/player content preferences, the gaming interaction proceeds transparently of the video editing functions.

As suggested previously, the capabilities of RAViT are particularly well suited to providing a supervisor (i.e. parent) complete control as to the video material to which a viewer/player (i.e. child) is exposed. As indicated above, RAViT provides: viewer, time of day, amount of viewing controls; and individual preferences for each viewer/player or class of viewers/players. Additionally, supplementary or alternative routines are provided for those instances where: i) segments cannot be rated according to standardized descriptive structures; ii) the utilization of a descriptive structure system is not desired; or iii) a simpler routine provides the desired functionality.

Specifically, routines permits a supervisor to automatically select segments of a video previously identified in a video map as providing material which may not be suitable for a viewer; viewing the selected segments and determining their suitability for viewing by the viewer; automatically generating a segment table responsive to the segment suitability determination and the video map; automatically retrieving segments responsive to said segment table; and automatically transmitting the retrieved segments as a continuous video for said viewer.

Segments not suitable for a viewer may be defined as segments providing content and form of expression which, in a conventional sense, is deserving of a rating other than a MPAA "G" rating.

Alternatively to, or in addition to the editing system based on the application of descriptive structures, a simplified editing system is based on the "flagging" of segments irrespective of the specific nature of the material which may not be suitable for a viewer. Consequently, all segments containing material which may potentially be unsuitable, receives the same flag or code. The flagging of segments provides an efficient method of coding and retrieving the segments and indicating their inclusion/exclusion in a program/game to be viewed/played.

Figure 8:
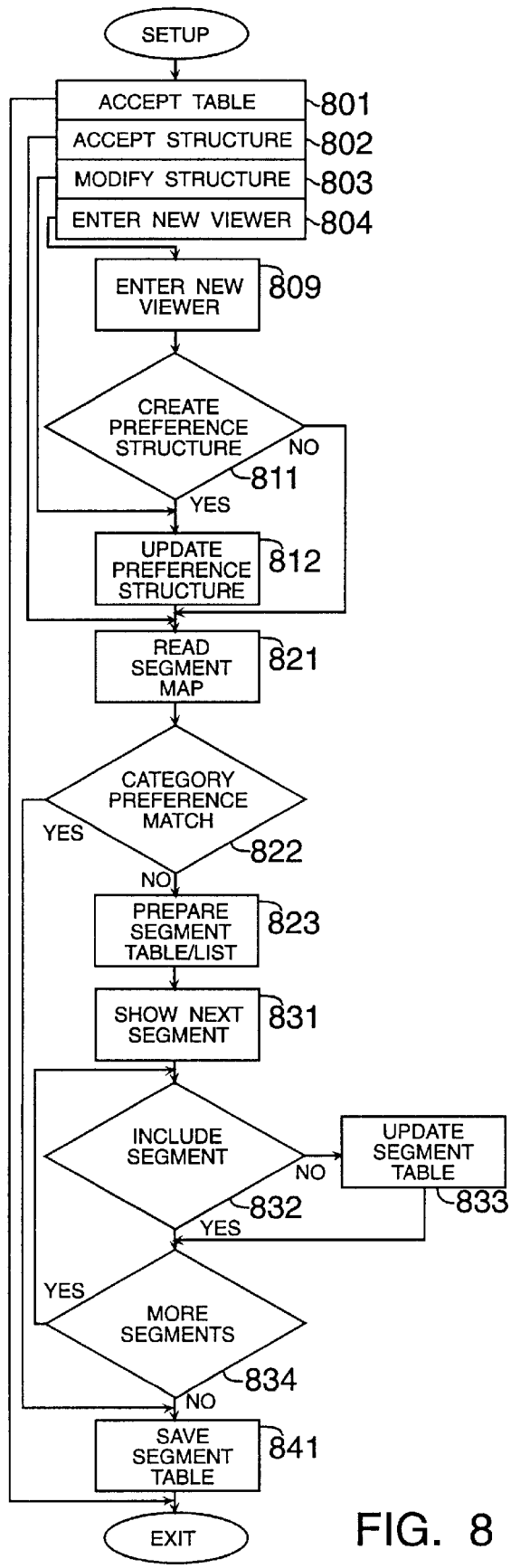
FIG. 8 is a flow chart detailing the steps of previewing flagged segments.

An example of the editing routines that provide for the efficient previewing of flagged segments are summarized with respect to FIG. 8. One of a number of RAViT setup routines present a listing of viewers over which the supervisor has supervisory control. With respect to each viewer and the selected video, the listing indicates if a segment table is already available 801, and if viewer preferences are available 802 or not 803. Additionally the option to designate a new viewer 804 is made available to the supervisor.

If a corresponding table for the desired viewer is available 801 and the supervisor does not wish to make any changes, selecting this option exits the routine, and the operation of RAViT is then permitted as detailed previously. If a corresponding table for the selected viewer is not available, and the supervisor does not wish to create or update the viewer's preferences 802, the routine proceeds by reading the video map 821. If the supervisor wishes to modify or create viewer preferences 803, the routine proceeds with the appropriate routines 812. If the supervisor indicates the entry of a new viewer 804, the appropriate viewer entry routines are enabled 809, and the opportunity to create viewer preferences for the new viewer is provided 811.

The routines to update/create new preferences 812 permit both a video specific or permanent updating of the selected viewer's preferences. Once viewer preferences are indicated, if any, the selected video's segment map is read 821 and compared to the preferences 822 to the extent that they are available.

If all the flagged segments are effectively excluded by the viewer preferences 822, the resulting video segment table is saved 841 and the routine is exited. Otherwise, in addition to an initial segment table, a list is prepared 823 consisting of any flagged segments that have a descriptive level inconsistent with the corresponding level in the preferences, and flagged segments for which there is no corresponding preferences. In the absence of a viewer's content preferences every flagged segment is included in the segment list.

In a manner similar to the retrieval of non-sequential segments outlined previously, only the segments in the segment list are shown one after the other 831 as a continuous stream to the supervisor, pausing only if an include/exclude decision is not indicated 832. The process continuing automatically 834 until a decision on each of the flagged segments in the list is made 832. As each decision is made the segment table is updated 833. Alternatively, the segment table is updated and saved following the transmission of the last segment 841.

Each segment need not be viewed in its entirety 831. As soon as an include decision is made 832, the showing of the next segment begins instantaneously.

It should be understood that a showing of a flagged segment is not limited to the actual transmission of the flagged segment's video/sound. Appreciating that certain adults may not be interested in viewing the flagged segments, a character description of the contents of the segment may be provided instead or in advance of the option to view the corresponding segment.

The above is presented to emphasize control features and capabilities, and that particular routines shown can be enhanced in a number of ways. Configuration routines are contemplated that further facilitate and automate viewer/player controls. For example, a configuration can be selected that automatically creates for selected or new viewers/players a segment table excluding all flagged segments. In this case, at system setup, a viewer is simply associated with the exclusion of all flagged segments.

Similarly, additionally, or alternatively, a viewer/player is associated with a descriptor code paralleling the MPAA rating system as previously detailed. At system setup, a viewer/player is associated with an appropriate rating code, thereafter, the viewing/playing of a video is consistent with the rating code associated with the respective viewer. The simplicity of the architecture in combination with the teachings of the content-on-demand video permits, for example, by means of a single code associated with each viewer, a parent to view an "R" version of a film, and permits a child to view a "G" version of the same film. It is noted that this architecture provides more tailored control than the simpler exclude all flagged segments architecture, but significantly less customized control than a category specific video content preferences.

In a preferred embodiment, the various coding and descriptive schemes and structures detailed above are correlated to permit the application of a variety of content control options without requiring duplicating coding definitions. For example, assigning a segment a code other than a "G" code is equivalent to flagging the segment.

While the disclosure to this point has been largely in terms of a video disc player physically accessible by the viewer, the delivery of a content-on-demand video is independent of any one video delivery technology. A variety of video delivery technologies and architectures are possible. For example, as it has been previously suggested, the video player need not be physically located near the television set.

The patent to Eggers et al. U.S. Pat. No. 4,920,432, and to Fenwick et al. U.S. Pat. No. 4,947,244, the teachings of which are incorporated by reference herein, disclose remote video distribution systems, wherein the viewer is provided remote controlled access to the video resources. Fiber optic and coaxial communications easily permit the required transfer rates between a device, or any alternative memory device, over longer distances to a viewer's receiver/television.

A content-on-demand video, video map, and user routines may be provided to the viewer by means of a variety of existing and evolving technologies. These technologies include hard formats such as tape, Video CD, magnetic disk, combination laser one side magnetic underside disk, memory chips and modules (e.g. RAM, DRAM, high capacity flash memory, bubble memory); and soft formats such as may be implemented in a variety of communications networks utilizing for example analog or digital cable transmissions, fiber optic transmission, phone and satellite communications.

It is within a network based implementation, that the various advantages and capabilities of content-on-demand video services are realized. With respect to the specific hardware technologies and architectures of an underlying video delivery system, the following, which are incorporated by reference herein, will assist the reader interested in obtaining a more detailed disclosure that is necessary to provide here: i) the patents to Fukui et al., U.S. Pat. No. 5,313,297; Litteral et al., U.S. Pat. No. 5,247,347; Harney et al., U.S. Pat. No. 5,245,420; Ballantyne et al., U.S. Pat. No. 5,133,079; Tindell et al., U.S. Pat. No. 5,130,792; Monslow, U.S. Pat. No. 4,995,078; Way, U.S. Pat. No. 4,891,694; Walter, U.S. Pat. No. 4,506,387; and Bending, U.S. Pat. No. 4,451,701; detail a variety of program transmission technologies embodying varying degrees of capabilities; ii) the application of the Chesapeake and Potomac Telephone Companies of Maryland and Virginia before the Federal Communications Commission dated Jun. 16, 1994, shows a video dialtone network; and iii) BroadBand Technologies, Inc.'s FLX System offers an integrated interactive switched digital video and telephony system.

Figure 9:
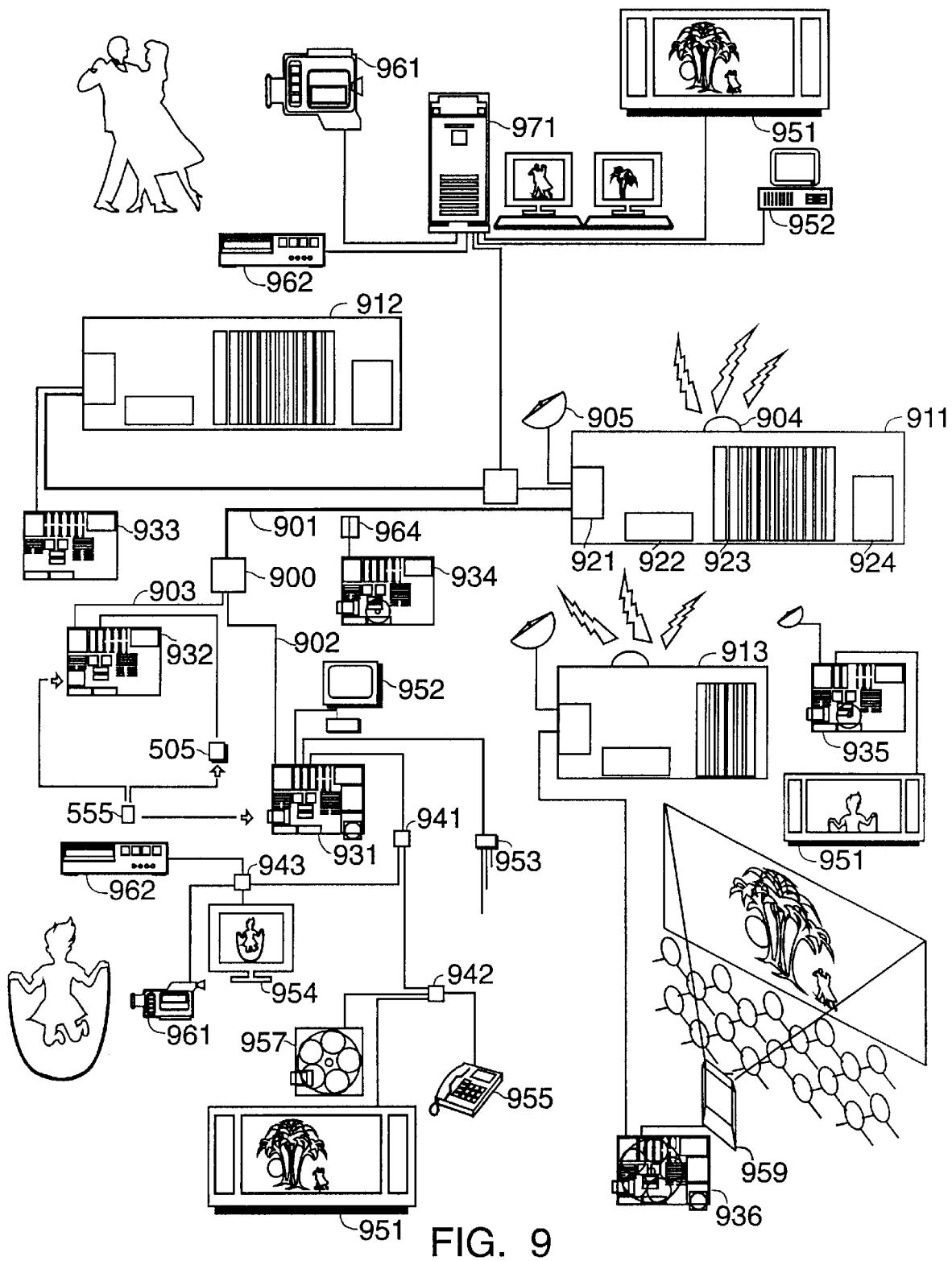
FIG. 9 is a diagram of a video and communications integrated network.

FIG. 9 is a schematic diagram of a video provider and subscriber network architecture in which participants in the network 900 comprise any number of video providers 911, 912, 913 and any number of subscribers 931, 932, 933, 934, 935, 936. Participants in the network 900, however, whether classified as video providers 911–913 or subscribers 931–936 are both providers and subscribers of video services. Analogous to a communications network, each participant is able to retrieve and transmit video/data from any other participant. The "video dialtone" model advanced by the Federal Communications Commission is herein fully implemented.

As indicated previously, a content-on-demand system and the delivery of content-on-demand video services is independent of the specific network infrastructure employed. FIG. 9 suggests a plurality of network infrastructures that may be implemented. Shown are wired and non-wired video transmission infrastructures based on the use of one or a hybrid combination of the following: fiber optic 901, coaxial cable 902, twisted copper wire 903, microwave and radio 904, and satellite 905.

Each participant in the network obtains a hardware configuration consistent with their desire and objectives, and their financial resources. The video system of a participant who wishes to serve as a video provider 911–913 is functionally equivalent to the RAViT device previously detailed with respect to FIG. 5, differing only in that the respective resources are appropriately scaled and modified to simultaneously access a variety of videos, and service a number of subscribers.

Both a subscriber's RAViT 931 and a nonlinear editing system 971 are in fact video servers. A video server of a video services provider is distinguished principally by the significantly greater video storage capacity and the number of video streams it can service.

A video provider system, for example 911, comprises: i) communications technologies 921 for establishing a plurality of video and communications streams to a plurality of RAViTs 931–936; ii) processing hardware and software 922 for retrieving from a RAVIT a subscriber's video preferences and content preferences, and for automatically selecting, for each of the participating subscribers, a content-on-demand video responsive to the video and content preferences; iii) mass storage random access memory devices 923 for storing a videobase comprising a plurality of any combination of conventional programs and interactive games and services, variable content videos, and content-on-demand video including the corresponding video maps; and iv) processing hardware and software 924 for maintaining accounting and support services in connection with video services provided.

Simply stated, a content-on-demand video provider system 911–913 comprises a video server, such as may be available from a variety of computer vendors, the video server software being enhanced to deliver content-on-demand video services.

Video providers may be further categorized according to the functions served and/or the extent and character of the videobase maintained. Central video services providers 911 may be capable of providing a greater variety of video services than for example regional or local services providers 913. Regional or local services providers 913, however may be the source of local interest video services such as are currently broadcast by local television stations. Other video services providers 912 may act as "libraries" for specialized categories of videos, as for example an historical video archive of government proceedings; or services as for example electronics shopping.

A viewer's access to the resources of a video services provider 911–913 need not be direct. A requested video may be downloaded, in real time or non-real time, to a services provider that may be more economically accessible to the intended viewer. In fact, within the network, some video services provider may not directly provide any services to viewers, but act as centralized video originators or depositories for other services providers.

The video server's mass storage random access memory devices 923 for storing a plurality of content-on-demand videos may advantageously incorporate the teachings herein with respect to the multiple read/write head architecture. This would also facilitate the simultaneous retrieval of several versions of a video from a single video source to satisfy simultaneously the particular viewing requirements of several subscribers. A multiple read head architecture reduces, for example, the number of copies of a video that the on-line video server may need to store.

In this context it is also noted that the mass storage devices may additionally incorporate stripping methods to store a video across several storage devices. Where cost effective, a content-on-demand video may be entirely or partially stored in RAM.

The particular configuration of a subscriber's RAViT's storage, memory, processing, and communication capabilities is responsive to, but is not necessarily limited by, the minimum requirements of the particular service provider. A RAViT configuration, such as detailed with respect to FIG. 5, provides the required video storage, processing, and communications architecture required by the network.

The RAViT's multi-user and multi-services modules support separate controlled independent access by a plurality of users of the RAViT's processing, video, and communications resources. In addition to the primary video display system 951 supported by a RAViT 931, the multi-user module and multi-services module installed also provides services to a monitor/keyboard 952, security system 953, personal multimedia computer 954, voice and/or video/voice telephones 955.

In commercial applications, such as a theater, a RAViT 936 may support a high definition projector 959 such as for example Hughes/JVC Electronic HDTV projector. This particular service configuration is similar to Alcatel Network Systems and Pacific Bell's "Cinema of the Future" the teachings of which are incorporated by reference herein. The "Cinema of the Future" video delivery system comprises an HDTV version of Pacific Bell's Advanced Broadcast Video Service and Alcatel's A1000 AX family of host, remote, and small ATM edge switches and high-definition codecs that enable the transmission of digital, studio-quality video through telecommunications networks.

For illustration purposes, the connections between RAViTs and output devices are shown with lines. However, communications may be established by any of a variety of wired or non-wired means. Thus RAVIT 931 need not be directly or indirectly connected by wire to the devices 951–959, 961–962. Further, devices 951–959, 961–962 may be connected to a communications port 941–943 which is in communications with the RAViT 931. The communications port may be of varying degrees of intelligence and capabilities, it may serve to boost or manage the signal, or have no other purpose than to serve as a convenient outlet in which to plug and unplug devices.

In a preferred embodiment as shown if FIG. 9, analogous to an electrical wiring of a house, the house will be "wired" or "networked" with convenient ports. In this instance however, RAViT may be plugged into any of the ports, self configuring the port addresses so that the devices that may be plugged into other ports automatically identify themselves and establish communications with RAViT.

Additionally, RAViT modules may themselves be physically distributed over the network. The plug and play of modules across a network architecture permits, for example, that the video disc module (501 FIG. 5) be physically remote from a RAViT's 931 main unit and plugged on a port 942 near the television 951. In this instance, the case 957 housing the video disc module also houses a compact storage module (505 FIG. 5). Thus, a single video disc module can be easily moved from one location 942 to another location 943 when physical proximity is required to conveniently replace discs. It is noted that while the disc module case 957 is connected to a first port 942, it would be remotely accessible to a terminal 954 plugged into a second port 943.

It should be appreciated RAViT's core components may be located anywhere inside or outside the house. Specially, where a RAViT includes fans and disk drives, the top of the TV set would not be an ideal location.

As indicated previously with respect to FIG. 5, the viewer's or, more appropriately, the user's control of a RAViT is either through an infrared control keypad, wired or infrared alphanumeric control keyboard, voice control, or system controls directly on the RAViT. These controls may be directly incorporated in the devices accessing RAViT such as the TV 951.

The novel combination of an external fiber optic based communications module and a multiple read/write storage module, provides a RAViT configuration capable of efficiently downloading significant amounts of full motion video to be viewed, played with, or processed at the subscriber's leisure. In such a RAViT, the downloading of, for example, a feature length motion picture, an interactive video game, or a series of lectures can be achieved with unprecedented speed.

Clearly, a RAViT may be configured to duplicate the functions of a nonlinear editing system as previously detailed. Both the RAViT 931 and the editing system 971 are capable of receiving input from other sources such as for example a digital or analog video camera 961 and video tape player 962. As is the case with RAViT 931, the editing system 971 is capable of outputting video to, for example, a TV 951 and to a PC 954.

As suggested earlier, an object of FIG. 9 is to convey the concept that a subscriber's RAViT 931–936 and an editing system 971 can both upload and download video through the network directly to other subscribers 931–936, editing systems 971, and/or to the video servers of videos services providers 911–913.

As indicated previously, RAViT can accommodate a plurality compression-decompression technologies to both retrieve and decompress videos and compress and transmit videos through the network. Preferably, a specific video originating at a digital camera 961, downloaded to a non-linear editing system 971, transmitted over the network 900 to a video server for retransmission over the network 900 to a RAViT 931 will utilize a single compression technology to avoid compounding the effects of artifacts that may be introduced by a particular compression technology. Clearly, where the decompression technology resides completely in software, the video itself could provide the required decompression software.

As indicated above, content-on-demand video services can be delivered by means of any of a number of non-wire based video delivery systems. For example, CellularVision Technologies & Telecommunications Inc. is advancing microwave technologies capable of providing two way video services including movies-on-demand.

In such a system, TV signals are sent through the air at very high frequencies such as the 27.5 to 29.5 gigahertz microwave band. The network uses a series of transmitters 904, each of which is capable of broadcasting a digital signal within a six mile radius. Subscribers utilize a flat, four-square-inch antenna 964 mounted on a window to receive the signal. The antenna 964 is connected by coaxial cable to a decoder 934 connected to a TV set. In the present invention, RAViT 934 performs the processing and decoding functions required for transmission to a video display.

In a preferred embodiment of a cellular-like system, a video provider's cell site 913 comprises microwave communications, video server, and processing systems for establishing a plurality of video and communications streams to a plurality of RAViTs 931–936.

The previously shown capacity to read/write the viewer preferences from/to an user access media provides a viewer the means to automatically configure a RAViT that had not previously learned the viewer's video content preferences (dumb RAViT).

Referring once more to FIG. 9, in anticipation of the desire to efficiently utilize a dumb RAViT 932, a viewer instructs the smart RAViT 931 to download to the viewer's user access media 555 the desired content preferences and video request routines. To automatically configure the dumb RAViT 932 and retrieve a video consistent with the content preferences and video request routines, the viewer provides the prepared use access media 555 to the dumb RAViT 932, or to an accessory device housing a compact portable storage sub-system 505 and in communication with the dumb RAViT 932. The user access media 555 automatically configures the dumb RAViT 932 without necessarily downloading the viewer's content preferences other than to volatile memory. This operation is similar to moving a game cartridge from a first game player to a second game player.

Transporting the video request routines automates the retrieval of desired video from a video provider 911 accessible to the RAViT 932. In this fashion, for example, a travelling executive can automatically configure a RAViT in a hotel room to retrieve videophone messages, the day's news in a format and for topics preestablished by the executive, followed by a menu of recently released films that the executive has not seen. The operation being analogous to inserting an access card in a hotel room door.

Additionally, autoconfiguring means permit a plurality of users to efficiently autoconfigure a single video system without leaving behind the video content preferences. This addresses privacy concerns with respect to a viewer's video content preferences. It should be appreciated that the video system of the present invention establishes an unparalleled detailed profile of a viewer's video preferences.

Similarly, a parent may provide a child a user access media containing the child's content preferences to ensure that while the child is at a second location or household, the child is not exposed to video material that is not deemed suitable by the child's parent. The RAViT at the second location may compare the content preferences in the user access media with resident applicable content preferences and report any conflicts or automatically resolve the conflicts. For example, the visiting child's content preferences provide for more explicit material than the second parent would find suitable for their child. Ravit could report such a conflict or simply always adopt among the conflicting preferences the less explicit content preference in each category. A similar automated configuration may be performed by means of the networks communications capabilities that may be available to both the dumb RAViT 932 and the smart RAViT 931. This particular embodiment may or may not include the utilization of an user's access card.

A content-on-demand video network provides to a viewer, by means of a RAViT, remote access to content-on-demand services available from a plurality of video services providers.

Retrieving videos from a remote video provider permits subscribers to efficiently obtain, from an extensive videobase, a video to be viewed at the time of their choosing, over which they exercise complete control as to the subject matter, form of expression, and other elements comprising the video. Further, the resulting video need not comprise or result from a single content-on-demand video in a videobase. A video may result from the automated selection of a variety of segments/programs from one or a plurality of videobases.

Accordingly, for example, a user wishing to retrieve a summary, analysis, and background regarding a particular news event, will enter his/her request, and a keyword analysis of the request will then result in an on-line linkage through the service center to a database containing information on the videobases for the subject matter desired. In this example, a news source remotely located, will download a listing of the various sources of summary, analysis, background information, the corresponding video maps where available and necessary, and the overall lengths and costs, if any, of each segment. Based on this listing, the user may at his/her leisure produce a request for a video for his/her own viewing. In this example, a video comprising a 10 min summary from a news source, a 5 min analysis from another service, a 10 min analysis from a private source, a 30 minute lecture from a university, and copies of a relevant data from the Library of Congress are requested.

Once the user finalizes the video segment choices, the request is transmitted to the service center, wherein the various providers (libraries) which may be located anywhere in the world are electronically requested to transmit the respective segments/programs, video maps, and any user routines. These are logically assembled and merged by the service center and retransmitted to the user together with any billing information. The transmission and retransmission of the videos might be on a non-real time compressed digitized format.

The event duration in this example may be 15 minutes of connect time, 2 minutes of transmission time (for the 55 minute "video"). The costs for the service may be less than a conventional movie. The total cost for this service could be approximately $6.00 with a partial rebate for the user selection to activate the five minutes of targeted "advertisements" that are included. The particular billing methods and apparatus required are currently implemented in other on-line data retrieval services.

Since RAViT is both a retriever and a transmitter, the above "video" might be condensed by the user into a 10 minute summary and a 2 minute personal message and transmitted to another user, incurring connect time and redistribution charges of about $2.00.

In another example, a user may construct a content preference structure of any desired detail, including, for example, a variety of keywords to describe the video's subject matter, the story line, possible endings, and approximate video playing time. The user will transmit this information by means of RAViT to a video provider. The user will further indicate the video's delivery by requirement (minutes, overnight, days), and whether the request is for a single video or a series of videos, and their frequency.

The video provider will analyze the user request, and search the videobase for a video matching the user's requirements. If the video is found, then video information and billing, if any, are transmitted to the user for approval and subsequent video transmission to the user. If the video is not found, the user's request is forwarded to an appropriate video producer for possible production. The "custom" videos generally follow a preestablished per-transmitted viewable minute fee structure based on the subject matter and nature of the video.

Although other schemes are possible, production will depend on an expected or actual critical mass of viewers and any sponsorship, both public and private, that may be associated with the video. The systems communication architecture facilitates the communication and marketing required to obtain the necessary viewers and sponsorship for production.

Examples of the variety of uses of such a content-on-demand service include: i) a science fiction enthusiast causing video production of a particular story, i.e a 21st century version of "Romeo and Juliet"; ii) the desirability and structure of a sequel determined by the consensus of viewers; iii) updating of news stories no longer deemed "current"; iv) continued appraisal of developments in a specified field or subject area, i.e. significant events which might affect the price of a specified commodity; v) review of a political candidates positions; and vi) product purchasing and utilization information.

Typically, viewer's will request the delivery of specific pre-produced content-on-demand videos. This can be accomplished in a variety of ways including: i) specifying the video's title or code obtained from a reference guide; ii) making a selection from a listing in alphabetical order by title, subject matter, actors, etc.; iii) tree structure of video classifications, for example advertisements/automobiles/4WD; and iv) keyword searching and retrieval (similar to the Automated Patent Search implementation). It is noted that the reference guide may be available in a printed format or a format compatible with RAViT.

Once a video is selected, the entire content-on-demand video, including all the parallel and transitional segments and the video map, may be transmitted to the user's RAViT. Utilization of the video downloaded to the RAViT is then the same as previously detailed with respect to FIGS. 7A, 7B, and 7C, and FIG. 8.

When the video map is not downloaded, the video is transmitted that results from the application of the viewer's video content preferences to the video map of the requested video. That is, only a logical seamless sequence of only those segments that are consistent with a viewer's content preferences are transmitted in a real-time or a non real-time format over the network to a RAViT for display on a TV.

Utilization of the video need to await the completion of the downloading. The viewer can begin viewing the video in realtime while the video is being downloaded in realtime or non-realtime (burst downloading).

The downloading of the video need not be accomplished in one session. Short burst downloading will provide a portion of the video. As that portion is utilized control software will relink RAViT with the video provider, request and receive a next portion, and disconnect. During this operation, automatic and transparent to the user, a constant transmission of the video is maintained.

Short burst downloading is advantageous where the storage capacity of RAViT is insufficient for the storage of the complete video. Short burst downloading is also, for example, advantageous where a video provider's resources are challenged by a plurality of subscribers. By utilizing short burst downloading a single video stream is able to serve a plurality of subscribers simultaneously. The control logic of this architecture is analogous to that utilized by a single waiter serving a plurality of parties (tables) in a restaurant.

Alternative to RAViT initiating the re-linkage with the video services provider, the control logic of the video server periodically checks on the progress of the subscribers, downloading and scheduling subsequent transmissions responsive to each subscribers needs and the overall demand on the available resources.

Alternatively to the downloading a video, the subscriber remains online with the video provider during the transmission of the video and utilizes the hardware resources of the video provider. In an online architecture, a RAViT comprising principally communications capabilities without significant local storage, processing, or memory, is adequate. In such an architecture, a viewer's content preferences, if not stored in the RAViT, may be retained by the video provider.

The off-site video server will respond to the user's commands in a manner similar to that detailed previously for the video disc player implementation. The viewer's control over the video, such as for example pause and skip functions, are the same, whether RAViT retrieves a video from a remote or a local source.

Figure 10A:
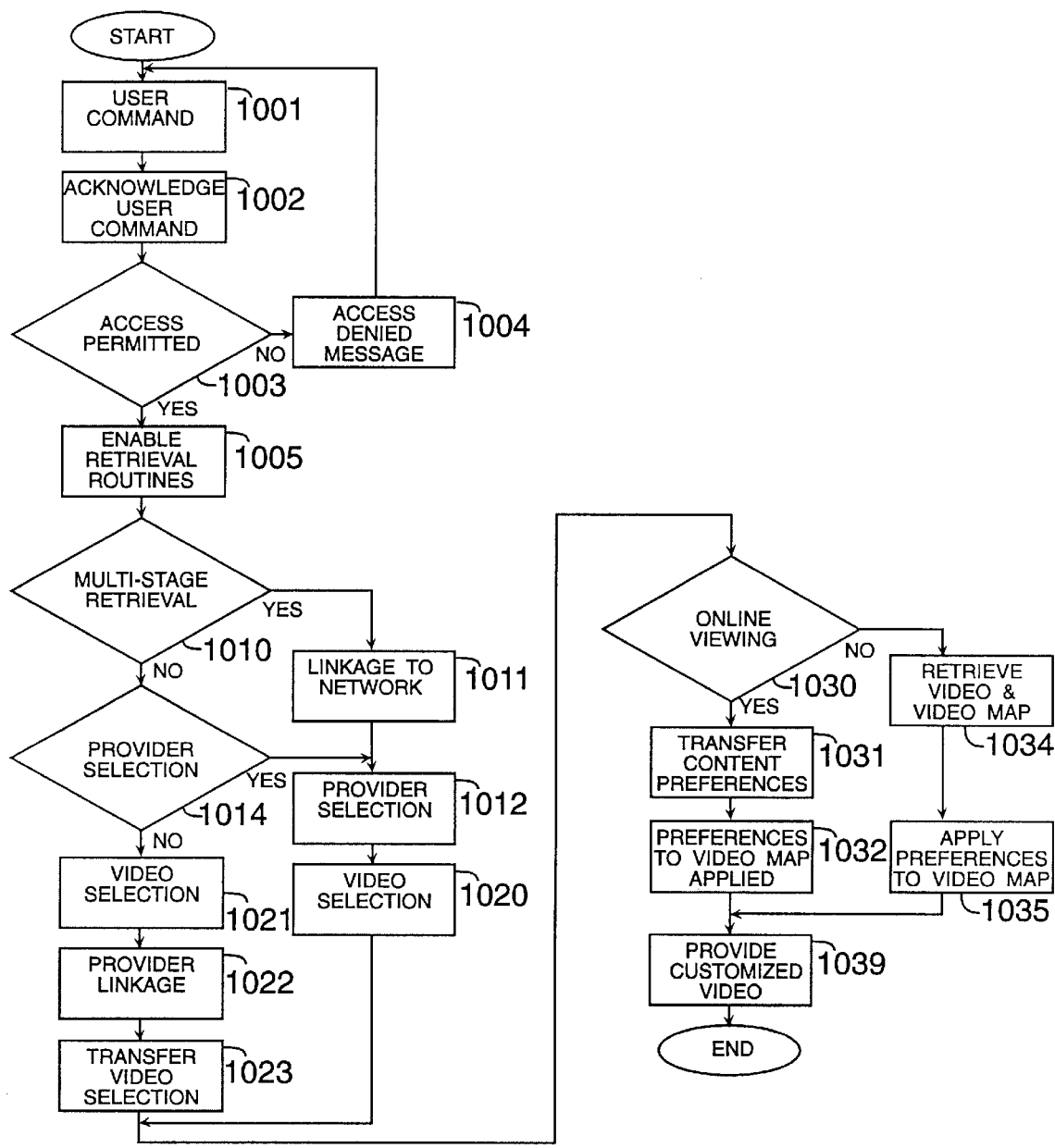
FIG. 10A is a flow chart detailing the steps of retrieving a content-on-demand video from a video services provider.

FIG. 10A is a flow chart further detailing the steps of retrieving a content-on-demand video from a video services provider. It is noted that handshaking and other routines are flexible and user configurable and a number of permutations and variations of what is detailed are possible.

In operation, RAViT normally provides a variety of communication and background services (e.g. videophone, video fax, security, appliance management) to the user and therefore is ready to respond to an user command 1001. Upon receipt of an user command, RAViT provides power to a display unit (TV) if necessary, and transmits an appropriate acknowledgment 1002.

RAViT access routines previously detailed with respect to FIG. 7A steps 703–709 are here shown in FIG. 10A as block 1003. In a preferred embodiment, these routines reside within RAViT and are executed prior to establishing a communications linkage with either a network administrator or directly with a video services provider.

If access is denied 1003, an error message 1004 is provided to the display and RAViT is returned to the state prior to the user active request. Delay routines may be implemented to provide the user the opportunity to attempt to obtain access without RAViT going to "sleep".

If access is permitted 1003, retrieval routines are enabled 1005 to permit the remote retrieval of a video. It is noted that in the case of the video dialtone model, there may be a multi-stage retrieval routine 1010 when the viewer first establishes communications with the network administrator 1011, for example a cable or telephone company, then selects a particular video services provider 1012, and then request the desired video 1020.

Alternatively, retrieval routines 1014 permit a direct selection of a video services provider 1012. Video selection 1020 then proceeds online with the selected video provider.

A video services provider can be preestablished as in the selection of a long distance communications carrier. In that case, the viewer would skip having to select a services provider immediately prior to a video request.

Alternatively, a viewer may establish relationships with specific video providers for specified services. In such a case, the video selection process 1021 itself determines with which provider a communications linkage is automatically established 1022. The result of the video selection process is automatically transferred 1023 to the appropriate provider upon the establishment of a communications linkage. The selection of a video services provider is not required when a viewer obtains all the services from a single provider.

It is noted that other combinations are possible and that retrieval routines may reside within RAViT to further minimize the online time, or be provided online at different points in the communications than shown here. The video selection process may implement any one or more routines that are suggested by the examples herein provided.

Once a video is selected, if the viewer remains online during the viewing of the video 1030, the viewer's content preferences are communicated to the video provider 1031. The video provider server then applies the viewer's content preferences to the map of the selected video 1032 and provides the resulting seamless and continuous version of the video that is consistent with the viewer's content preferences 1039. In this case the viewer remains online during the viewing of the customized video 1039, but has access to video viewing control functions as if the video was directly available to the RAViT.

Alternatively, the entire content-on-demand video, including all the parallel and transitional segments and the video map, are retrieved from the video provider 1034. Utilization of the video downloaded to the RAViT is then the same as previously detailed with respect to FIGS. 7A, 7B, and 7C, and FIG. 8. Principally, the viewer's RAViT applies the viewer's content preferences to the map of the selected video 1035 and provides the resulting seamless and continuous version of the video that is consistent with the viewer's content preferences 1039. In this case the viewer has direct access to the RAViT's video viewing control functions.

Whether only the resulting version of the video is downloaded, or the entire video, including the video map, is downloaded, the viewer may interact with the video to the degree that the viewer desires.

If RAViT is offline and the interaction requires additional video from the video services provider, RAViT automatically reestablishes communications with the appropriate video services provider and brings the video server up to speed. That is, RAViT automatically provides the required information to enable the video server to comply with the viewer's requirements.

It is intended that interactive capabilities that are taught by interactive and multi-media systems are provided the user of RAViT. A number of other interactive capabilities are made possible by the random access capabilities of RAViT in combination with the content-on-demand architecture.

Figure 10B:
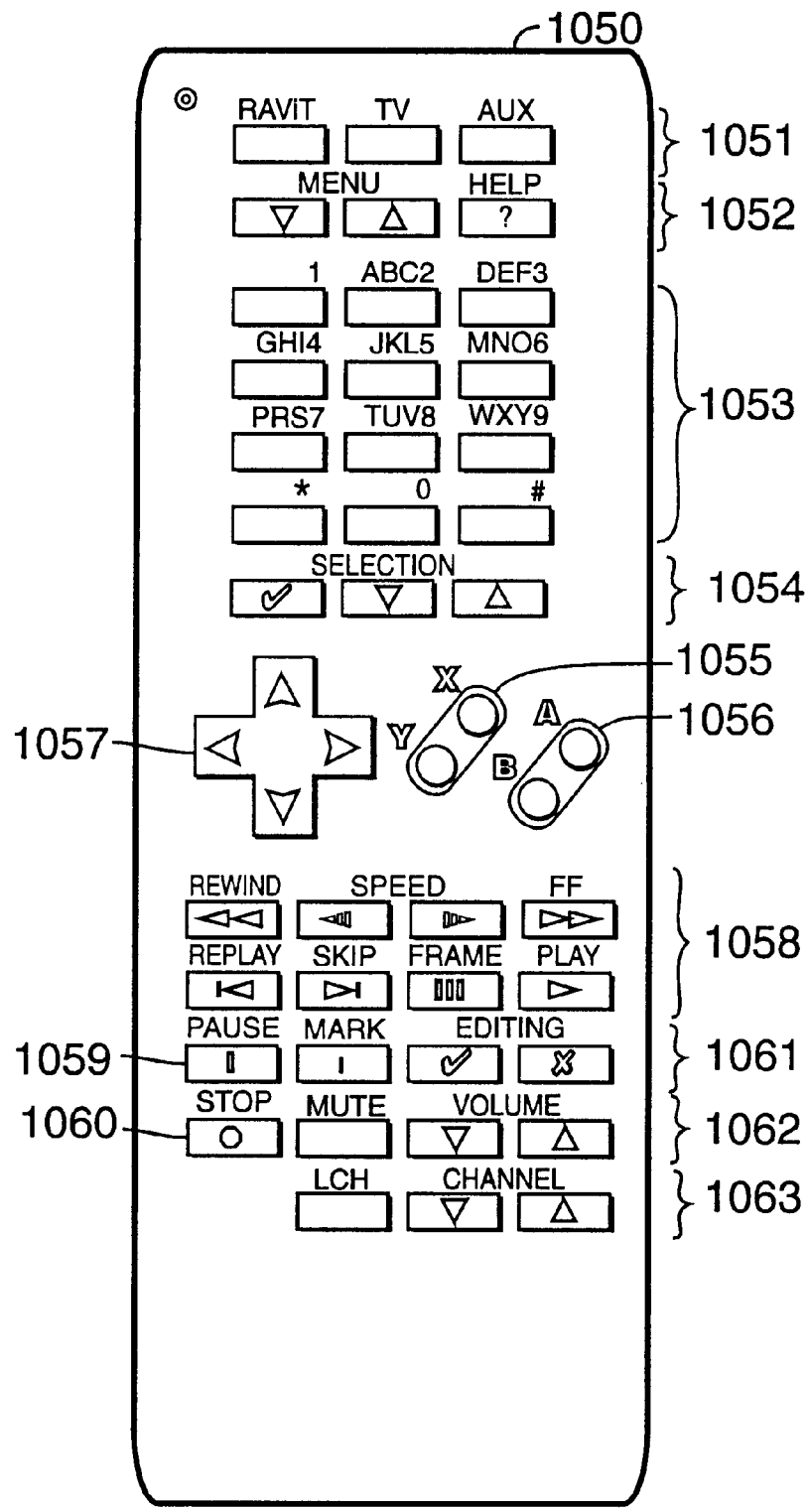
FIGS. 10B and 10C are illustrations of infrared control devices.

FIG. 10B is an illustration of a battery powered infrared control device 1050 of conventional dimensions and construction configured as per the teachings herein. The keys of such device comprises RAViT, TV, and an auxiliary device power on/off keys 1051, menu control keys 1052, a telephonic numeric keypad 1053, selection control keys 1053, gaming controls 1055–1057, video transmission control keys 1058 including a pause key 1059 and a stop key 1060, editing control keys 1061, volume control keys 1062, and channel control keys 1063. Keys may be relabelled, and other keys found in the art may be added responsive to the particular RAViT embodiment requirements. For example, in addition to, or alternatively to, the gaming control shown which can serve functions conventionally provided by shuttle controls, shuttle controls may be provided.

The skip and replay keys provide the viewer access to the functions that utilize the capabilities that are made possible by a video segment map. During the viewing of a video, pressing the skip key causes the automatic skipping of the further transmission of the current segment, and the instantaneous transmission of the next logical segment.

For example, during the viewing of a panel discussion, a viewer may for a variety of reasons prefer to exclude a panelist from the program. This the viewer can effectively do with the skip function. That is each time the panelist begins to speak, the panelist gets skipped. Advanced skip functions automate the skipping of every instance of the appearance in the program of that panelist. Similarly, a skip back key or a replay key replays the current segment or the immediately ended segment.

It is noted that segment definitions for the skip and replay functions need not be congruent with other content segment definitions. That is a segment skipping request may cause the skipping of a plurality of related segments.

The video map provides beginning and end segment identifiers and the identifier of the next logical segment. A video map makes possible intra-video functions that would otherwise not be available.

Other functions permit interactive modification of the video map. The edit keys 1061 permit flagging a segment during the viewing of the video. The segment exclude key permits the viewer to cause the current scene to be automatically excluded the next time the program is viewed. The segment include key is utilized for example, by a parent to indicate that a possibly objectionable segment may be included in the program provided a child.

The mark key permits the viewer to define a segment. The first time the key is pressed, it identifies the beginning frame. The second time the mark key is pressed, it identifies the end frame. The segment include and segment exclude keys would than be utilized to code the viewer defined segment. Additionally, the alpha-numeric key pad 1053, menu 1052 and selection keys 1054 can provide access to segment coding functions.

It is noted that the speed keys provide the viewer control over the transmission rates of, for example, the fast forward, rewind, frame advance, and play functions. Other keys may be used in combination, for example, while the video is being fast forwarded, the skip key may be utilized by the viewer to further accelerate the transmission.

At any transmission speed a clean video image is transmitted to the television. That is frames are dropped and parts of segments are dropped as the transmission speed increases. As will be further detailed below a clean audio transmission is also provided.

Figure 10C:
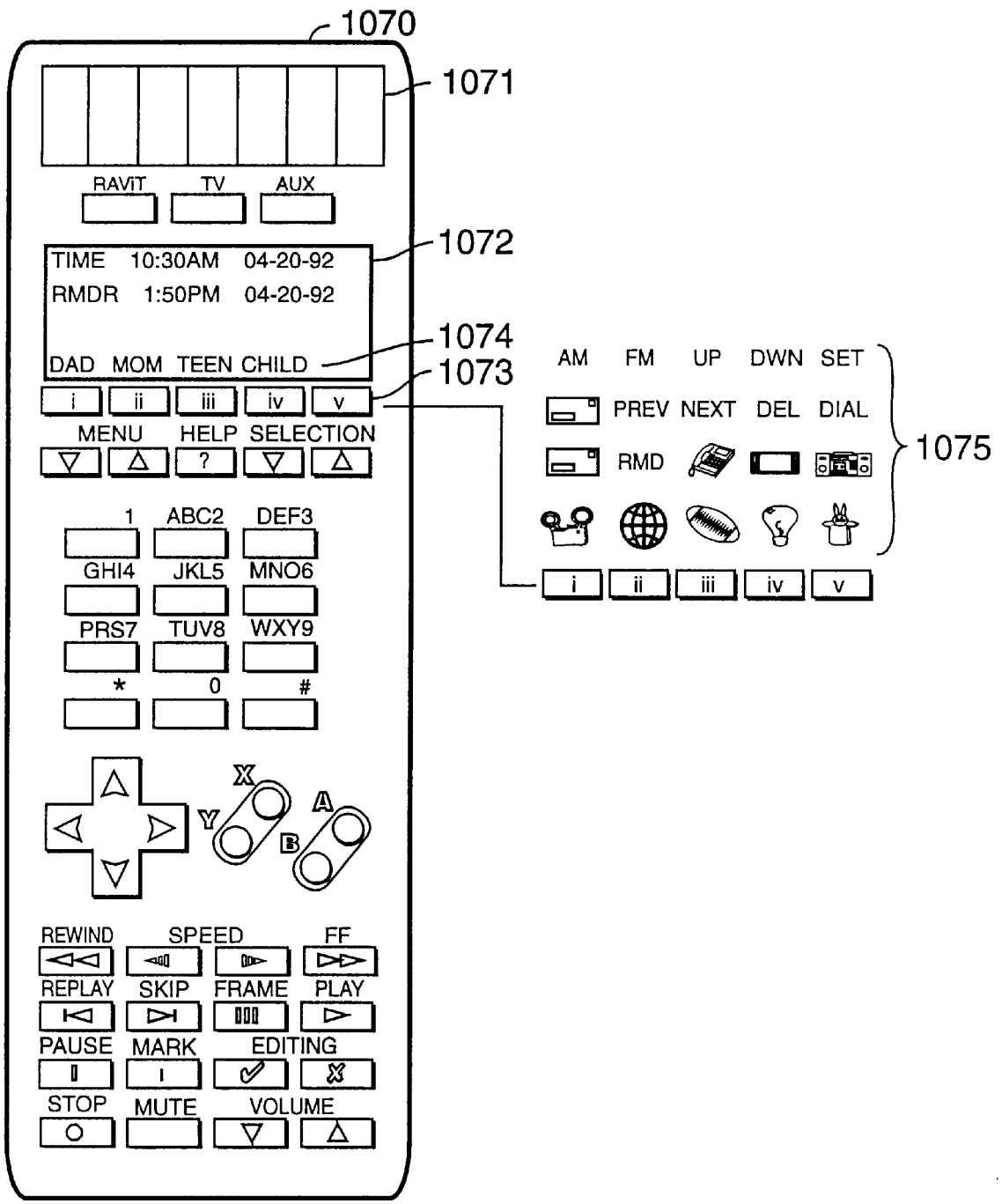

FIG. 10C is an illustration of a light powered 1071 infrared control device 1070 version of the device detailed with respect to FIG. 10B. The control device of FIG. 10C is further distinguished from the control device of FIG. 10B by its LCD 1072 and interactively configured and labelled function keys 1073.

The interactive key labelling means permits a reduced set of function keys to provide access to a multiple set of functions. The five keys labelled i–v 1073 perform principally all the functions previously detailed with respect to FIGS. 4D–4G. In this case the LCD 1072 labels 1074 the keys 1073.

As illustrated in the LCD window 1072, initially the key menu consists of the appropriate labels for each of the users. Pressing each of the keys causes an appropriate new menu of labels to be displayed in the LCD. Examples of other graphic and character based menus 1075 are illustrated.

Devices may be configured to provide a wide variety of integrated control functions and capabilities. To that extent the teachings of patent application Ser. No. 07/917,297, filed Jul. 23, 1992, titled: "Multi-Function Electronic Communication System", are incorporated by reference herein.

A video image transmitted to the video display device may be a fraction of the available image. A viewer for example may desire to zoom in on an image. A zoomed image or "window" transmitted to the display device is a subset of the available image ("image"). Zooming capabilities are enhanced by video compression technologies that lend themselves to resolution independence, enabling high quality zooms to higher resolutions. Software controlled zooming functions may be implemented that zoom towards the center of the image. In these instance the centers of the window and of the image are the same. The viewer could access this function with, for example, the A-B buttons 1056 of the gaming controls in the remote device detailed with respect to FIG. 10B. Pressing the A-button would cause software to zoom in on the center of the image. With each pressing of the A-button a smaller portion of the image is enlarged to fill the display. The B-button would have the opposite effect. Pressing the B-button would enlarge the field of view of the window. Eventually restoring the window to the available image.

It should be evident that the viewer may, for example, utilize the control pad 1057 of the gaming controls to place the zooming center point on any point on the image. This will permit the off center magnification of the image and the creating of a window whose center is not the center of the image. As the video is transmitted the viewer could shift the center of magnification or track the target as it moves within the window and zoom in or out as desired.

What is detailed herein, however, is a method of automatically maintaining the viewer defined target within the viewer defined window as the target moves within the image. Under control of an application software the target is maintained within the magnification of the image defined by the viewer. As is detailed with respect to FIG. 10D, once the viewer determines the target and desired zoom level, the window continues to display the target as the target moves relative to the host image. In instances where the zooming center point is placed close to the image's edge, the effective center point is automatically shifted to provide a full window.

Figure 10D:
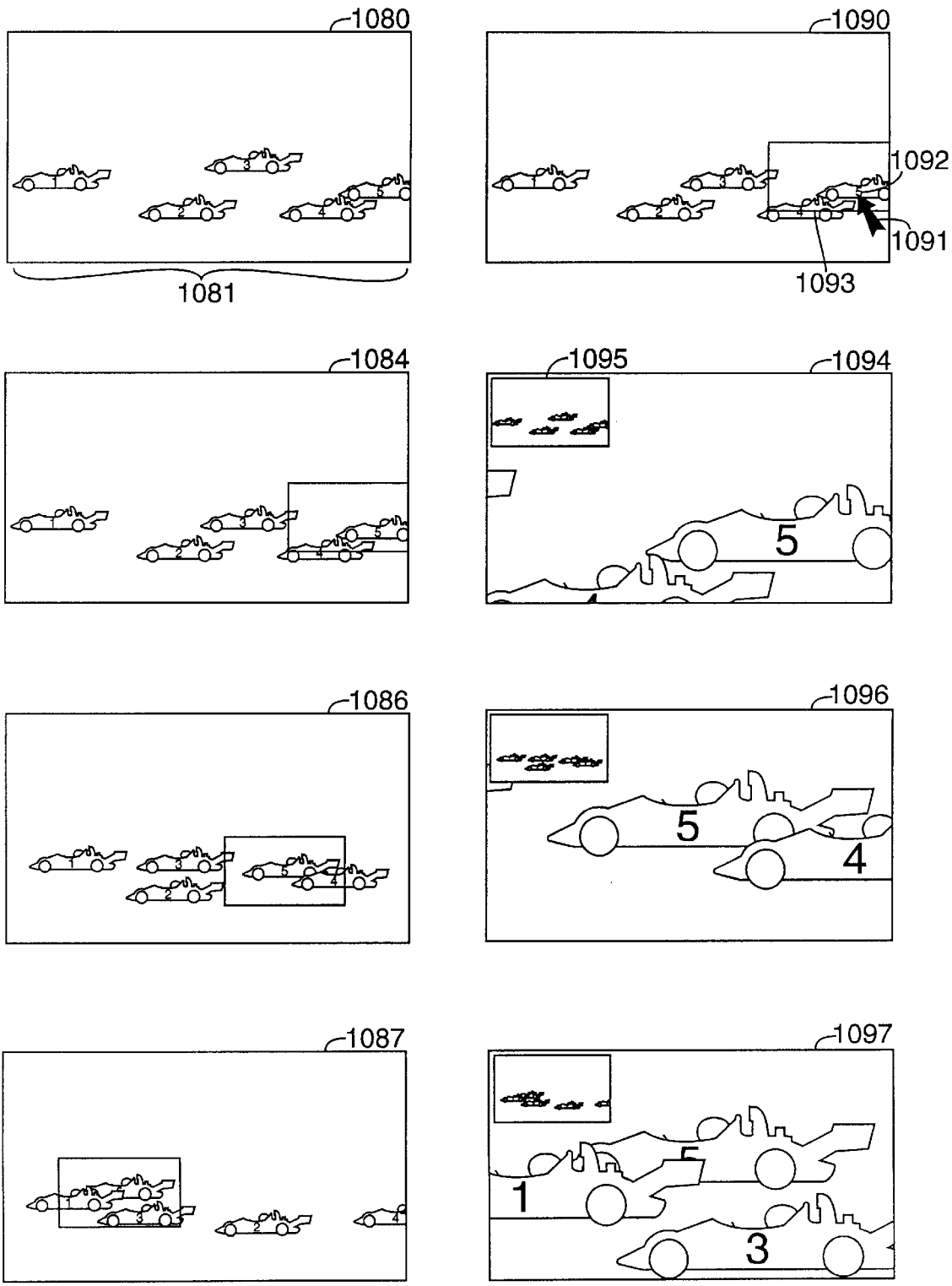
FIG. 10D is an illustration of the automatic display of a viewer defined target as the target moves relative to the host image.

FIG. 10D comprises two sets of illustrations. The left side of FIG. 10D represents the set of available images resulting from "frames" of a video digitally stored video. The right side of FIG. 10D represents the set of images actually transmitted to the display device. This particular example is that of an automobile race.

A "first" image 1080 comprises five racing automobiles. This same image 1080 is transmitted to the display device. Pressing of the X-button of the game controls enables the target selection functions, causing the displayed image 1090 to include a target pointer 1091. Utilizing the game control pad, the viewer moves the targeting pointer 1091 to the desired target. In this instance the selected target is the race automobile numbered five 1092. Pressing the X-button defines as the target the area or point identified by the pointer.

Depending of the configuration selected, a window frame 1093 is transmitted that is automatically sized to display the target at the center of the window frame.

In instances where the target is moving, it may be desirable that the window look ahead of the target. In such cases the target may be automatically displayed off center in the window. Additionally, the viewer is provided the option to define the target's relationship to the center of the window. For example, in the viewing of a football game, the viewer may target a wide receiver, define a window of ten yards and a window center three yards ahead of the target. The window frame 1093 may be moved by the viewer with respect to the target by means of the game control pad, establishing a look ahead/behind reference with respect to the target 1092. Additionally, the frame may be rotated and/or inverted.

The viewer may utilize the A-button to zoom in on the defined target. The resulting window of the image defined by the window frame is then transmitted to the display device. Pressing the A-button once more will further zoom in utilizing the target or the center of the window frame as the center of the magnification.

As is illustrated, the displayed window 1094 includes, at the option of the viewer, a smaller representation 1095 of the available image 1084. By utilizing the Y button of the game controls, the viewer is able to command the application software to switch back and forth between the image 1095 and the window 1094.

A subsequent image 1086 depicts the race as it progresses. The target race automobile number five is shown passing race automobile numbered four. As is illustrated, the application software has maintained the targeted automobile centered in the displayed window 1096 while the target has shifted relative to the image. The application software has also maintained the magnification.

A later subsequent image 1087 depicts the further progress of the race. Again the software automatically maintains both the magnification and the targeted race automobile in the displayed window 1097.

To convey the target's movement, the tracking of the target may be "imperfect". The application software may pursue but not necessarily always display the target in the center of the image.

For example, the change in the velocity of the window relative to the change in the velocity of the target includes a variable response algorithm.

The software program may depend on a variety of methods of identifying, recognizing, or separating the targeted object with respect to the available image. A first method relies on the producer of the video to identify likely targets of magnification. In such a method, each of the race automobiles is pre-identified and the required data is included as part of the video map or data associated with the video. Assisted by software a video editor will essentially have to create the information necessary to be able to maintain the target within the viewer defined window. To target a race automobile, a viewer will enter the corresponding identification number. Magnification suitable for each target can also be preset by the video producer.

A second and preferred method utilizes the fact that objects in an image are differentiated from each other by shape and or colors. Thus, for example, upon the viewer placing a cursor on the numeral five of the target race automobile, the software creates an identification for the target that will permit the automatic recognition of the target as the target moves about the image.

The identification or signature of the target may comprise mathematical equations, spatial representations, color differentiations, pixel signatures, and any combination of these and other image elements. This process is facilitated by the fact that the image is already digitally stored and that compression techniques such as fractal and wavelet utilize mathematical techniques. Thus if the image is being delivered in wavelet compressed form it already includes the required different spatial relationships.

The identification of the target need not be static. For example having distinguished the numeral five from the background and created one or a plurality of mathematical equations of the outline of the numeral five, the software is not only able to anticipate the likely location of the identification in the image, but it also able to recognize and/or anticipate different perspectives or distortions of the identification as the host object moves.

There are instances where the identification of the object is absent in one or a plurality of frames. In the automobile race, this would occur when, for example, the target automobile is passing a competitor on the "outside". Several methods are available to cause that the viewer desired magnification and window are maintained. In a first method, the video map provides information to the application software when the character of the image changes. If such information is not provided, the window is maintained. The application software projects the movement of the target in the image, and reacquires the target as the identification is again recognized.

In a second method, the application software creates one or more secondary identifications associated with the target. For example, a logo, barcode, or other identification on the target automobile or an associated object such as the helmet's signature of the driver of the target automobile. As the primary identification is lost, the software proceeds on the basis of the availability of the secondary identifications. When all are unavailable, the window is abandoned and the image transmitted.

If the magnification request remains active, when the image provides the required identification, the target is reacquired and the window is restored.

It is noted that teachings herein are applicable to a broad range of applications. For example, in the viewing of a football game the viewer may elect to isolate on any of the players, as well as other persons and objects normally included in a wide angle image of a stadium. In a second example, the target acquisition method may be utilized to enable a fire and forget missile to lock on a target and direct itself to the target. The image lock acts as an active homing system once effective video acquisition is achieved.

Figure 11A:
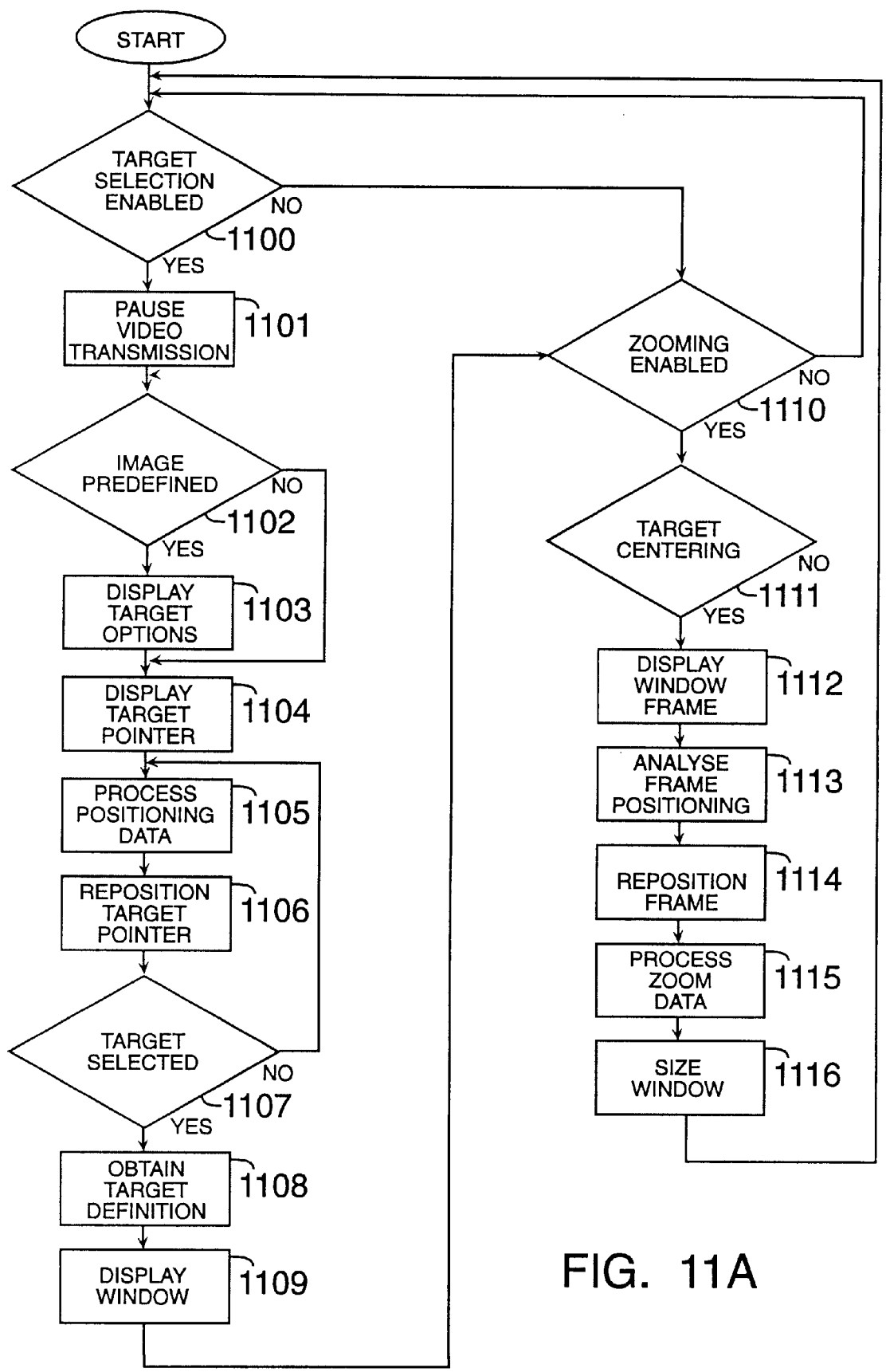
FIG. 11A is a flow chart detailing the steps of creating a viewer defined window.

FIG. 11A is a flow chart further detailing the steps of creating a window responsive to the viewer defined target and magnification. It is noted that the zooming and targeting functions are continually available to the viewer during the viewing of a video. This is represented by the looping character of the flow chart. As previously indicated and as is shown in the flow chart the zooming and targeting functions while integrated may be enabled independently of each other.

Upon receipt of a target selection signal, for example, the pressing of the X-button of the game controls, target selection functions are enabled 1100. The target selection functions automatically pause the transmission of the video 1101.

In instances where the targets in the image have been predefined 1102, the target selection functions display the target options 1103. The displayed image provides a target pointer 1104. Utilizing the game control pad, the viewer moves the targeting pointer to the desired target option. The application software processes the positioning data 1105 and repositions the target pointer on the display 1106.

A second target selection signal indicates the selection 1107 of one of the predefined targets. Alternatively to the game control pad a viewer may select a target by means of, for example, the alphanumeric control pad.

Alternatively, or in instances where the target are not predefined, the target selection functions display a target pointer 1104 as before. As the user controls the target pointer, the application software processes the positioning data 1105 and repositions the target pointer on the display 1106. The second instance of a target selection signal indicates the selection 1107. In this case the selection is responsive to the pointer location.

Following the selection of a target, a target definition if available is obtained 1108, and a window is displayed 1109 that is automatically sized to display the target at the center of the window.

Zooming functions are enabled 1110 upon the receipt of a zooming signal, for example, an A-button or B-button signal. Where the viewer is provided the option to define the target's relationship to the center of the window 1111, a window frame is displayed 1112 and the viewer can relocate the window frame with respect to the target by means of the game control pad. The analysis of the frame repositioning data 1113 causes the appropriate re-display of the frame 1114. Other options may at this time be provided the viewer including for example target tracking options.

The processing of zoom data 1115 causes the automatic sizing of the window 1116 responsive to the increase in magnification or decrease in magnification request.

With respect to the sound that is associated with the video, it is intended that the sound be responsive to the window generated. In the automobile race example, as the magnification is increased the volume of the engines are increased. Clearly separate sound tracks may be pre-associated with possible targets and the volume of each tract may be spatially linked to the volume of the other tracks. The sound associated with a window results from the combination of the sounds of each of the elements of the image responsive to the spatial links. The volume of the sound being a factor of the apparent distance to the camera eye. Thus if the image covers the entire race track, the sound of all the automobile engines are combined. However, the volume of the combination is responsive to the apparent distance to the camera.

Where the viewer targets a specific automobile and zooms in. The sound volume of the target is increased. The sound volume of the other tracks are adjusted responsive to the spatial links as they relate to the magnification factor. For example, while the window would exclude a number of other automobiles included in the image the corresponding sound tracks are included, the volume of which is adjusted to reflect their relative distance to the target.

It is noted that the identification of a target may include the audio data as well. Thus when the visual identification is lost, the audio data confirms the presence or absence of the target and its relationship to the window and the image.

It is specifically intended herein that the zooming and sounds enhancements are also integrated with the nonlinear editing and special effects software of the nonlinear editing systems.

As indicated at the outset, the content-on-demand architecture applies as well to movies, news, sports, educational videos, and to advertisements. The content-on-demand video delivery system herein detailed includes the delivery of advertisements, informationals, commercials, and other videos for the promotion of products and services ("advertisements"). It should be clearly noted that the specification herein is directed to any form of video, and applies as well to advertisements. For example, wherever the word "video" appears in the flow chart of FIG. 10A and the corresponding detailed descriptions it could very well be replaced with the term "advertisement".

A viewer may not object to, and in fact may request, the inclusion of advertisements, which are informational in nature, presented in a manner consistent with his/her taste level, for a product or service in which the viewer may have an interest; especially if the acceptance for viewing of such an advertisement will additionally reduce the cost of, or subsidize, other videos obtained by the viewer. However, teachings that are confined to whether an advertisement is, or not, included in a program fails to realize the advantages of a random access pointcast architecture.

A random access pointcast architecture provides the means for a viewer to select and retrieve a desired advertisement, and provides the means to compensate the viewer for the verified apparent viewing of the advertisement. Such a system provides a closer match between the viewer's interest and the object of the advertisement, and further increases the potential purchase by the viewer of the promoted product or service, than a system directed to an inclusion/exclusion determination.

When the viewer selected video is an advertisement, video server software credits a viewer's viewing of an advertisement towards the charges incurred by the viewer in the selection of other video services for which the viewer may incur a charge. By subsidizing a viewer's utilization of other video services with a credit received for the viewing of a selected advertisement, the viewer receives compensation independently of the purchase of the advertised product or service.

The video provider system previously detailed with respect to FIG. 9 comprises the required hardware and software technologies required to customize a selected video and either debit or credit the viewer's account. A viewer's account may be debited by subscription to video, communication, and other services. The debiting may be program specific, such as pay-per-view or video-on-demand services, services specific, or a non-specific service charge. A credit may be issued for refunds, for services directly or indirectly provided by the viewer, or for compensation, rewards, awards, or winnings due the viewer.

A video system for delivering customized video services and debiting and crediting a viewer's account comprises, for example,: i) memory means for storing a plurality of videos, each of the plurality of video associated with a corresponding segment map defining a plurality of segments, each of the plurality of videos comprising a debit or a credit; ii) communicating means for communicating with a viewing system, such as a RAViT, accessible by a viewer; iii) preferencing means for establishing the viewer's video preference and video content preferences; iv) processing means for selecting a video from the plurality of videos responsive to the viewer's video preference, and for automatically selecting video segments from a plurality of video segments of the selected video responsive to an application of the viewer's video content preferences to a video segment map of the selected video; v) random accessing means for retrieving the selected video segments; vi) transmitting means for transmitting, as a customized video, the retrieved video segments to the viewing system; vii) accounting means for debiting or crediting an account of the viewer depending whether the selected video requires a debit or a credit; viii) verifying means for selectively verifying an apparent viewing, by the viewer, of the transmitted customized video; ix) purchasing means for processing a purchase by the viewer; and x) escrowing means for automatically escrowing a deposit by the viewer for the purchase until after the viewer has received satisfactory delivery of the purchase.

Figure 11B:
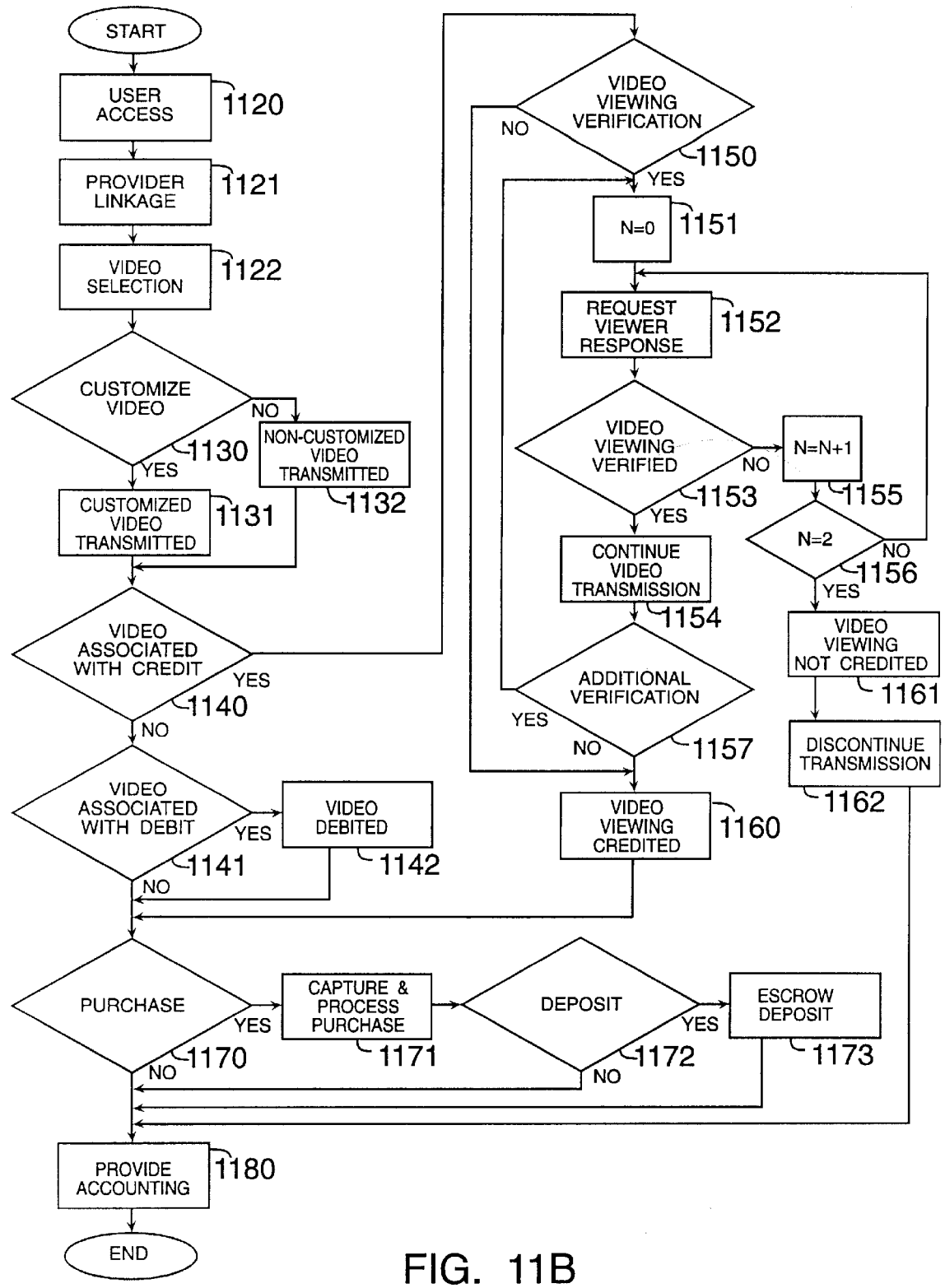
FIG. 11B is a flow chart detailing the steps of crediting or debiting the viewing of a viewer selected video.

The flow chart of FIG. 11B summarizes the teachings detailed with respect to FIG. 10A and further details the steps of crediting or debiting the viewing of a viewer selected video.

In the retrieving of a video for which the viewer may have an interest, the viewer obtains access 1120 to RAViT (steps 1001–1005 FIG. 10A). If access is provided, linkage to a video services provider is obtained 1121 (steps 1010–1014 FIG. 10A) and a video is selected 1122 (steps 1020–1021 FIG. 10A).

As indicated with respect to FIG. 10A, linkage to an appropriate video provider may automatically follow video selection (steps 1121 and 1122 are reversed). RAViT's video disc capability can provide for video selection phase prior to establishing a communications linkage with the video provider.

If the video is customizable 1130 as per the teachings herein, the video requested by the viewer is automatically customized responsive to the application of the viewer's video content preferences to a video segment map defining a plurality of segments of the video. The customized video is transmitted 1131 (steps 1030–1039 FIG. 10A) to the viewer. Alternatively, a non-customized video is transmitted 1132 to the viewer. It is noted that both customized and non-customized videos may be provided in a single session.

If the video is associated with a credit 1140, such as may be case with the viewing of an advertisement, a video viewing verification routine 1150 may be enabled. Otherwise the viewing of the video is presumed and the viewing of the video is credited 1160.

If a viewer verification routine is enabled 1150, at a point in the transmission of the video, a request 1152 is made of the viewer requiring that the viewer respond by any one of the viewer access means that may be implemented in the viewer's RAViT. The request may be as simple as a graphic at the bottom of the screen requesting that the viewer press the play key in a remote control unit.

Alternatively, the viewer may be asked to select one of a plurality of choices. This would be advantageous when the advertisement comprises interactive elements. In this case, the viewing verification is transparent. Still alternatively, or additionally, interactive gaming methods may be incorporated. For example, the viewer is requested to correctly answer a question relating to the subject matter of the advertisement.

The specific technique of establishing that the advertisement is being viewed is secondary. A variety of other active and passive means may be implemented that establish a viewer's presence during the viewing of the advertisement 1153.

Once the viewing of the advertisement is verified 1153, the transmission of the video continues 1154, and the viewing of the video is credited to the viewer's account 1160.

If during a specified time the viewer fails to respond to the viewing verification 1153, the viewer's account is not credited with the viewing of the video 1161. Further transmission of the video may be continued or discontinued 1162.

If a first video viewing verification fails 1153, viewing verification may be repeated. As illustrated, a simple counting routine 1151/1155/1156 is set up, for example, to repeat at least once, the viewer response request 1152.

As will be discussed further in detail below, if the viewing of the advertisement is interrupted by a service or function provided by RAViT or that RAViT is aware of, viewing verification routines compensate for the event. That is, the logic of various services are integrated to compensate for RAViT's multiuser multitasking environment.

Video viewing verification may require a plurality of viewer response requests 1152 prior to crediting the viewing of the video 1160. In instances, where additional verification is required 1157, viewer verification is repeated.

The transmission of a video need not have been interrupted during the viewing verification. It should also be noted that viewing verification can occur during the transmission of the video, and/or at the conclusion of the transmission of the video.

If the video is associated with a debit 1141, the transmission of the video is debited from the viewer's account 1142. The debiting of the viewing of the video may incorporate a video viewing verification routine above detailed with respect to the crediting of a viewing of a video. That is, the debiting of a video to a viewer account is responsive to an appropriate viewer response to a verification request. As in the credit situation, if the viewing verification fails, further transmission of the video may be terminated. In both a credit situation and a debit situation, if transmission of the video is terminated, a record is retained of the point of termination, so that the video, upon viewer request, may be continued from the point of termination.

In instances where the viewing of the video results in the viewer executing a purchase 1170, purchase information is captured and processed 1171. If a deposit is associated with the purchase 1172, the deposit is automatically escrowed 1173.

Where a purchase occurs prior to a video viewing verification, the purchase constitutes effective viewing verification, and therefore, further viewer verification may be omitted.

At the conclusion of the transmission, the viewer is provided with an accounting 1180 of the crediting or non-crediting of the viewing of the video.

Figure 12A:
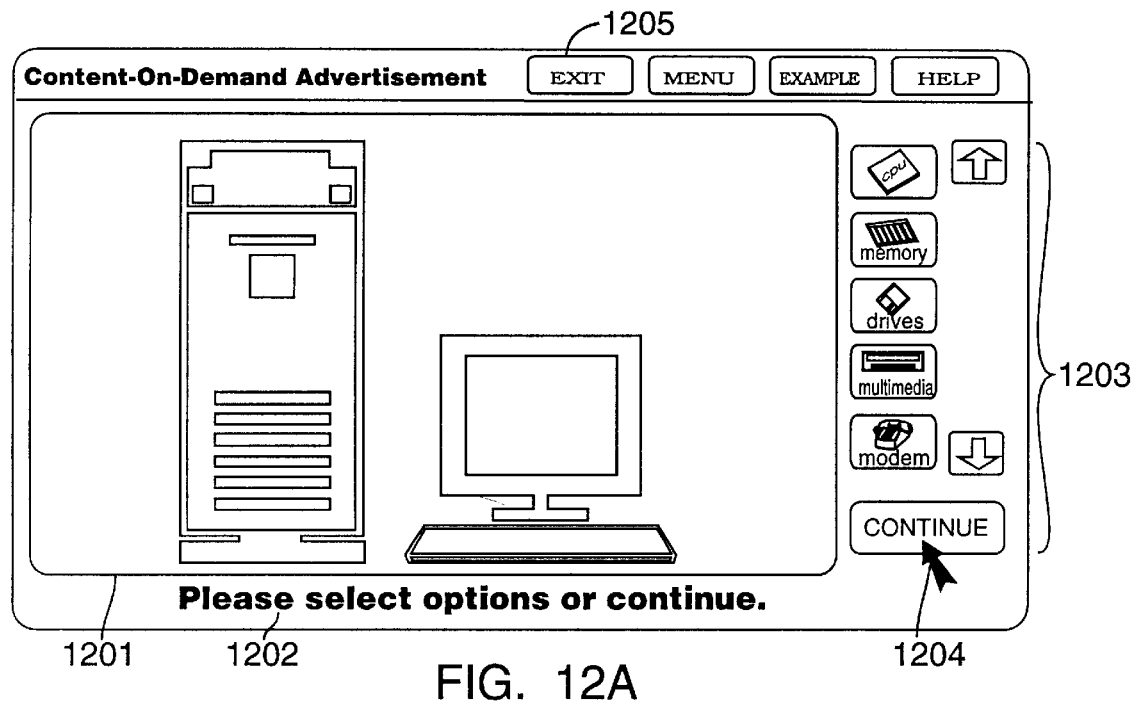
FIG. 12A is an illustration of a viewer response request screen.
Figure 12B:
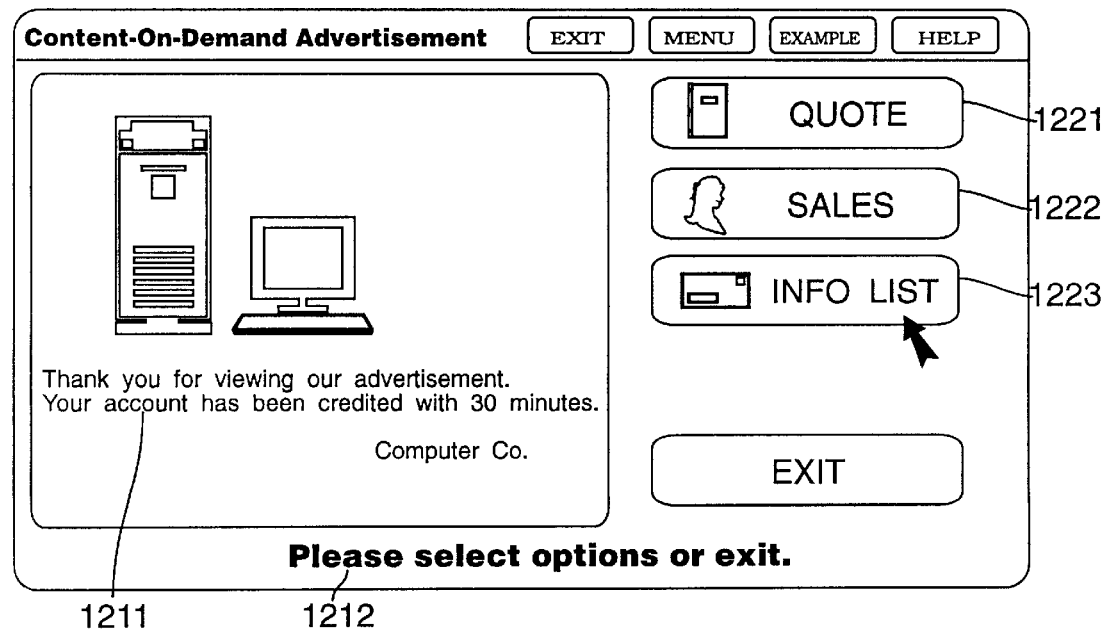
FIG. 12B is an illustration of a screen notifying the viewer of the crediting of the viewing of an advertisement.
Figure 12C:
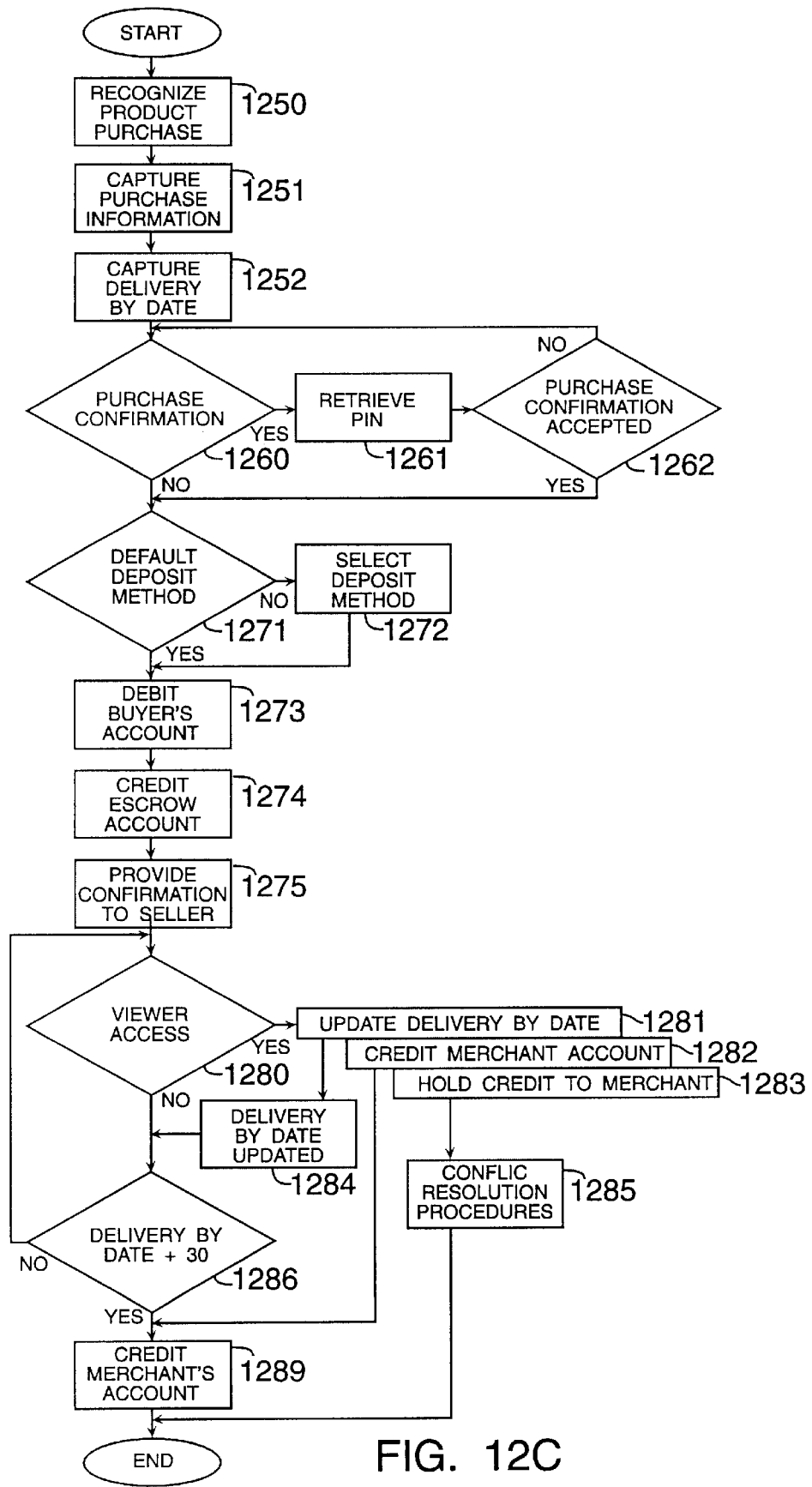
FIG. 12C is a flow chart detailing the steps of escrowing a buyer's deposit for the purchase of merchandise.

The automatic escrowing of a deposit is further detailed herein with respect to FIG. 12C.

FIG. 12A is an illustration of a viewer response request screen. In this case, a viewer contemplating the purchase of a personal computer has requested a number of advertisements from a plurality of vendors. During the transmission of the advertisement, the video of the product is provided in a window 1201, a viewer response request is introduced 1202, and a number of options are provided 1203. The options include obtaining information for specified components of the computer or for continuing with the presentation of the advertisement. In this case, the viewer has elected to continue 1204 with the presentation.

Throughout the presentation, the viewer has available a number of options, including exiting 1205 the presentation. Any of the viewer interactions with the presentation within the required period of time may provide verification of the viewing of the advertisement.

FIG. 12B is an illustration of a screen notifying the viewer of the crediting of the viewing of an advertisement. In this instance, the viewer is being credited with 30 minutes 1211.

The accounting of the viewer's account may be based on any number of systems whether monetary or non-monetary. A simplified relationship may be established between credits from advertisement and debits from non-sponsored videos. In this instance, the viewer's spending three minutes with the advertisement is compensated with a credit of 30 minutes.

FIG. 12B also illustrates the interactive options 1221–1223 of the advertisement and the underlying interactive capabilities of the hardware and network. The viewer may select to obtain a quote 1221, be directly connected to a sales representative of the product 1222, and/or provide viewer identification 1223 to the product company for future communications and advertisements. Crediting of the viewing of the advertisement may be made contingent upon the viewer exercising a specified one option that may be of value to the advertiser. For example, provide viewer identification 1223 to the advertiser.

Referring once more to FIG. 9, it is noted that when the viewer's RAViT 931 remains online during the viewing of the advertisement retrieved from a video services provider 911, the accounting is performed by the provider's processing hardware and software 924 for maintaining accounting and support services in connection with video services provided.

Alternatively, RAViT's 931 processing and control programs may itself maintain the accounting, providing such accounting to the provider's 911 accounting system 924 at the conclusion of the transmission or at other times. This is advantageous when the advertisement is downloaded to RAViT prior to viewing, or when viewing and downloading begin at the same time, or when the downloading is completed prior to the viewing.

It should be appreciated that the relationship between the advertiser and the viewer justifies the concept of compensation for the viewing of the advertisement. In the advertising delivery system disclosed herein, the viewer is being compensated for the apparent viewing of the advertisement, not for the purchase, if it occurs, of the advertised product or service.

A transactional one to one relationship is established that is absent in conventional broadcast television. Clearly, the pointcast capability utilization permits the advertiser to maximize the return on the advertisement dollar. The very effective targeting provided by the system and methods disclosed herein makes possible an increased expenditure per viewer.

A number of control mechanisms are contemplated to minimize an unintended use of the system. For example, repeated viewing of an advertisement within a given period of time would not earn credits. Minimal credits initially provided may be augmented by the purchase of a product, whether from the advertiser or a competitor, that was the subject of a viewed advertisement.

Compensation for the viewing of an advertisement may take many forms. For example, a viewer may be compensated or rewarded with the transmission of a desirable motion picture not otherwise available free of charge or at a discount.

Further, there need not be any relationship or linkage between the form of the compensation for the viewing of an advertisement and the other services that the viewer may obtain. Coupons or rebates could be issued instead of, or in addition to, credits to the viewer's account. For example, as compensation for the verified viewing of an advertisement the viewer is compensated with a credit towards the purchase of videos and with discount coupons towards the purchase of the subject of the advertisement.

The teachings of the distribution of coupons and bonuses and other marketing strategies are applicable herein.

Specifically, the patents to Rhoades, U.S. Pat. No. 5,181,107, and to Von Kohorn, U.S. Pat. No. 5,227,874, are incorporated by reference herein. Additionally, the teachings of applicant's patent application Ser. No. 07/813,654, filed Dec. 27, 1991, titled: "Integrated Coupon/Promotion/Shopping List Electronic Network", are incorporated by reference herein.

Where the viewing of an advertisement leads directly to a purchase by the viewer of a product or service ("product") whether automatically or through a connection to a sales representative of the product, the transaction is automatically supported by the video services provider administrative resources. Clearly, RAViT's and the network's capabilities are ideally suited for a variety of remote shopping services.

In situations where a deposit, advance, prepayment or payment ("deposit") is required of the buyer in advance of the satisfactory delivery of the product, it is advantageous to provide an automated deposit escrowing system that will withhold distribution of the deposit to the seller until the buyer has received satisfactory delivery.

The flow chart of FIG. 12C begins where the flow chart of FIG. 10A ends. That is, the viewer has gained access to the network and has been provided a video. Viewing of the video, which may not be an "advertisement" generate viewer interest in a product or service. Preferably, the video is interactive and the viewer is provided the means to remains online with the video services provider's video server and accounting system ("administrator") and indicate the viewer's interest in a purchase. For example, while viewing a drama, the viewer may desire to purchase a particular item indirectly shown. The viewer utilizing the means and methods principally detailed with respect to FIGS. 12A and 12B identifies the purchase. Menu keys or a dedicated buy key provide access to the appropriate purchase routines.

Where the video is an advertisement, upon a viewer's determination to purchase the product, the viewer by means of an input screen similar to the illustration of FIG. 12B, would provide a product purchase input.

Once a product purchase input is recognized 1250 by the administrator. At that point, the administrator captures product purchase information 1251 comprising seller information, buyer (viewer) information, shipping information, product information including price and a delivery by date 1252. The delivery by date is the date by which the buyer has been promised delivery of the purchase.

When access to the network already comprises viewer control and/or password routines, it may not be required to execute additional purchase confirmation 1260 routines. If purchase confirmation is desired 1260, the buyer is requested to provide acceptable identification and password 1261. This routine may be similar to that previously detailed with respect to FIG. 7A. Alternatively, the buyer may insert into RAViT's compact storage device a user access card. The user access card may serve conventional "credit card" functions. In this case, purchase confirmation may require entering a password or PIN 1261.

If the purchase confirmation is found acceptable 1262, a deposit method is determined 1271. If the purchase confirmation is not found acceptable 1262, the confirmation process is repeated.

Banking and credit facilities are likely to be preestablished for the viewer, so that an appropriate payment method is automatically available for the processing of the deposit. In such cases, the administrator will utilize the preestablished credit facilities to process the deposit 1271. Alternatively, or in addition, the viewer is provided routines to select or establish a deposit method 1272.

Any of a plurality of available means that transfers a deposit amount from the viewer to the administrator's managed escrow account is herein represented as the debiting of the buyer's account 1273, and the crediting of the escrow account 1274. In the case of a credit card based transaction, access to a third party's credit authorization system and electronic funds transfer is implemented to the extent necessary.

Confirmation of the transaction 1275 is provided the seller at a suitable time.

It is intended that the steps above detailed are modifiable to suit the particular transaction routines that may be implemented between the buyer, seller, and administrator. In instances where the purchase decision is conducted in direct communication with the seller, the sequence of the steps above are modified to produce the same end result. That is, the administrator obtains purchase information, including a delivery by date, and has constructive receipt of the deposit.

It is expected that the delivery of the product to the buyer will in most of the instances occur by the delivery date. Thus, it is intended that at some predefined period of time following the delivery by date the deposit is automatically transferred from the escrow account to the seller. For example, 30 days following the delivery by date 1286 the seller's account is credited with the deposit amount 1289.

The predefined period of time following the delivery by date provides a window for the buyer to prevent the automatic distribution of the deposit to the seller. If delivery does not occur by the delivery by date, the buyer is provided the means to access the administrator's resources 1280 and update the delivery by date 1281. At which point delivery by date updating procedures including the notification of the seller 1284 are initiated.

Alternatively, the buyer may place the automatic distribution of the deposit to the seller on hold and request a refund of the deposit 1283. Appropriate conflict resolution procedures are initiated 1285 including a request of the seller to authorize the refund of the deposit to the buyer.

If satisfactory delivery has occurred, the buyer may request the distribution of the deposit to the seller 1282 in advance of the time when it would have otherwise automatically occurred.

The description above with respect to the flow chart of FIG. 12C is a novel combination and integration with the teachings herein of the elements detailed in other of applicant's work, Specifically: i) applicant's pending U.S. patent application Ser. No. 08/144,220 filed Oct. 29, 1993, which is a file wrapper continuation of U.S. patent application Ser. No. 07/748,424 filed Aug. 22, 1991, now a U.S. Pat. No. 5,426,281, issued Jun. 20, 1995, titled "Transaction Protection System"; and ii) the applicant's copyrighted work titled "Deposit Protection Voice Response System" registered with the United States Copyright Office, registration number TXU 538135 registered Sep. 11, 1992; the teachings of which are incorporated herein by reference.

It should be understood that it is the intent of incorporation to derive the full benefits of the logical integration of the teachings herein with the teachings of these and the other references cited herein. While the protection system disclosures provide great detail with respect to a voice response system embodiment, the synergistic combination is maximized by converting voice scripts and routines to interactive video supported by all the capabilities inherent in RAViT and the network detailed herein.

For example, a buyer's purchase decision may be made entirely offline by means of the video resources available from a Video CD locally accessible to RAVit, or information previously downloaded to RAViT. Once the purchase is completed, then RAViT immediately or at a more suitable time automatically accesses the appropriate network resources, downloads the necessary information to place the order, authorizes the deposit required by the transaction, and retrieves purchase confirmation information.

Additionally, simply because the video embodiment is more sophisticated than a telephony based voice response system, it does not logically follow, for example, that the teachings of the references with respect to the payment by the buyer of the deposit by check, and the possible distribution of the escrowed deposit to the seller by check are abandoned.

As detailed with respect to FIG. 5, in a preferred embodiment RAViT is capable of simultaneously receiving and managing a variety of network transmissions. As indicated herein, and referring to FIG. 9, in a preferred embodiment the network provides video, data, voice/video communications and any variety of digital and/or analog transmissions.

The patent to Chiocca, Jr. U.S. Pat. No. 5,027,426, details a signal coupling apparatus for combining CATV and telephone signals onto a single cable for transmission to an impulse pay-per-view converter device, the teachings of which are incorporated by reference herein. The previously cited and incorporated BroadBand Technologies, Inc.'s FLX System offers an integrated interactive switched digital video and telephony system.

The content-on-demand architecture provides for an elegant integration of the video and communication services that can be delivered to a viewer by these and a variety of other communication systems. Specifically, while RAViT 931 is retrieving a video from either a video services provider or from a storage device in RAViT, RAViT may receive a communication. The "communication" may be in the form of a conventional phone call, videophone call, fax, messaging and paging, and any analog or digital transmission.

A video and communication system for integrating the retrieval of a video and a communication comprises for example: i) retrieving means for retrieving a video from a video provider or from a storing means storing said video; ii) communicating means for receiving a communication; iii) accepting means for accepting said communication; iv) terminating means for terminating said communication; v) pausing means, responsive to said accepting means, for automatically pausing said retrieving; vi) resuming means, responsive to said terminating means, for resuming said retrieving; vii) transmitting means, responsive to said retrieving means, for transmitting to a viewing system; and viii) preferencing means for establishing video content preferences.

Where the video comprises a video segment map defining a plurality of video segments of said video, the plurality of video segments may comprise at least one non-sequential video segment selected from the group consisting of a parallel video segment, a transitional video segment, and an overlapping video segment. This permits that the retrieving means, responsive to an application of the video content preferences to the video segment map, not only retrieves a customized version of the video, but also identifies an appropriate prior point to resume retrieving video segments following a pause in the retrieving.

Figure 13:
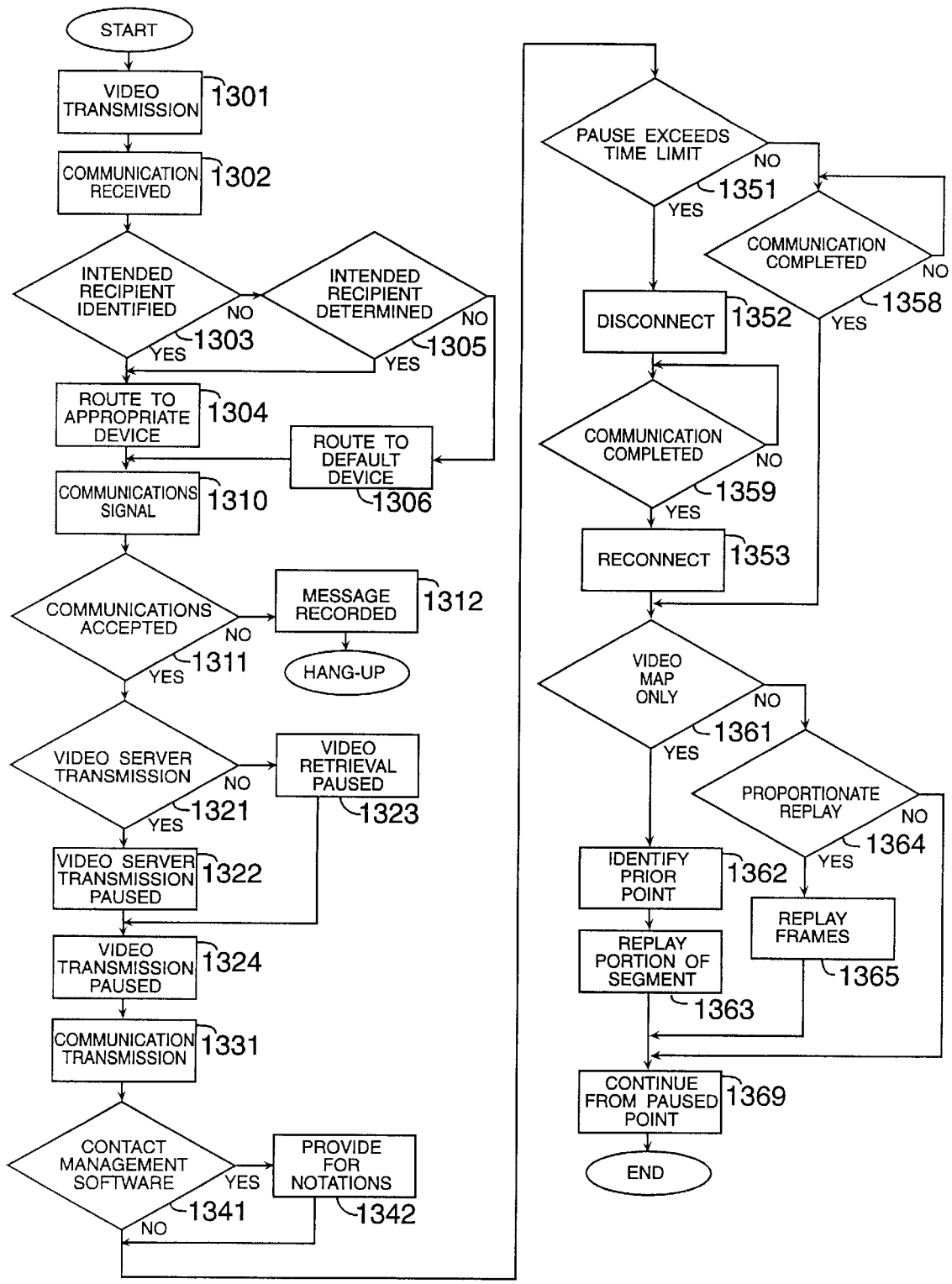
FIG. 13 is a flow chart detailing the steps of integrating the delivery of a video with a communications.

Referring to FIG. 13, a viewer of the video being transmitted to the display is likely to have identified himself or herself to RAViT as was previously detailed with respect to FIG. 7A. Similarly, the user of the computer terminal may have logged in, and thereby also provided RAVIT with his/her identity. Thus, during RAViT's transmission 1301 of a video to a display, when RAViT receives a communication 1302 and if the communication identifies the specific intended recipient 1303, RAViT's software routines are able to automatically direct the communication to an appropriate device. RAViT, in this case, automatically routes the communication 1304 to the display or to the terminal.

Alternatively, depending on the nature of the communication, RAViT may provide the originator of the communication the means to direct the routing of the communication. For example, in a voice call, voice response software will provide the caller an appropriate voiced menu to provide the routing information. Other means active or passive may be available for RAViT to determine the proper routing 1305. For example matching "Caller ID" with a table matching callers with recipients.

If proper routing of the communication cannot be determined by RAViT, the communication is directed to a default device consistent with the character of the communication 1306. For example, in the case of a fax to fax machine or RAViT's fax software. In this example, the communications is a videophone call and is directed to the display 1304 at the time that RAViT is transmitting a video to the display 1301.

Directing the communications to the display first causes RAViT to provide an appropriate video and/or audio signal 1310 to the viewer through the display. The signal may include caller identification and other data relevant to or associated with the call.

If the viewer accepts the call 1311, RAViT initiates routines 1321–1323 to cause that the transmission of the video to the display is paused 1324. Viewer acceptance of the communication may include, for example, picking up a receiver, pressing a key on a remote control device, a voice command, or directly touching an icon on a screen either in a remote control device or on the display itself. Thus, a single viewer action or command 1311 both accepts the call and pauses the video 1324.

If the viewer does not accept the call during a predefined time, RAViT terminates the audio/video signal and engages communications recording function or devises to receive a message 1313. At the end of the message, RAViT hangs-up on the communication. In this case the video transmission to the display is not paused and RAViT video transmission continues uninterrupted.

Where the video is being retrieved from a video services provider video server 1321, RAViT transmits to the video server the appropriate pause commands 1322, causing the video server to hold the further transmission of the video 1324. When the video is being retrieved from RAViT's own video storage module, (e.g. a Video CD) RAViT pauses the retrieval 1323 of the video from the storage module, also pausing the video transmission 1324.

RAViT's automatic integration of the delivery of a video and the acceptance of a communications may be configured by the viewer in any of a plurality of modes. The viewer may configure RAViT to cause a display of information relating to the incoming communication (data and image) on a window, without necessarily pausing the transmission of the video but lowering the sound associated with the video if the communication comprises a sound element.

The flow chart of FIG. 13 presumes that the viewer has configured the system to pause the video when a communication is accepted. In this case, the video's image may be replaced with a blank screen, neutral image, or informational data. When the communication is a video call, the screen image is replaced with that of the incoming call 1331.

When contact management software is available, and if the communication is deemed to require the use of such software 1341, the viewer is provided the opportunity to make such notations with respect to the communication 1342 as the viewer may require. Alternatively, the viewer may cause RAViT to log the communication. The screen display, as will be detailed with respect to FIG. 14B, is intended to accommodate both a communications window and a contact management window.

When a pause in the transmission of the video, whether resulting from the acceptance of a communications or a viewer's pause command, exceeds a certain time limit 1351, RAViT will automatically disconnect the linkage to the video server or put the disc module to sleep 1352. In such instances RAViT and/or the video server retains the required information to initiate transmission of the video at the appropriate point.

Upon completion of the communication 1358–1359 or when the play command is issued by the viewer, if disconnection occurred or the disc module was put to sleep 1352, RAViT will reestablish the linkage with the video server or awaken the disc module 1353.

Upon completion of the communication 1358-1359, the delivery of the video is automatically restarted at the point placed on hold 1369, at some pre-defined amount of time prior to the placing on hold of the video, or at a suitable prior point in the video.

When the video being delivered comprises a video map 1361, the map identifies the beginning point of the segment in which the pause occurred thus automatically identifying a suitable prior point 1362 in the video to restart the delivery of the video 1363. By automatically replaying at least the portion of the segment prior to the paused point 1363, and then continuing the play of the video from the paused point 1369, the viewer re-engages the video at the paused point 1369 without a loss of continuity.

Additionally, or alternatively in the absence of a video map 1361, the amount of video replayed 1363 may be in some direct proportion to the duration of the pause 1364. That is, if the pause was only a few seconds in duration, only few seconds worth of frames or a single segment may be replayed 1365. However, if the pause was for a considerable longer period of time 1364, a greater number of frames or segments may be replayed 1365.

In instances where proportionate replay 1364 is combined with the availability of a video map, the video map provides the necessary information to identify an appropriate prior point from which point the video is replayed 1365. The video is then continued from the paused point 1369.

If a video map is not available 1361, and proportionate replay is not elected 1364, or the viewer has elected that following the pause the video continue directly from the paused point, then the video is continued from the paused point 1369.

Thus a single viewer command, whether play or the termination of the communication, automatically "rewinds" the video to an appropriate point prior to the pause, and plays the video from that point.

Figure 14A:
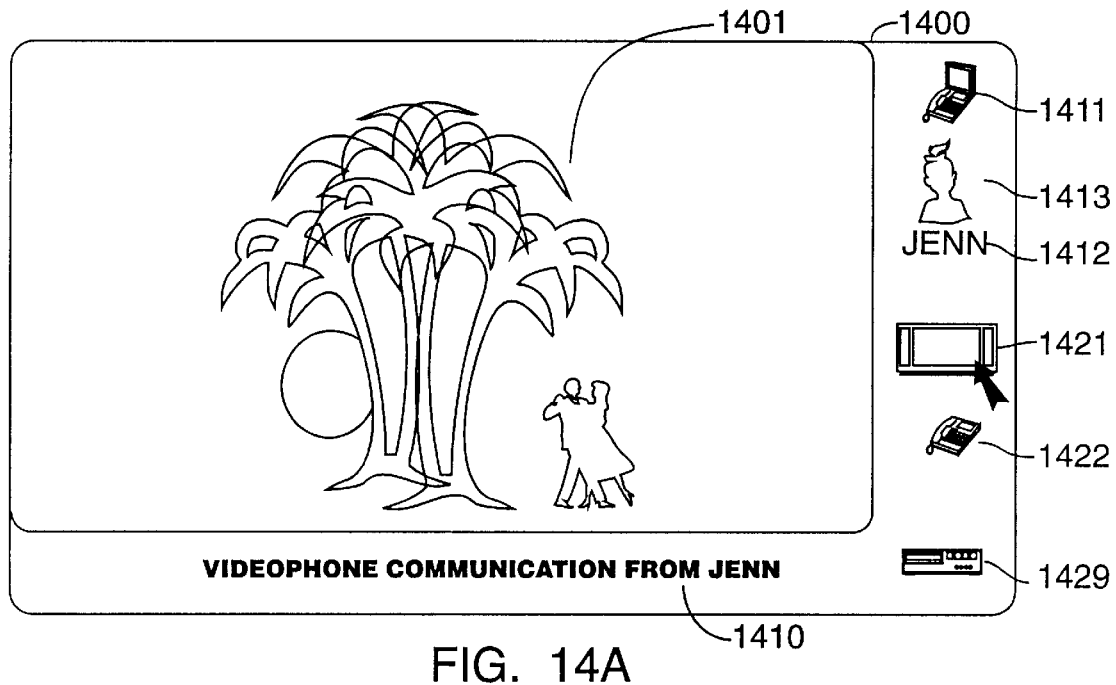
FIG. 14A is an illustration of a display screen during the playing of a video while a communication signal is provided.
Figure 14B:
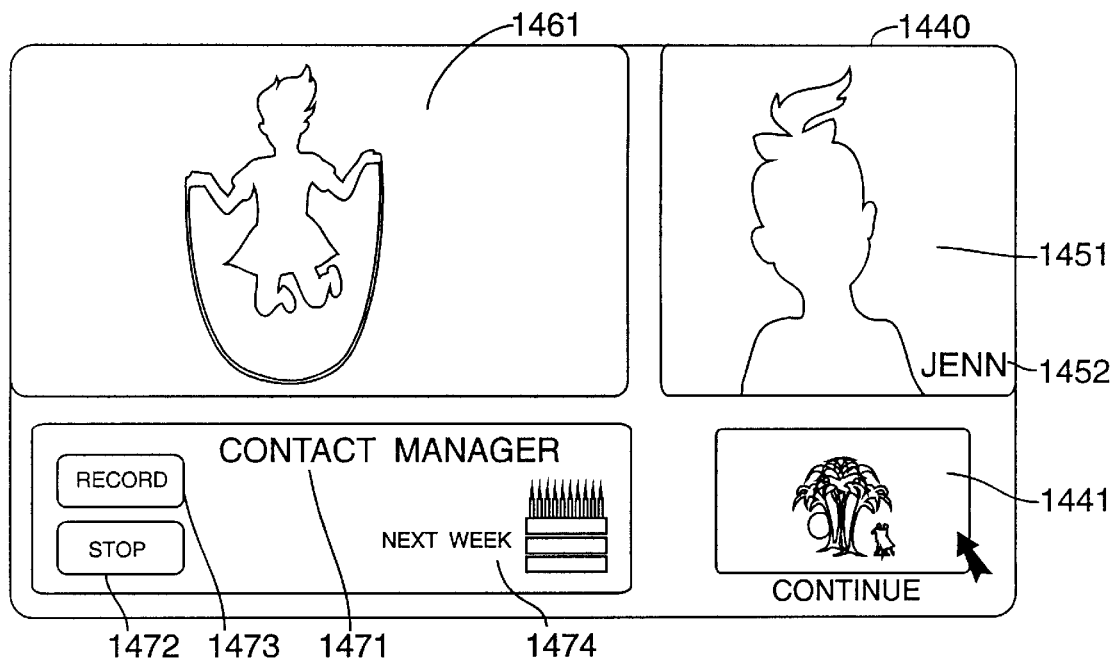
FIG. 14B is an illustration of a display screen following viewer acceptance of a communication.

FIGS. 14A and 14B further describe and expand upon the steps detailed with respect to FIG. 13.

FIG. 14A is an illustration of a display screen during the playing of a video while a communication signal is provided. As in the example detailed with respect to FIG. 13, the communications is a videophone call and is directed to a TV display 1400.

Directing the communications to the display 1400 causes RAViT to provide an appropriate video and/or audio signal 1410–1413 to the viewer through the display. Illustrated are examples of a character generated signal 1410 identifying both the nature of the communication and the identity of the "caller". Also shown are graphical examples of the signal, including an icon 1411 identifying the nature of the communication, and caller identification data 1412.

In this example, RAViT retrieves from its image base a picture of the caller 1413 which is displayed on the screen. Alternatively, the picture 1413 may be provided by the communication itself. That is the caller identifies himself or herself to the calling party with appropriate data 1412 and graphics 1413.

If the viewer does not wish to accept the communication, the viewer may select the "recorder" icon 1429. Following the selection of the recorder icon 1429, RAViT initiates message recording routines and restores the video to the full screen.

If the viewer does not wish to accept the communication, the viewer may do nothing. After a predetermined time, responsive to its configuration, RAViT initiates message recording routines and restores the video to the full screen.

The viewer may accept the communication by selecting, for example, an icon of the display device being viewed 1421, or redirecting the communication to an alternate device 1422. In either case, RAViT initiates routines to cause that the transmission of the video to the display is paused. Thus a single viewer command both accepts the call and pauses the video.

FIG. 14B is an illustration of a display screen following viewer acceptance of the communication. Upon the pausing of the video, a last frame of the video image is reduced to an icon 1441. In the balance of the screen 1440, the videophone communication is displayed on a window 1451. Data 1452 associated with the communication is also displayed. In this example, the communication also comprises an integrated video transmission 1461 which is also displayed contemporaneously with the videophone transmission 1451.

As indicated previously, with respect to FIG. 13, contact manager 1471 software is also provided that in this case permits the viewer to selectively capture segments of the transmission (record 1473 and stop 1472). In this example, the contact manager is also automatically reminding the viewer of an event 1474 associated with the caller.

A contact manager, as per he teachings herein, adds video to the principally character based capabilities of contact manager software such as ACT! from Symantec Corporation, the teachings of which are incorporated by reference herein.

In the example, RAViT's software automates, for the viewer, the process of combining a plurality of video streams and graphic characters. The viewer may be provided the means to size windows and retrieve other programs and features that may be provided directly by RAViT resources or by the network's various services providers.

At the conclusion of the communications transmission of both the videophone 1451 and video 1461, the viewer selects the icon of the paused video 1441 to cause RAViT to restart the transmission of the video as detailed with respect to FIG. 13.

Significant contributions of the disclosure herein are the synergies that result from the various combinations of the diverse inventive elements detailed herein. The methods and systems of the present invention are intended to provide a great variety of integrated video architecture and services, and supportive video delivery and video receiving systems and capabilities. The present disclosure directly and indirectly comprises a great many inventive elements which have been combined and may be combined to generate a plurality of combinations.

Thus, while elements of the invention has been detailed in conjunction with specific embodiments thereof, it is evident that many alternatives, modifications and variations are possible and will be apparent to those skilled in the art in light of the foregoing description. Accordingly, it is intended to embrace all such alternatives, modifications, variations, and combinations as fall within the spirit and broad scope of the specification. While the title, abstract, and claims herein are drawn to a particular inventive element disclosed, it is intended that other inventive elements disclosed herein will be the subject of their own corresponding claims in divisional or in continuation-in-part applications.

It is noted that the prior art that has been cited and incorporated herein is offered by way of example, and not limitation, of the underlying foundation of knowledge and skill that is available to a practitioner of the present invention.

Since the prior art is well established, many of the features, components, and methods found therein may be incorporated, as suggested herein, in a preferred embodiment; and since other modifications and changes varied to fit particular requirements and environments will be apparent to those skilled in the art, the invention is not limited to the embodiments set forth or suggested herein. It is to be understood that the invention is not limited thereby. It is also to be understood that the specific details shown are merely illustrative, and that the invention may be carried out in other ways without departing from the broad spirit and scope of the specification.

What is claimed is:

1. A method of playing a video comprising the steps of:
   allowing a viewer to control a playing of a video component of a full-motion video, said full-motion video having an audio component comprising at least one synchronized background audio element and at least one synchronized foreground audio element;
   playing, at normal speed and responsive to the initiation of a viewer's control over the playing of said video component, an audio that includes said at least one synchronized background audio element and excludes said at least one synchronized foreground audio element; and
   restoring, responsive to a termination of said viewer's control, the playing of said video component and said audio component.

2. The method of claim 1, wherein the excluding of said at least one synchronized foreground audio element is by adjusting the volume level of said at least one synchronized foreground audio element.

3. The method of claim 1, wherein said playing of an audio that includes said at least one synchronized background audio element comprises selectively adjusting the volume of said at least one synchronized background audio element.

4. The method of claim 1, wherein said viewer's control pauses the playing of the video component of said full-motion video; and wherein said termination of said viewer's control resumes the playing of said video component.

5. The method of claim 1, wherein said viewer's control pauses the playing of the video component of said full-motion video; wherein said termination of said viewer's control resumes the playing of said video component; and wherein the excluding of said at least one synchronized foreground audio element is by adjusting the volume level of said at least one synchronized foreground audio element.

6. The method of claim 1, wherein said viewer's control pauses the playing of the video component of said full-motion video; wherein said termination of said viewer's control resumes the playing of said video component; and wherein said playing of an audio that includes said at least one synchronized background audio element comprises selectively adjusting the volume of said at least one synchronized background audio element.

7. A method of playing a video comprising the steps of:
   allowing a viewer to control a playing of a video component of a full-motion video, said full-motion video having an audio component comprising a plurality of synchronized audio elements;
   playing, at normal speed and responsive to the initiation of a viewer's control over the playing of said video component, an audio that is generated from said plurality of synchronized audio elements and excludes at least one of said plurality of synchronized audio elements; and
   restoring, responsive to a termination of said viewer's control, the playing of said video component and said audio component.

8. The method of claim 7, wherein said playing an audio generated from said plurality of synchronized audio elements comprises selectively utilizing said plurality of synchronized audio elements.

9. The method of claim 7, wherein said playing an audio generated from said plurality of synchronized audio elements comprises selectively adjusting the volume level of at least one of the plurality of synchronized audio elements.

10. The method of claim 7, wherein said plurality of synchronized audio elements comprises at least one background audio element and at least one foreground audio element; and wherein said playing an audio generated from said plurality of synchronized audio elements comprises selectively adjusting the volume level of said at least one foreground audio element.

11. The method of claim 7, wherein said plurality of synchronized audio elements comprises at least one background audio element and at least one foreground audio element; and wherein said playing an audio generated from said plurality of synchronized audio elements comprises selectively adjusting the volume of said at least one background audio element.

12. The method of claim 7, wherein said viewer's control pauses the playing of the video component of said full-motion video; and wherein said termination of said viewer's control resumes the playing of said video component.

13. The method of claim 7, wherein said introduction of a viewer's control pauses the playing of the video component of said full-motion video; wherein said termination of said viewer's control resumes the playing of said video component; and wherein said playing an audio generated from said plurality of synchronized audio elements comprises selectively utilizing said plurality of synchronized audio elements.

14. The method of claim 7, wherein said, viewer's control pauses the playing of the video component of said full-motion video; wherein said termination of said viewer's control resumes the playing of said video component; and wherein said playing an audio generated from said plurality of synchronized audio elements comprises selectively adjusting the volume level of at least one of the plurality of synchronized audio elements.

15. The method of claim 7, wherein said viewer's control pauses the playing of the video component of said full-motion video; wherein said termination of said viewer's control resumes the playing of said video component; wherein said plurality of synchronized audio elements comprises at least one background audio element and at least one foreground audio element; and wherein said playing an audio generated from said plurality of synchronized audio elements comprises selectively adjusting the volume level of said at least one foreground audio element.

16. The method of claim 7, wherein said viewer's control pauses the playing of the video component of said full-motion video; wherein said termination of said viewer's control resumes the playing of said video component; wherein said plurality of synchronized audio elements comprises at least one background audio element and at least one foreground audio element; and wherein said playing an audio generated from said plurality of synchronized audio elements comprises selectively adjusting the volume of said at least one background audio element.

\* \* \* \* \*